US012569384B2

(12) United States Patent
Eagle et al.

(10) Patent No.: US 12,569,384 B2
(45) Date of Patent: Mar. 10, 2026

(54) MOUNTING SYSTEM

(71) Applicant: Medifab Global Limited, Ashburton (NZ)

(72) Inventors: Benjamin Eagle, Christchurch (NZ); Paul Eastwood, Christchurch (NZ); Anil Raman Patel, Birmingham (GB)

(73) Assignee: Medifab Global Limited, Ashburton (NZ)

( * ) Notice: Subject to any disclaimer, the term of this patent is extended or adjusted under 35 U.S.C. 154(b) by 213 days.

(21) Appl. No.: 18/251,048

(22) PCT Filed: Oct. 28, 2021

(86) PCT No.: PCT/IB2021/059949
§ 371 (c)(1),
(2) Date: Apr. 28, 2023

(87) PCT Pub. No.: WO2022/090973
PCT Pub. Date: May 5, 2022

(65) Prior Publication Data

US 2024/0325222 A1 Oct. 3, 2024

(30) Foreign Application Priority Data

Oct. 29, 2020 (AU) ................................ 2020903922

(51) Int. Cl.
*A61G 5/12* (2006.01)

(52) U.S. Cl.
CPC .................................... *A61G 5/122* (2016.11)

(58) Field of Classification Search
CPC ........ A61G 5/122; A61G 5/08; A61G 5/1067; A61G 5/0875; A61G 5/0891; A61G 2203/78; E05B 17/00; E05B 65/00
See application file for complete search history.

(56) References Cited

U.S. PATENT DOCUMENTS 5,556,168 A * 9/1996 Dinsmoor, III ...... A61G 5/1067 297/440.2
6,837,503 B2 * 1/2005 Chen ........................ A61H 3/04 280/47.4
(Continued)

FOREIGN PATENT DOCUMENTS

CN 2569635 Y * 9/2003
WO WO-2011100127 A2 * 8/2011 ........... A61G 5/1067
(Continued)

OTHER PUBLICATIONS

International Search Report and Written Opinion for PCT/IB2021/059949 (Jan. 13, 2022).

*Primary Examiner* — Kimberly T Wood
(74) *Attorney, Agent, or Firm* — Merchant & Gould P.C.

(57) ABSTRACT

The invention provides a backrest mounting system to mount a backrest to a wheelchair post. The mounting system comprises a locking peg that is receivable within a peg receiver. The peg receiver comprises a lock assembly comprising a locking member adapted to engage with the locking peg in a locked position. The locking peg comprises a latch pin housing extending along at least a portion of a length of the peg and also comprises a latch pin within the latch pin housing. The latch pin is slidable between a retracted position and an extended position in which the latch pin engages with and holds the locking member in an unlocked position to allow the locking peg to be readily retracted from the peg receiver.

22 Claims, 33 Drawing Sheets

(56) References Cited

U.S. PATENT DOCUMENTS

| | | | | |
|---|---|---|---|---|
| 10,945,901 B2 * | 3/2021 | Scarlett | A61G 5/122 | |
| 2004/0066081 A1 * | 4/2004 | Dennon | A61G 5/10 | 297/440.2 |
| 2008/0157581 A1 * | 7/2008 | Whelan | A61G 5/1067 | 297/440.2 |
| 2008/0217880 A1 * | 9/2008 | Whelan | A61G 5/122 | 280/250.1 |
| 2009/0039687 A1 * | 2/2009 | Hinata | B60N 2/2245 | 297/216.14 |
| 2009/0072105 A1 * | 3/2009 | Cramer | A47C 7/42 | 297/440.2 |
| 2012/0256463 A1 * | 10/2012 | Whelan | A61G 5/122 | 297/440.1 |

FOREIGN PATENT DOCUMENTS

| | | | |
|---|---|---|---|
| WO | WO-2016137339 A1 * | 9/2016 | |
| WO | WO-2017200392 A1 * | 11/2017 | A47C 7/42 |

* cited by examiner

MOUNTING SYSTEM

CROSS-REFERENCE TO RELATED APPLICATIONS

This application is a National Stage Application of PCT/IB2021/059949 filed 28 Oct. 2021, which claims the benefit of Application No. 2020903922, filed 29 Oct. 2020 in Australia, and which applications are incorporated herein by reference. To the extent appropriate, a claim of priority is made to each of the above disclosed applications.

FIELD OF INVENTION

This invention relates to a mounting system for attaching one component to another, such as for attaching a backrest to posts of a wheelchair.

BACKGROUND

A wheelchair typically comprises a frame that supports a seat base, on which an occupant of the wheelchair sits during use. The frame includes canes/posts, which are attachable to a backrest/seat back. The wheelchair frame also attaches to and supports wheels or castors.

The backrest may be made of any suitable material and may be of any suitable size or shape. Where the wheelchair has a rigid or semi-rigid backrest, as opposed to a flexible, fabric backrest for example, the backrest is typically attached to the posts/canes by mounting hardware. The mounting hardware is configured to allow the backrest to be removed so that the wheelchair can be folded up for storage or so that the backrest can be cleaned or replaced. The mounting hardware may be adjustable to allow the backrest to be moved to a different height along the posts and/or to be tilted to a different angle and/or to allow the depth of the backrest to be adjusted relative to the posts in order to support the postural support needs of the wheelchair occupant.

The backrest may be mounted to the posts using two mounting brackets to form a two-point attachment, where one bracket is on each of the left and right sides of the backrest and attached to each post respectively. Or the backrest may be mounted to the posts using four mounting brackets to form a four-point attachment, where two brackets are provided on each of the left and right sides of the backrest and attached to each post respectively.

US2012/0256463 discloses a two-point backrest mounting system for mounting a backrest to posts of a wheelchair. The mounting system comprises a locking pin that is attached to the backrest, and a pin receiver that is attached to one of the wheelchair posts. The pin receiver comprises an opening configured to receive the pin when the backrest is mounted to the wheelchair posts. The mounting system also comprises a pivoting lever that pivots between a locked position, in which a distal end of the lever extends into the pin receiver opening to engage with the pin, and an unlocked position, in which the lever is retracted from the pin receiver opening. To remove the backrest from the wheelchair, a user must toggle the lever to an open position to pivot the lever and cause the distal end of the lever to disengage from the pin. In this position, a proximal end of the lever projects over the pin receiver opening and obstructs retraction of the pin. A user must pull the backrest, and therefore the pin, upwards with sufficient force to push past the proximal end of the lever, which causes the lever to pivot to the locked position to reset the mounting system. Although this mounting system allows for the locking system to be automatically reset when the pin is removed from the pin receiver, the arrangement of the mounting system is complex, and users can find it difficult to overcome the resistance of the lever to extract the locking pin in order to detach the backrest from the wheelchair.

WO2017/200392 discloses a backrest mounting system for mounting a backrest to posts of a wheelchair at two locations, one on each side of the backrest. The mounting system comprises an L-bracket attached to the backrest and a mounting block attached to a post of the wheelchair. The mounting block comprises a top opening that extends downwardly along a front face of the block to form a slot. A flange extends from each side of the slot to define an interior region of the slot. The mounting block also comprises a pivoting lever having a proximal end that projects outwardly from the block to be manipulated by a user to pivot the lever between a locked position and an unlocked position. The lever also comprises a distal end that extends into the slot in the locked position and retracts from the slot in the unlocked position. A pair of pins project from the L-bracket and are located one above the other. When the backrest is mounted to the wheelchair posts, the pins are slid within the slot. A user then locks the system, by toggling the lever to the locked position, in which the distal end of the lever extends across the slot at a location above the lower pin to prevent the lower pin, and therefore the backrest, from being removed from the mounting block. However, it is necessary that the user remembers to toggle the lever. If the user forgets then the backrest pins will be located within the mounting block but will not be locked in position, creating an undesirable risk to the occupant of the wheelchair.

There is therefore a need to provide an automatically locking mounting system that goes at least some way towards overcoming the disadvantages of the prior art, or that at least provides the public with a useful alternative.

SUMMARY OF INVENTION

In a first aspect, the invention provides a mounting system to mount a first component to a second component, the system comprising: a locking peg, for attaching to the first component, and a peg receiver, for attaching to the second component, wherein the peg receiver comprises: a peg receiving opening to receive at least a portion of the locking peg therein; a lock assembly, comprising a locking member movable between a locked position and an unlocked position, and a lock biasing member that biases the locking member to the locked position. The locking peg comprises: a proximal end and a distal end; a lock engagement feature located between the proximal and distal ends to engage with the locking member in the locked position; a pin housing extending along at least a portion of a length of the locking peg; and a pin located within the pin housing and moveable between a retracted position and an extended position. The pin is biased to the extended position in which a distal end of the pin projects from the distal end of the locking peg to engage with and hold the locking member in the unlocked position.

In some forms, in the extended position, the pin engages with the locking member to hold the locking member in the unlocked position.

Optionally, in the extended position, the pin engages with a lock stop of the locking member to hold the locking member in the unlocked position, the lock stop comprising an aperture or recess to receive a distal end portion of the pin.

In some forms, in the extended position, the pin projects from the distal end of the locking peg a distance sufficient to remain engaged with the locking member at least until the locking peg is retracted from the peg receiver sufficiently to disengage the locking member with the engagement feature of the locking peg.

In some forms, upon disengagement of the pin with the locking member, the lock biasing member causes the locking member to automatically move to the locked position.

Optionally, the locking member comprises a lock support and the pin engages with the lock support when the locking member is in the locked position. Preferably, the lock support is a detent, recess, concave dimple, or the like.

In some forms, the pin is biased to the extended position by a pin biasing member, such as a compression spring.

In some forms, the pin biasing member is located between a proximal end of the pin and the proximal end of the locking peg.

In some forms, the lock assembly further comprises an unlocking element that is operatively connected to the locking member to cause the locking member to move from the locked position to the unlocked position as the unlocking element is moved from a first position to a second position.

In some forms, the locking member is pivotable about a pivot to move between the locked and unlocked positions. Optionally, the pivot and locking member are integrally formed as a single part.

In other forms, the locking member is slidable between the locked and unlocked positions.

In some forms, the lock biasing member comprises a compression spring.

In some forms, the lock engagement feature comprises a detent or opening in the locking peg.

In some forms, the distal end of the locking peg comprises a tapered tip. Optionally, the tapered tip is generally convex, conical or bullnosed.

In some forms, the locking member comprises a catch that engages with the lock engagement feature of the locking peg in the locked position. Optionally, the catch projects from at least one supporting element of the of the locking member.

In some forms, the locking member comprises a peg opening for receiving the distal end of the locking peg, the peg opening being defined, at least in part, by the catch.

In some forms, the catch comprises a lip or collar that terminates at the peg opening.

Optionally, the catch comprises a tapered edge, at the peg opening, that slopes toward a cavity within the locking member.

In some forms, wherein the cavity is formed between the catch and a retaining element of the locking member, the retaining element projecting beyond a terminal end of the catch and comprising a lock stop.

In some forms, the mounting system is for mounting a backrest to posts of a wheelchair, the locking peg is for attaching to one of either the backrest or a post of the wheelchair, and the peg receiver is for attaching to the other of the backrest or a post of the wheelchair.

In a second aspect, the present invention provides a mounting system to mount a first component to a second component, the system comprising: a locking peg, for attaching to the first component, and a peg receiver, for attaching to the second component, wherein the peg receiver comprises: a peg receiving opening to receive at least a portion of the locking peg therein; a lock assembly, comprising a locking member movable between a locked position and an unlocked position, and a lock biasing member that biases the locking member to the locked position; and wherein the locking peg engages with the locking member in the locked position and comprises: a projecting element projecting from a distal end of the locking peg to engage with and hold the locking member in the unlocked position.

Optionally, the projecting element comprises a pin that is slidably received within a pin housing of the locking member.

In a third aspect, the present invention provides a kit of parts comprising: a peg receiver comprising: a peg receiving opening to receive at least a portion of a locking peg therein; a lock assembly, comprising a locking member movable between a locked position and an unlocked position, and a lock biasing member that biases the locking member to the locked position. The kit also comprises a locking peg comprising: a proximal end and a distal end; a lock engagement feature located between the proximal and distal ends; a pin housing extending along at least a portion of a length of the locking peg; and a pin located within the pin housing and moveable between a retracted position and an extended position. The pin is biased to the extended position in which a distal end of the pin projects from the distal end of the locking peg to engage with and hold the locking member in the unlocked position.

Also disclosed herein is a backrest mounting system to mount a backrest to a wheelchair post, the system comprising: a female element, for attaching to one of the backrest and wheelchair post, and a male element, for attaching to the other of the backrest and wheelchair post, wherein the female element comprises a mounting block comprising: a peg receiver to receive at least a portion of the male element; a lock housing in communication with the peg receiver; a lock assembly, comprising a locking member located within the lock housing and movable between a locked position and an unlocked position, and a lock biasing member that biases the locking member to the locked position. The backrest mounting system also comprises a male element comprising a locking peg comprising: a proximal end and a distal end; a lock engagement feature to engage with the locking member in the locked position; a latch pin housing extending along at least a portion of a length of the peg and comprising an opening at the distal end of the peg; and a latch pin located within the latch pin housing and slidable between a retracted position and an extended position. The latch pin is biased to the extended position by a pin biasing member located within the latch pin housing and wherein in the extended position, a distal end of the latch pin projects from the distal end of the peg and engages with a lock stop of the locking member in the unlocked position to hold the locking member in the unlocked position.

In some forms, in the extended position, the latch pin projects from the distal end of the peg a distance sufficient such that the latch pin remains engaged with the lock stop for at least a period of time whilst the peg is retracted from the peg housing.

In some forms, upon disengagement of the latch pin with the lock stop, the lock biasing member causes the locking member to automatically move to the locked position.

Optionally, the pin biasing member is a spring.

In some forms, the pin biasing member is located in a first portion of the pin housing between a proximal end of the pin and the proximal end of the locking peg.

In some forms, the lock assembly further comprises an unlocking element that is operatively connected to the locking member to cause the locking member to move from the locked position to the unlocked position as the unlocking element is moved from a first position to a second position.

In some forms, the lock assembly further comprises a pivot pin receivable within a pin aperture of the locking member and engageable with a pin receiver of the lock housing to allow the locking member to pivot between the locked position and the unlocked position. Optionally, the pivot pin and locking member are integrally formed as a single part.

In some forms, the lock biasing member is a spring.

In some forms, the lock engagement feature comprises a detent or opening near the distal end of the locking peg.

Optionally, the distal end of the locking peg comprises a tapered tip. In some forms, the tapered tip is generally convex, conical or bullnosed.

In some forms, the locking member comprises a catch that engages with the lock engagement feature in the locked position. Optionally, the catch comprises a projection that projects from a side wall of the of the locking member.

In some forms, the locking member comprises a peg opening for receiving the distal end of the locking peg, the peg opening being defined, at least in part, by the projecting catch. Optionally, the projecting catch comprises a lip or collar that terminates at the peg opening.

In some forms, the catch comprises a tapered edge, at the peg opening, that slopes downwardly and toward a central region of the locking member.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this specification is not, and should not be taken as, an acknowledgement or any form of suggestion that that prior art forms part of the common general knowledge in the field of endeavour in any country in the world.

The invention consists in the foregoing and also envisages constructions of which the following gives examples only.

BRIEF DESCRIPTION OF THE DRAWINGS

Preferred forms of the invention will now be described by way of example and with reference to the accompanying drawings, in which.

DETAILED DESCRIPTION

The invention is further described with reference to the following examples. It will be appreciated that the invention as claimed is not intended to be limited in any way by these examples.

As exemplified by embodiments shown in FIGS. 1 to 24, the present invention relates to a self-locking and automatically resetting mounting system 1000 for attaching a first component to a second component, such as to attach a backrest 2000 to posts/canes 3000 of a wheelchair, or to attach a seat plate/seat base to a wheelchair frame. The mounting system 1000 automatically locks the first component 2000 (which will be exemplified in this specification as a backrest) to the second component 3000 (which will be exemplified in this specification as a post) when a locking peg 4200 of a male element 4000 mates with a peg receiving opening 5200 of a female element 5000.

The female element 5000 forms a peg receiver and comprises a body 5100 in which the peg receiving opening/hollow 5200 is located for receiving the locking peg 4200 therein. The peg receiver 5000 also comprises a lock assembly 5400.

The lock assembly 5400 comprises a locking member 5410 that is moveable between a locked position and an unlocked position, a lock biasing member 5430 to bias the locking member 5410 to the locked position, and an unlocking element 5440 to allow a user to unlock the mounting system 1000. The locking member 5410 may be a pivotable locking member or a slidable locking member, such that the locking member is configured to pivot or slide between the locked and unlocked positions.

The peg receiving opening 5200 is in communication with a lock housing 5500 in which at least the locking member 5410 of the lock assembly 5400 is housed, such that, in the locked position, a portion of the locking member 5410 projects into the opening 5200 to engage with the locking peg 4200 and prevent the locking peg from being removed from the peg receiving opening 5200.

The unlocking element 5440 is moveable by a user to cause the movable locking member 5410 to move from the locked position to the unlocked position in order to unlock the mounting system 1000. In the unlocked position, the locking member 5410 disengages from the locking peg 4200 to allow the locking peg 4200 to be retracted from the peg receiving opening 5200 in order to detach the backrest 2000 from the respective post 3000. The lock assembly is configured so that retracting the locking peg 4200 from the opening 5200 causes the locking member 5410 to automatically reset itself to the locked position so that when the locking peg 4200 is next inserted into the peg receiver 5000, the locking member 5410 will automatically engage with the peg 4200 and lock the peg within the peg receiving opening 5200, thereby locking the backrest 2000 to the respective wheelchair post 3000.

Figure 1:
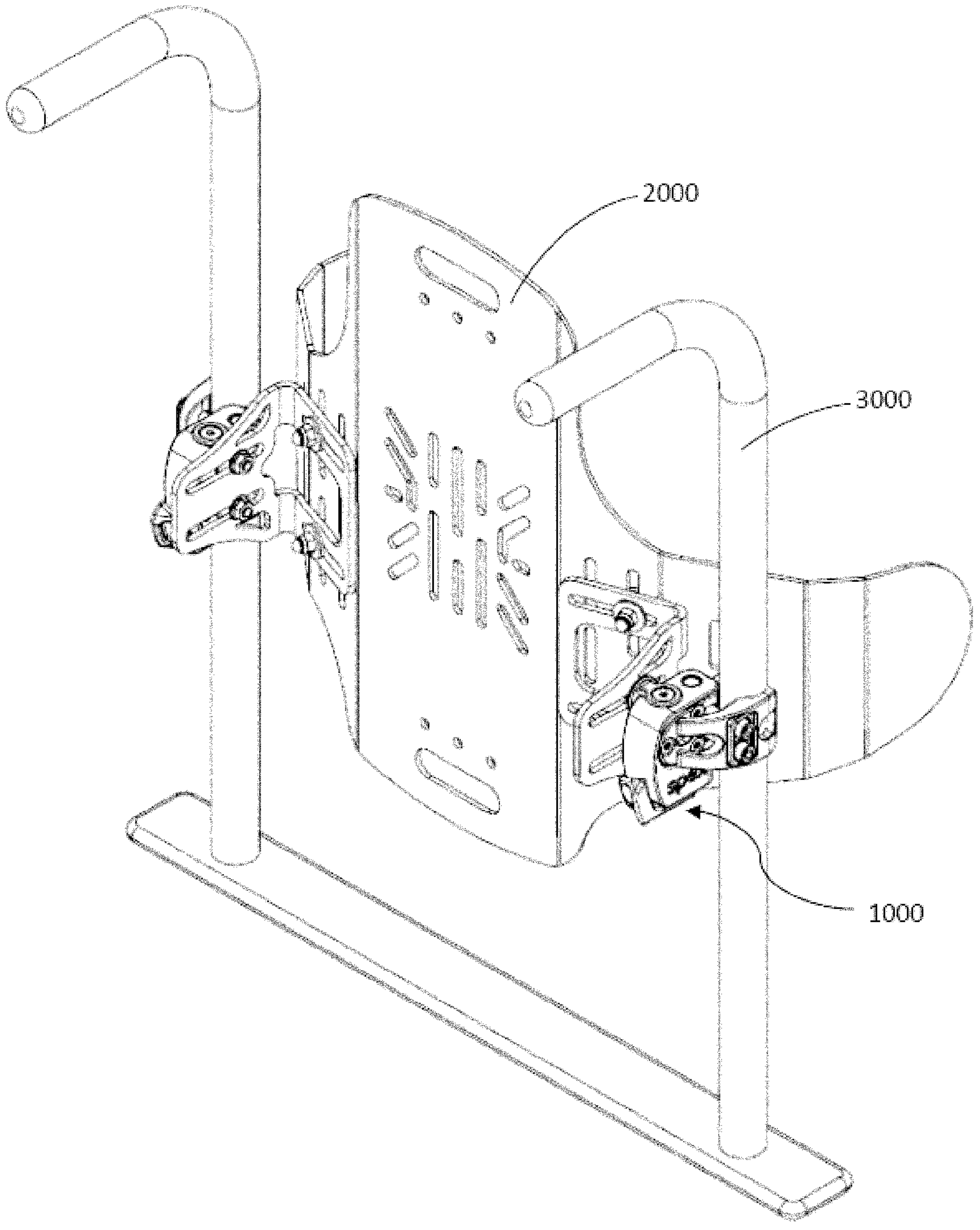
FIG. 1 is an isometric rear view of an exemplary backrest mounted to one form of wheelchair posts using one form of mounting system of the invention.
Figure 2:
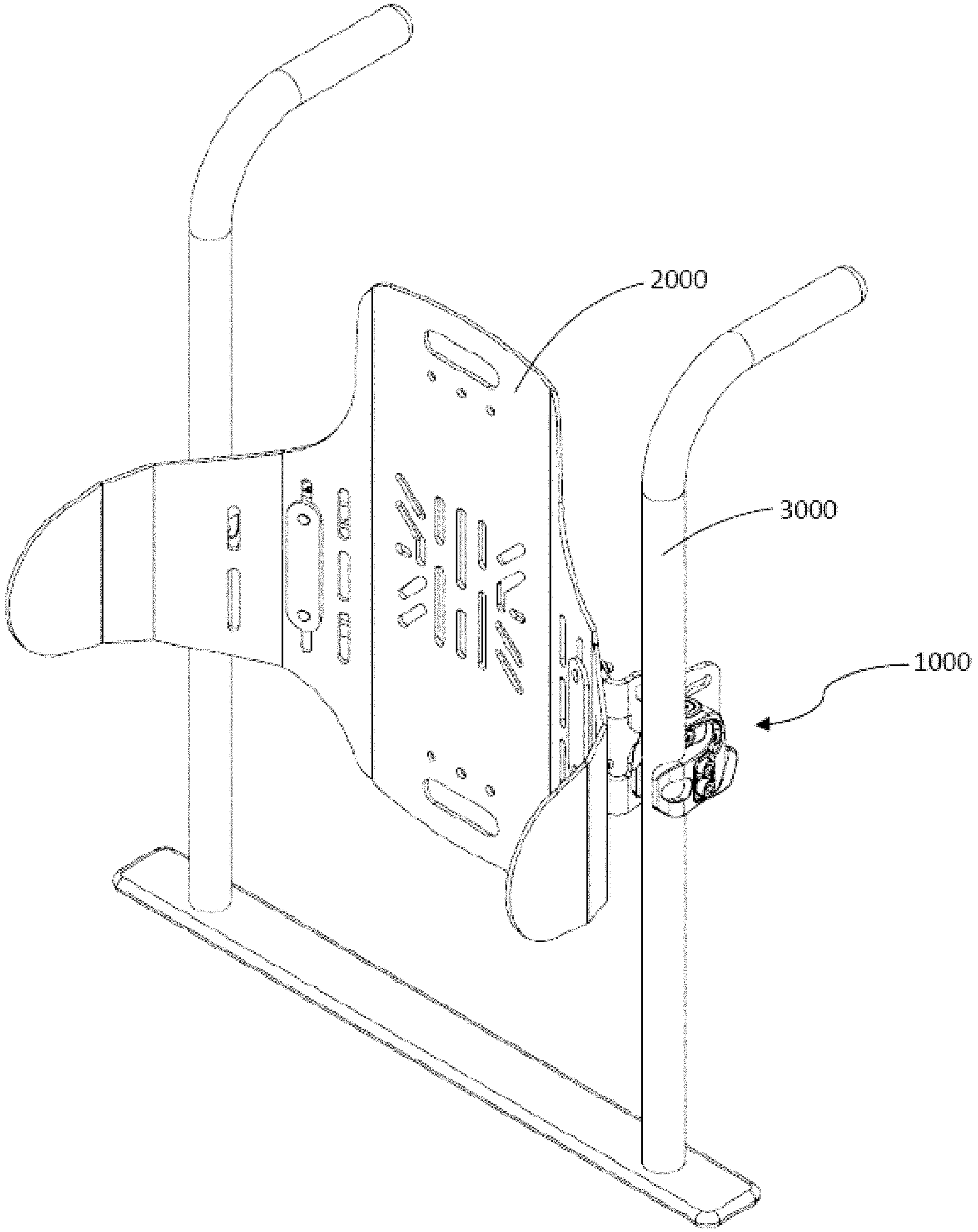
FIG. 2 is an isometric front view of the backrest, posts, and mounting system of FIG. 1.

FIGS. 1 and 2 show one form of backrest mounting system 1000 of the invention that attaches a rigid or semi-rigid backrest 2000 to two posts/canes 3000 of a wheelchair. The mounting system 1000 comprises a male element 4000 comprising a bracket mount 4100, for attaching to a backrest, and a locking peg 4200. The mounting system also comprises a female element/peg receiver 5000 comprising a peg receiving opening 5200 configured to receive the locking peg 4200 therein.

In the embodiments shown, the peg receiver 5000 is attached to one of the wheelchair posts 3000 and the locking peg 4200 is attached, via the bracket mount 4100, to the rear surface of the backrest 2000 at one side of the backrest. However, in other forms, the peg receiver 5000 may be attached to one side of the rear surface of the backrest 2000 and the locking peg 4200 may be attached to one of the wheelchair posts 3000, as shown in FIG. 17*a*. In this embodiment, the locking peg 4200 and peg receiver 5000 may be inverted from the position shown in FIGS. 1 and 2.

For simplicity, the features of the invention and its operation will be described in the orientation and configuration as shown in FIGS. 1 and 2, unless stated otherwise. But it should be understood that the mounting system may be reversed without departing from the invention. It should also be understood that the mounting system 1000 may be used to attach other components together, such as a seat base and a seat frame. Further, it should be understood that multiple mounting systems 1000 of the invention may be used to attach one component to another. For example, two mounting systems 1000 may be used to attach a backrest to a pair of wheelchair posts, in which case one mounting system 1000 may be located on each of the left and right sides of the backrest to attach to left and right wheelchair posts 3000, forming a two-point mounting attachment. Alternatively, four mounting systems 1000 may be used, in which case two mounting systems 1000 may be located on each side of the backrest to attach to the left and right posts 3000 of a wheelchair, forming a four-point mounting attachment.

FIGS. 3 to 7 show further detail of the male element 4000 of the mounting system, and particularly the locking peg 4200.

Figure 4:
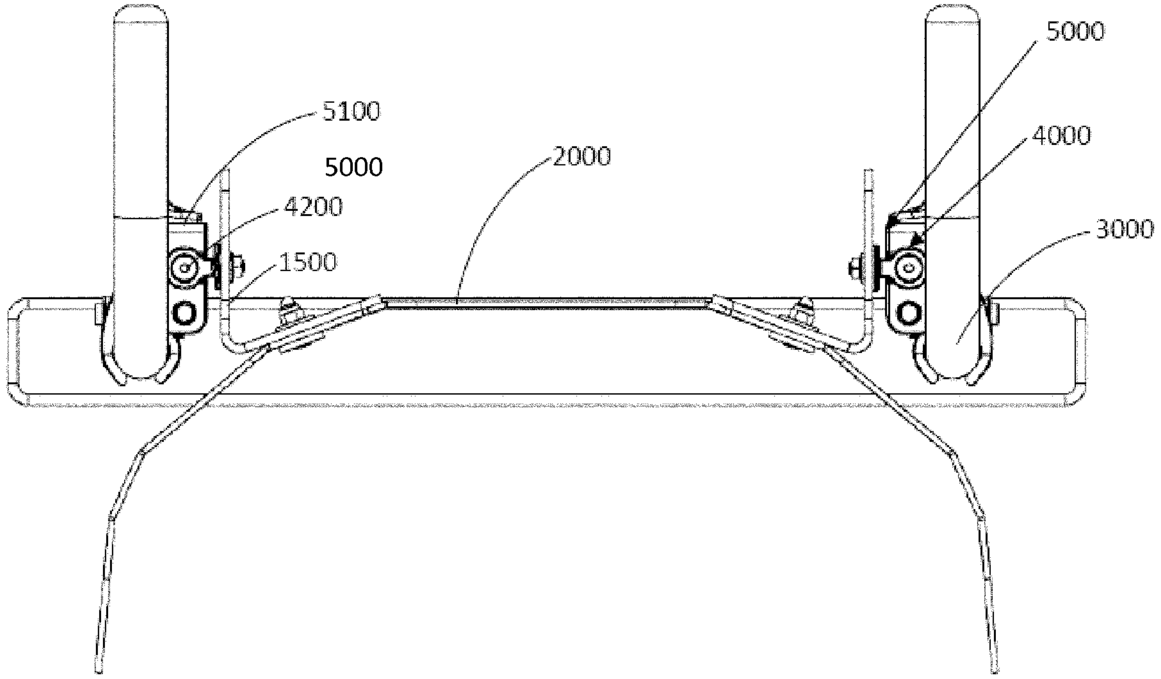
FIG. 4 is a top view of the backrest, posts, and mounting system of FIG. 1.
Figure 5:
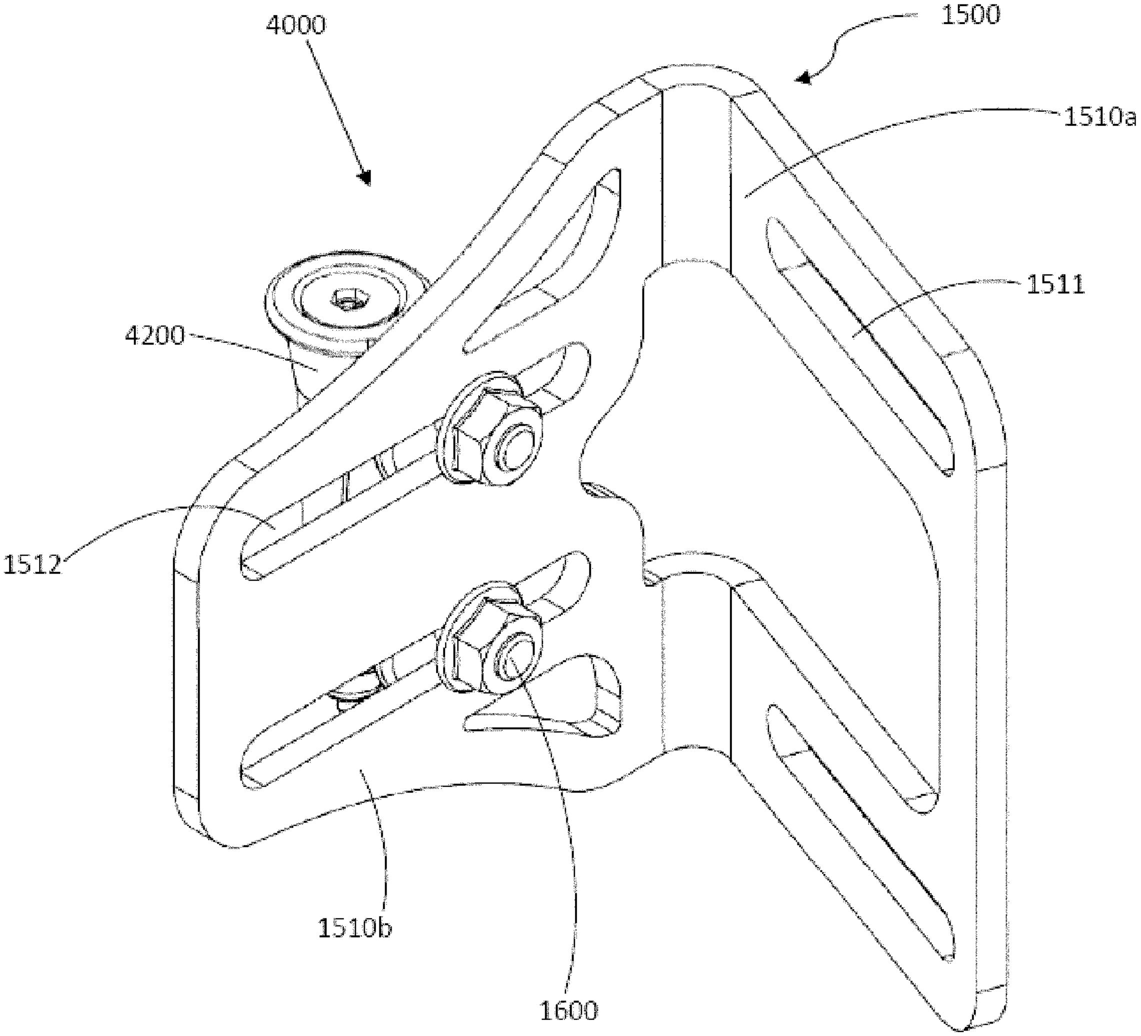
FIG. 5 is an isometric view of one form of mounting bracket for attaching a locking peg of the invention to a wheelchair backrest.
Figure 6:
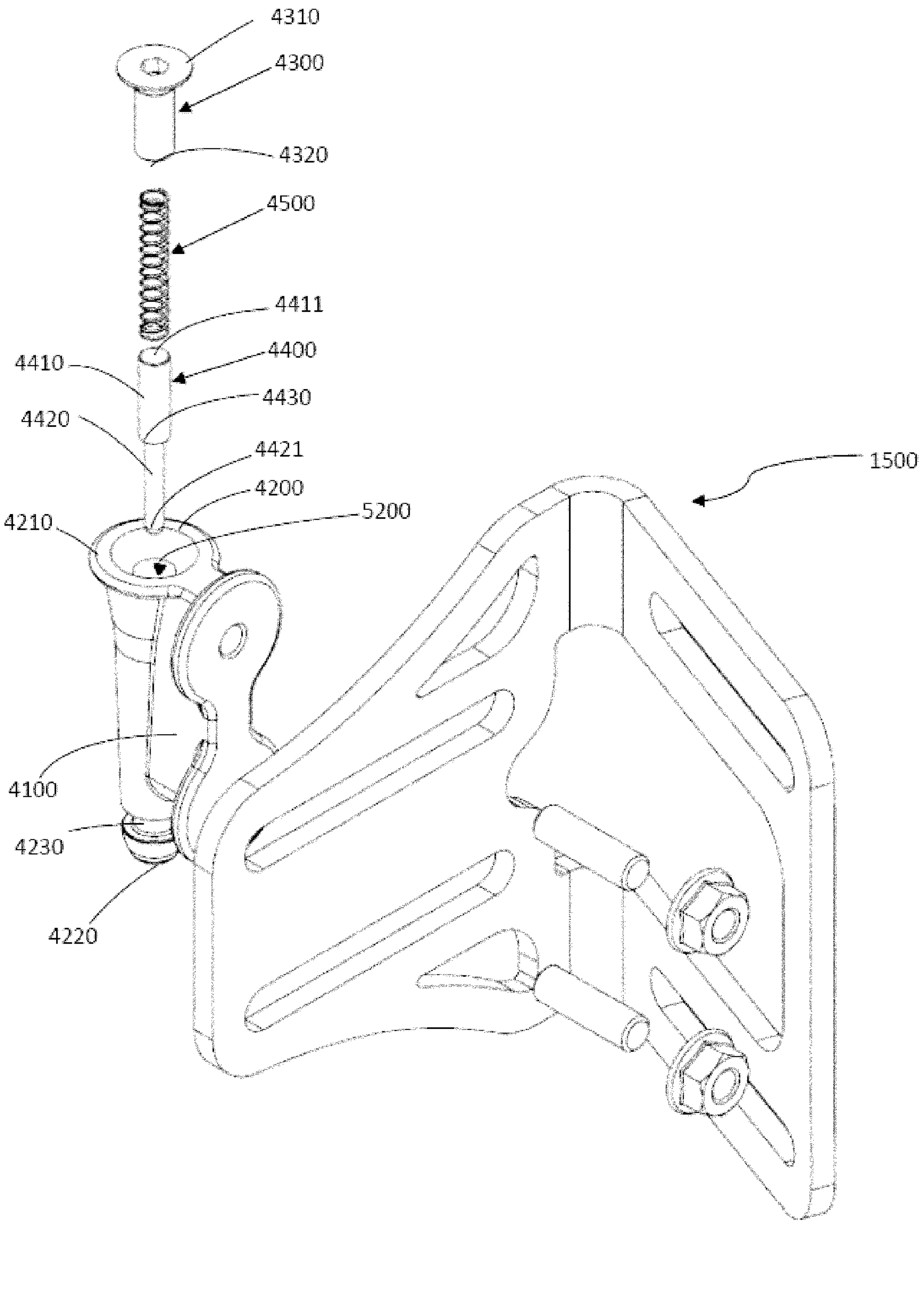
FIG. 6 is an isometric exploded view of the mounting bracket and locking peg of FIG. 5.

As shown in FIGS. 3 to 7, in some forms, the locking peg 4200 comprises a bracket mount 4100 that extends from one side of the locking peg 4200. The peg 4200 may be connected to the bracket mount 4100 along a longitudinal side of the peg 4200, as shown in FIG. 6. This embodiment is particularly advantageous because the peg 4200 provides additional strength and stability to the bracket mount 4100. In other forms, the bracket mount 4100 may extend from a proximal end of the locking peg 4200. In this form, the bracket mount 4100 may comprise a generally n-shaped member or an inverted L-shaped member, for example, that is attached to the proximal end of the locking peg 4200 and that also attaches to the backrest 2000. In yet another form, the peg 4200 may attach directly to the backrest 2000 without the need for an adjustment bracket to connect the peg 4200 to the backrest.

The locking peg 4200 may be attached to the backrest 2000 (or post) by any suitable arrangement. In the embodiment illustrated, the locking peg 4200 is attached to the backrest 2000 by a bracket configured to attach to the bracket mount of the peg 4200 and to the backrest 2000. In some forms, the bracket 1500 comprises an L-bracket 1500 comprising a pair of first and second arms 1510*a*, 1510*b* joined at a corner. Typically, the two arms 1510*a*, 1510*b* of the L-bracket 1500 are joined at an acute angle, such as a right angle.

At least one of the two arms 1510*a*, 1510*b* of the L-bracket 1500, such as the first arm 1510*a*, may comprise one or more position adjustment slots 1511 to adjust the position of the L-bracket 1500 on the backrest 2000. The backrest 2000 may also comprise one or more position adjustment slots 2511, typically extending in a different direction to the position adjustment slots 1511 of the first arm 1510*a* of the L-bracket 1500, such as in a direction generally orthogonal to the slots of the first arm 1510*a*. For example, the position adjustment slots 1511 of the first arm may be generally horizontal and the position adjustment slots 2511 of the backrest may be generally vertical or vice versa. In a preferred form, the first arm 1510*a* comprises two generally horizontal position adjustment slots 1511 and the backrest 2000 comprises two generally vertical position adjustment slots 2511, the slots 1511, 2511 of the backrest and first arm 1510*a* being configured to intersect/overlay each other in part to allow a fastener to extend through the intersecting slots 1511, 2511. In this arrangement, the location of the L-bracket 1500 can be moved vertically and horizontally in relation to the backrest 2000 so that the position of the backrest 2000 can be adjusted relative to the wheelchair posts 3000. By providing a system in which the backrest is adjustable, it is possible to position the backrest on the posts to suit the specific needs of the wheelchair user/occupant. Once the L-bracket 1500 is in the desired location on the backrest 2000, a fastener 1600, such as a bolt, pin, or the like, is inserted between the positioning adjustment slots 1511, 2511 of the first arm 1510*a* and the backrest 2000 and is secured in place with a clamping member, such as a nut or the like to hold the L-bracket 1500 firmly in position.

Figure 3:
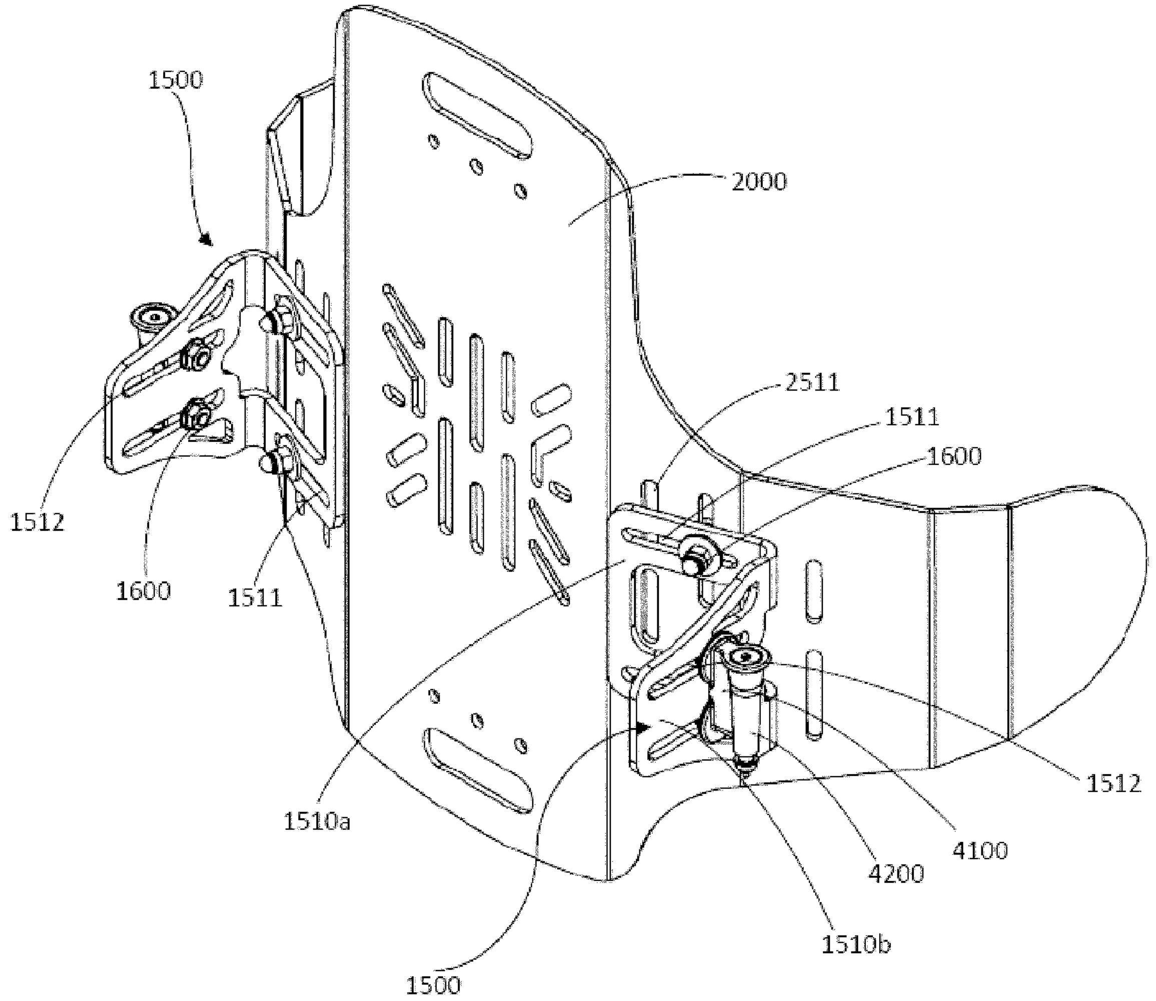
FIG. 3 shows an isometric rear view of an exemplary backrest attached to one form of mounting bracket and a locking peg at the rear of the backrest, the mounting bracket being an L-bracket and the backrest and mounting bracket comprising slots that are orthogonal to each other to allow the position of the mounting bracket to be adjusted relative to the backrest in the vertical and horizontal directions.

The bracket mount 4100 of the locking peg 4200 may be attached to the second arm 1510*b* of the L-bracket, as shown best in FIG. 4. In some forms, the locking peg 4200 is attached to the second arm 1510*b* by one or more fasteners 1600 that engage with both the bracket mount 4100 and the second arm 1510*b*. The second arm 1510*b* may comprise one or more position adjustment slots 1512 that engage with the one or more fasteners 1600 and allow the fastener(s) to slide along the slot(s) 1512 to adjust the position of the peg 4200 in relation to the second arm 1510*b*, and to therefore adjust the position of the backrest 2000 in relation to the respective wheelchair post 3000. In a preferred form, as shown in FIG. 3, the second arm 1510*b* of the L-bracket 1500 comprises one or more generally horizontal position adjustment slots 1512, preferably at least two position adjustment slots. Two fasteners 1600, such as screws or threaded bolts, may project from the bracket mount 4100 and extend through a respective slot 1512 of the second arm. The fasteners 1600 may be held in position by a nut that clamps the locking peg 4200 to the second arm of the L-bracket 1500 in the selected position, as shown in FIG. 5.

The locking peg 4200 comprises an elongate member/shaft having a proximal end 4210 and a distal end 4220. The distal end 4220 forms the tip of the peg 4200. In the embodiment shown in FIG. 3, the proximal end 4210 is located at the top of the locking peg 4200 and the distal end 4220 is located at the bottom of the locking peg 4200, near the locking member 5410. In some forms, the length of the locking peg from proximal end 4210 to distal end 4220 is between about 20 mm to about 100 mm long and is preferably about 56 mm long.

Figure 7:
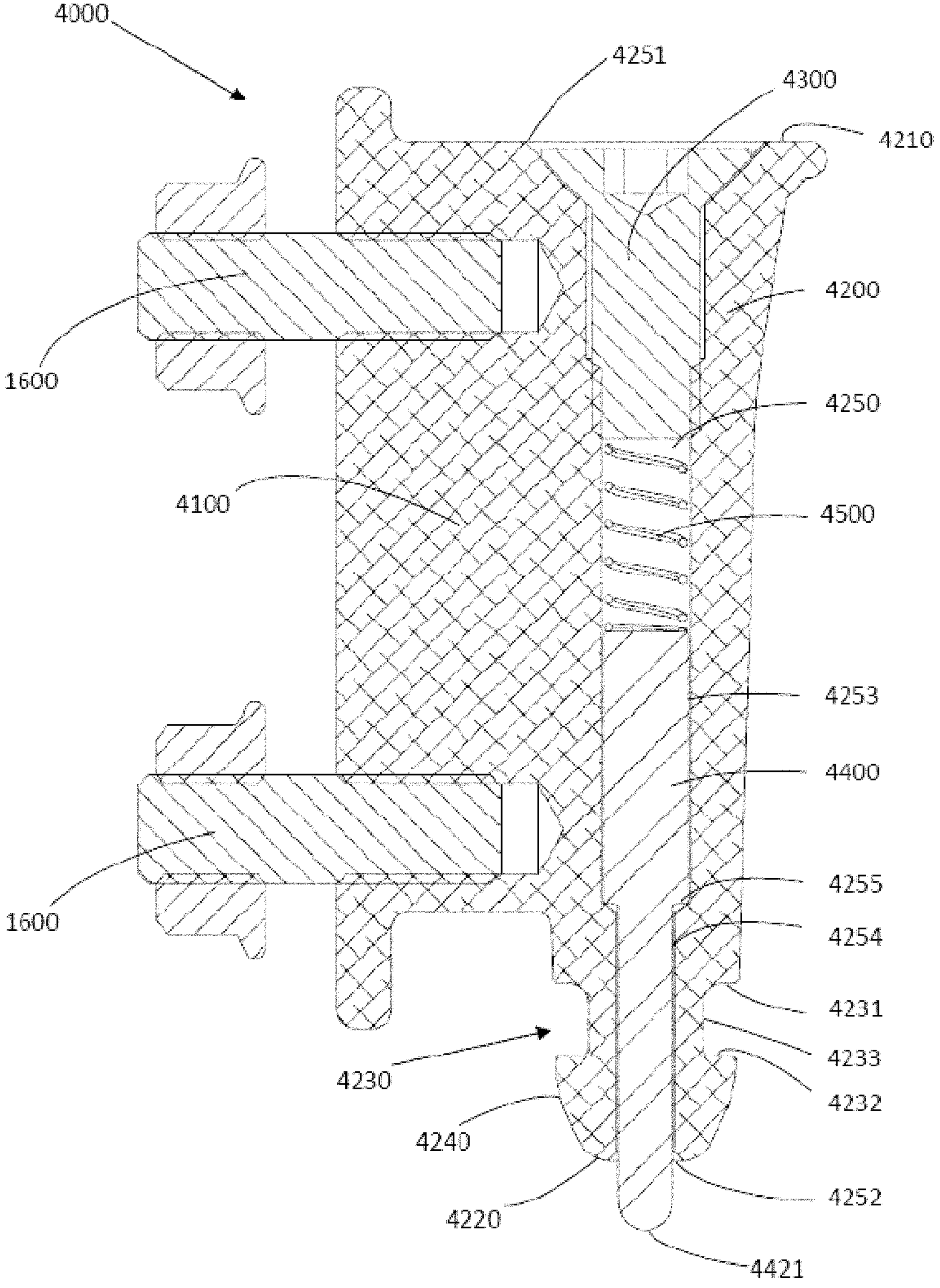
FIG. 7 is a cross-sectional side view of one form of locking peg of the present invention and illustrates a generally conical locking peg and a bracket mount extending from one side of the locking peg, a stepped latch pin having an exposed distal end portion extending from the distal end of the locking peg, a stopper at the proximal end of the locking peg, and a biasing member located between the latch pin and the backstop.

In some forms, the locking peg 4200 comprises an elongate shaft having a generally continuous cross-section along its length (the shaft being generally cylindrical or rod-like for example). In other forms, the locking peg 4200 comprises a cross-section that tapers toward a distal end of the peg (the shaft being generally conical for example and having a curved outer surface that tapers from the proximal end 4210 toward the distal end 4220, as shown in FIGS. 3, 6 and 7). In such forms, the transverse cross-section of the locking peg 4200 changes along the length of the peg 4200.

The locking peg 4200 is arranged to be attached to the backrest in an orientation that generally aligns with the longitudinal direction of the peg receiving opening 5200 of the peg receiver 5000. In some forms, as illustrated, the locking peg 4200 (and the peg receiving opening 5200) is oriented generally vertically, so that the length of the locking peg 4200 extends generally vertically. In other forms, the locking peg 4200 (and peg receiving opening 5200) may be oriented generally diagonally or generally horizontally.

The locking peg 4200 comprises an outer surface that extends along the length of the peg 4200. The outer surface is preferably curved, such as where the peg 4200 is generally cylindrical or conical, but may otherwise comprise a plurality of generally flat surfaces, such as where the locking peg has a generally quadrilateral, pentagonal, hexagonal or octagonal transverse cross-section.

The locking peg 4200 comprises a lock engagement feature 4230 that is configured to engage with the locking member 5410 of the lock assembly 5400 to lock the peg 4200 within the peg receiver 5000. Typically, the lock engagement feature 4230 is located on the outer surface of the locking peg 4200 and near the distal end 4220 of the locking peg 4200, but in some forms, the lock engagement feature 4230 may be located generally centrally on the locking peg 4200 or the lock engagement feature may be located closer to the proximal end 4210 of the locking peg.

The lock engagement feature 4230 may be any feature for suitably engaging with the locking member 5410 in the locked position. In some forms, the lock engagement feature 4230 is a detent, recess or opening formed in the outer surface of the locking peg 4200. In a preferred form, the lock engagement feature 4230 is a detent comprising an annular channel that extends circumferentially around the outer surface of the locking peg 4200 near the distal end 4220 of the peg 4200. The channel 4230 is defined by a pair of first and second side walls 4231, 4232 and an end wall/base 4233 extending between the side walls 4231, 4232. The first side wall 4231 is closest to the proximal end 4210 of the peg 4200, and the second side wall 4232 is closest to the distal end 4220 of the peg 4200. In some forms, at least the first side wall 4231 is generally perpendicular to the end wall 4233 of the channel 4230. In this arrangement, where the locking peg 4200 is held vertically, the first side wall 4231 is generally horizontal and the end wall 4233 of the channel is generally vertical. However, the end wall 4233 of the channel need not be vertical, but could otherwise be sloped or even curved, such as concave. In a preferred form, the first side wall 4231 meets the end wall 4233 of the channel at a curved corner or a corner having an interior diagonal. This helps to provide additional strength to the peg 4200. Optionally, the second side wall 4232 is also generally perpendicular to the end wall 4233 or meets the end wall 4233 at a curved corner or a corner with an interior diagonal.

The locking peg comprises a distal end portion 4240 located between the engagement feature 4230 and the distal end or tip 4220 of the locking peg 4200. The distal end portion 4240 may be tapered toward the tip 4220. In some forms, the tapered distal end portion 4240 may be generally convex and may be conical, frusto-conical or bullnosed, as shown in FIG. 7. By providing a convex, conical or bull-nosed distal end portion 4240, only the very tip 4220 of the locking peg 4200 presses against the locking member 5410. This arrangement helps ensure that the distal end portion 4240 of the peg and the locking member 5410 can slide smoothly against each other.

The locking peg 4200 also comprises a pin housing 4250. The pin housing 4250 may comprise a first opening 4251 located at the proximal end 4210 of the peg 4200, a second opening 4252 located at the distal end 4220 of the peg 4220 and a hollow region extending between the first and second openings 4251, 4252. In some forms, the second opening 4252 is generally centrally located at the tip 4220 of the peg 4200. The pin housing 4250 is configured to slidingly receive a projecting element, such as a pin 4400 therein. To avoid confusion with other pin members disclosed, the projecting element/pin 4400 will be referred to as a latch pin 4400 in this specification.

The pin housing 4250 may also be configured to receive a stopper 4300 at the proximal end of the housing 4250, and a pin biasing member 4500 located between the stopper and the latch pin 4400. In some forms, the first opening 4251, adjacent the first portion of the pin housing 4250, may be an enlarged opening, having a width or diameter larger than that of the first portion 4253 of the pin housing. The enlarged first opening 4251 is configured to accommodate the enlarged head of a stopper 4300, such as a screw, threaded bolt, or nut. Where the pin housing 4250 is configured to receive a screw or threaded bolt, a portion of the interior of the housing 4250, near the proximal end 4210, is threaded to engage with the screw or threaded bolt.

The pin housing 4250 and/or the latch pin 4400 are configured to allow the pin 4400 to slide within the housing between an extended position and a retracted position, without the pin 4400 being inadvertently removed from the distal end of the locking peg 4200. The pin housing 4250 comprises an abutment 4255 and the latch pin comprises a contact surface 4430 that contacts the abutment 4255 when the latch pin is extended to prevent the latch pin from being removed from the distal end of the locking peg 4200. The configuration of the pin housing 4250, the abutment 4255, and the contact surface 4430 of the latch pin may take any suitable form, as will be appreciated by a person skilled in the art.

For example, in some forms, the pin housing 4250 comprises at least two portions: a first portion 4253 that extends from the proximal end 4210 of the locking peg and terminates at a stopping point part way along the length of the hollow region of the pin housing 4250; and a second portion 4254 that extends from the distal end 4220 of the peg 4200 and terminates at the stopping point. In one form, the width or diameter of the first portion 4253 is greater than the width or diameter of the second portion 4254. In some forms, the width or diameter of the first portion 4253 may be between about 4 mm to about 8 mm. In some forms, the width or diameter of the second portion 4254 may be between about 3 mmm to about 6.5 mm. In one embodiment, the first portion 4253 has a diameter of about 5 mm and the second portion 4254 has a diameter of about 3.2 mm.

An abutment 4255 may be provided at the stopping point between the first and second portions 4253, 4254. The abutment 4255 may be formed by a projection, such as a projecting lip, a flange, a collar, one or more projecting arms, or any other suitable projection that forms an abutment between the first and second portions 4253, 4254.

In some forms, the first and second portions 4253, 4254 are each generally cylindrical with the first portion 4253 having a greater diameter than that of the second portion 4254, such that a step is formed at the stopping point between the first and second portions 4253, 4254. The step forms an abutment 4255 and comprises an annular collar that defines the stopping point between the first and second portions 4253, 4254.

In another form, the first and second portions 4253, 4254 of the pin housing may have a width or diameter that is generally equivalent to the other, but the stopping point located between the first and second portions 4253, 4254 of the pin housing 4250 comprises an abutment 4255 formed by at least one projection extending from an inner surface of the pin housing. In some forms, the projecting abutment 4255 may comprise a projecting lip, flange, collar, rib, finger, a series of circumferentially arranged fingers, or any other suitable projection that extends into the pin housing to define a stopping point as being an area of reduced width or diameter within the pin housing 4250.

In some forms, as shown in FIGS. 6 and 7, the latch pin 4400 is an elongate pin comprising a first portion 4410 having a proximal end 4411, and a second portion 4420 having a distal end 4421. The latch pin comprises a contact surface that forms an abutment surface 4430 between the first and second portions 4410, 4420. The abutment surface 4430 is configured to press against the abutment 4255 of the pin housing 4250 when the latch pin 4400 is in the extended position. In some forms, the abutment surface 4430 may be provided by at least one projection that extends from the outer surface of the latch pin 4400 to define the boundary between the first and second portions 4410, 4420. In some forms, the first portion 4410 comprises a width or diameter greater than that of the second portion 4420 so that the abutment surface is defined by a step, collar, or sloping surface created by the difference in width or diameter between the first and second portions 4410, 4420. In some forms, the first portion 4410 may comprise a different shape to the second portion 4420, creating an abutment surface 4430 between the first and second portions 4410, 4420. In some forms, the latch pin 4400 may comprise a transverse cross-section (i.e., a cross-section transverse to its length) of any suitable shape and in which the transverse cross-section of the first and second portions 4410, 4420 of the pin 4400 may differ. For example, the first portion 4410 may have a generally elliptical transverse cross-section and the second portion 4420 may have a generally circular transverse cross-section. Regardless, the first portion of the latch pin 4400 may be configured to have a greater width or diameter than the second portion. In some forms, both the first and second portions 4410, 4420 of the latch pin 4400 have a generally circular transverse cross-section, such that the latch pin 4400 is generally cylindrical and comprises a first portion 4410 having a greater diameter than the second portion 4420. In this arrangement, an annular collar is defined between the first and second portions 4410, 4420. The annular collar provides a contact/abutment surface 4430.

The length of the latch pin 4400 may be about 10 mm to about 80 mm long and is preferably about 33 mm long. The width or diameter of the proximal end of the latch pin 4400 may be between about 3 mm and about 12 mm and is preferably about 4.8 mm. The width or diameter of the distal end of the latch pin 4400 may be between about 2 mm and about 10 mm and is preferably about 3 mm.

In one form, the first and second portions 4253, 4254 of the pin housing are generally cylindrical and the first and second portions 4410, 4420 of the latch pin are also generally cylindrical and have a slightly smaller diameter than the diameter of the respective portion of the pin housing 4250 to allow for a close, slidable fit that allows the latch pin to slide within the pin housing 4250, but generally prevents the latch pin 4400 from pivoting within the pin housing 4250.

Figure 7A:
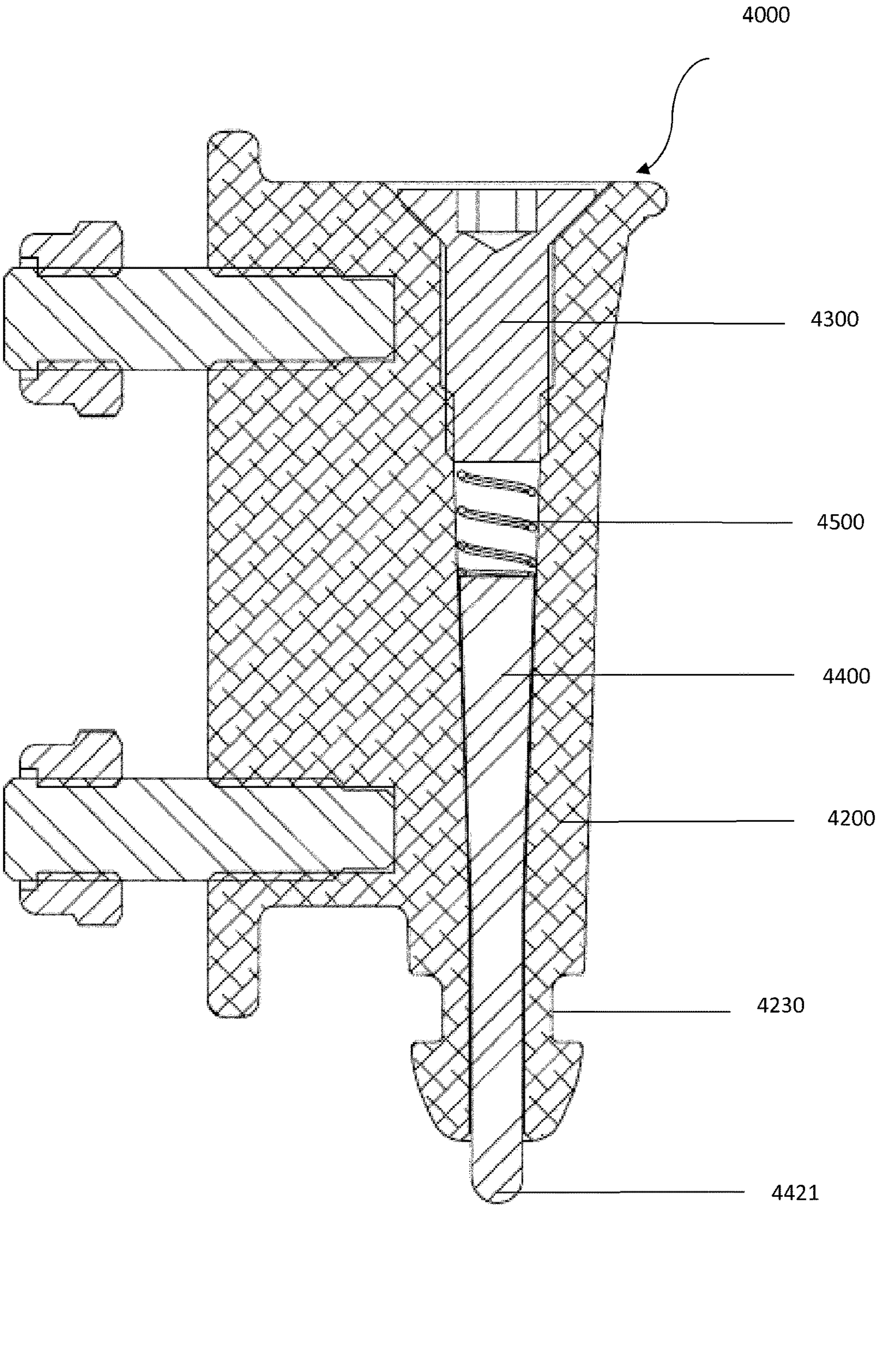
FIG. 7*a* is a cross-sectional side view of another form of locking peg and illustrates a generally conical locking peg and a bracket mount extending from one side of the locking peg, a conical latch pin having an exposed distal end portion extending from the distal end of the locking peg, a stopper at the proximal end of the locking peg, and a biasing member located between the latch pin and the backstop.

In yet another form, as shown in FIG. 7*a*, the first portion 4253 of the pin housing 4250 is generally conical, tapering toward the second portion 4254, which is generally tubular. A neck is formed at the intersection between the conical first portion and the tubular second portion of the housing 4250. A correspondingly shaped latch pin 4400 may be received within the pin housing 4250, the latch pin also comprising a first, conical portion 4410 and a second, tubular portion 4420. The tubular portion of the latch pin 4400 is longer than the tubular portion of the housing 4250. The latch pin may slide within the housing 4250, but in the extended position, the conical portion of the latch pin 4400 contacts the conical portion or neck of the pin housing 4250 to prevent the latch pin from being removed from the distal end of the locking peg 4200. Therefore, the conical portion or neck of the pin housing 4250 forms an abutment 4255 that is configured to abut a contact surface 4430 of the conical portion of the latch pin when the latch pin is in the extended position, in order to prevent removal of the latch pin 4400 from the pin housing 4250 via the distal end of the locking peg 4200.

The first portion 4410 of the latch pin 4400 may be configured to be located within the first portion of the pin housing 4250 and at least a majority of the second portion 4420 of the pin may be located within the second portion 4254 of the pin housing. Preferably, the shape and dimensions of the first and second portions 4253, 4254 of the pin housing compliment the shape and dimensions of the first and second portions 4410, 4420 of the latch pin 4400.

Although the pin 4400 preferably comprises a generally cylindrical distal end portion 4421, it should be appreciated that the pin may be of any suitable shape for engaging with the locking member 5410. For example, the distal end portion 4421 of the pin may comprise a generally square, elliptical, or hexagonal transverse cross-section.

Regardless of the shape of the latch pin 4400 and pin housing 4250, it is important that the pin 4400 can slide smoothly within the pin housing 4250, that an abutment surface 4430 is provided between the first and second portions 4410, 4420 of the pin, and an abutment 4255 is provided between the second portions of the pin housing. This arrangement allows the latch pin 4400 to be inserted within the pin housing 4250 from the proximal end 4210 of the peg 4200 such that the first portion 4410 of the pin is located within the first portion 4253 of the pin housing 4250. The abutment surface 4430 of the latch pin is configured to abut the abutment 4255 of the pin housing 4250 at the stopping point to prevent the latch pin 4400 from being removed through the opening 4252 at the distal end of the locking peg 4200. One the pin 4400 is located within the pin housing, the stopper 4300 prevents the pin from being retracted through the proximal end 4210 of the peg 4200.

The latch pin 4400 is movable between a first, extended position and a second, retracted position. The latch pin 4400 is biased to the extended position by the compressible pin biasing member 4500, which is located within the pin housing between the proximal end 4411 of the latch pin and the stopper 4300. The pin biasing member 4500 presses against the proximal end 4211 of the latch pin, pushing the pin 4400 toward the distal end of the locking peg 4200. In the retracted position, a majority of the latch pin 4400 or the whole of the latch pin is located within the pin housing 4250. In the extended position, the distal end portion of the latch pin 4400 projects from the distal end of the peg 4200. In preferred embodiments, the width or diameter of the distal end of the latch pin may be between about 2 mm to about 8 mm and is preferably about 3 mm.

The latch pin 4400 and pin housing 4250 may be configured so that the distal end portion 4421 of the latch pin 4400 projects from the distal end 4220 of the locking peg 4200 and through the second opening 4252 of the pin housing 4250 in the first/fully extended position. In some forms, the extent to which the latch pin 4400 projects from the tip of the peg 4200 in the fully extended position may be between about 2 mm to about 10 mm and is preferably about 3.8 mm. The projecting portion of the pin 4400 in the extended position defines the distal end portion of the pin 4400. The distal end portion 4421 of the latch pin 4400 is also configured to at least partially or fully retract into the pin housing 4250 in a second, retracted position when a compression force applied to the distal end 4421 of the pin 4400 overcomes the biasing force of the pin biasing member 4500.

The stopper 4300 located at the proximal end 4256 of the pin housing 4250 comprises a proximal end 4310 and a distal end 4320. In some forms, the stopper 4300 comprises a screw, threaded bolt, or a nut that engages with the interior surface of the pin housing 4250 to hold the stopper within the pin housing. The proximal end 4310 of the stopper 4300 is located at or near the proximal end 4256 of the pin housing and may comprise a hex head or square head, or the like, for fastening and removing the stopper 4300 to and from the pin housing 4250. In some forms, the stopper 4300 is held generally entirely within the pin housing 4250 to avoid the proximal end 4310 of the stopper projecting from the proximal end 4256 of the pin housing as this could cause the stopper 4300 to catch on the clothes or skin of a person. The proximal end 4310 of the stopper is accessible from the proximal end 4256 of the pin housing so that the stopper 4300 can be removed from the pin housing, if necessary. In preferred forms, the distal end 4257 of the stopper is generally blunt or flat to provide a stable contact surface with which to press against the pin biasing member 4500.

The pin biasing member 4500 is located within the pin housing 4250 between the distal end 4320 of the stopper and the proximal end 4210*a* of the latch pin 4400. In some forms, as shown in FIGS. 6 and 7, the pin biasing member 4500 is a compression spring, but in other forms the pin biasing member 4500 may be any suitable resilient member that is generally compressible but that will return to a generally uncompressed state after a compression force has been removed. Such biasing members 4500 may be formed of rubber, a resilient foam, or any other suitable material. The pin biasing member 4500 is configured to be compressed between the latch pin 4400 and the stopper 4300 when the distal end 4421 of the latch pin is pushed toward the stopper 4300 to at least partially retract the pin 4400 within the pin housing 4250. However, the resilient nature of the pin biasing member 4500 is such that once the compression force is released, the biasing member 4500 returns to its natural, uncompressed state and pushes the latch pin 4400 away from the stopper 4300 so that the distal end portion 4421 of the pin projects from the distal end 4220 of the peg, and through the second opening 4252 of the pin housing 4250, in the extended position. In other forms, the pin biasing member 4500 is held under compression between the stopper 4300 and the latch pin 4400 and is further compressed when the latch pin 4400 is pushed toward the stopper 4300. As the pin 4400 releases at least some of the compression force on the pin biasing member 4500, the biasing member 4500 pushes the pin 4400 away from the stopper 4300 so that the distal end portion 4421 of the pin projects from the distal end 4220 of the peg in the extended position. In effect, the pin biasing member 4500 biases the latch pin 4400 to the extended position.

Exemplifications of some forms of peg receiver 5000 according to the invention can be seen in FIGS. 8 to 16*c*. The peg receiver 5000 comprises the peg receiving opening 5200 and the lock assembly 5400. The peg receiving opening 5200 is typically sized and shaped to substantially correspond with the size and shape of the locking peg 4200 to accommodate the locking peg 4200 in a slidable, but snug fit.

The length of the peg receiving opening 5200 may optionally be between about 15 mm to about 90 mm and is preferably about 45 mm long.

Figure 8:
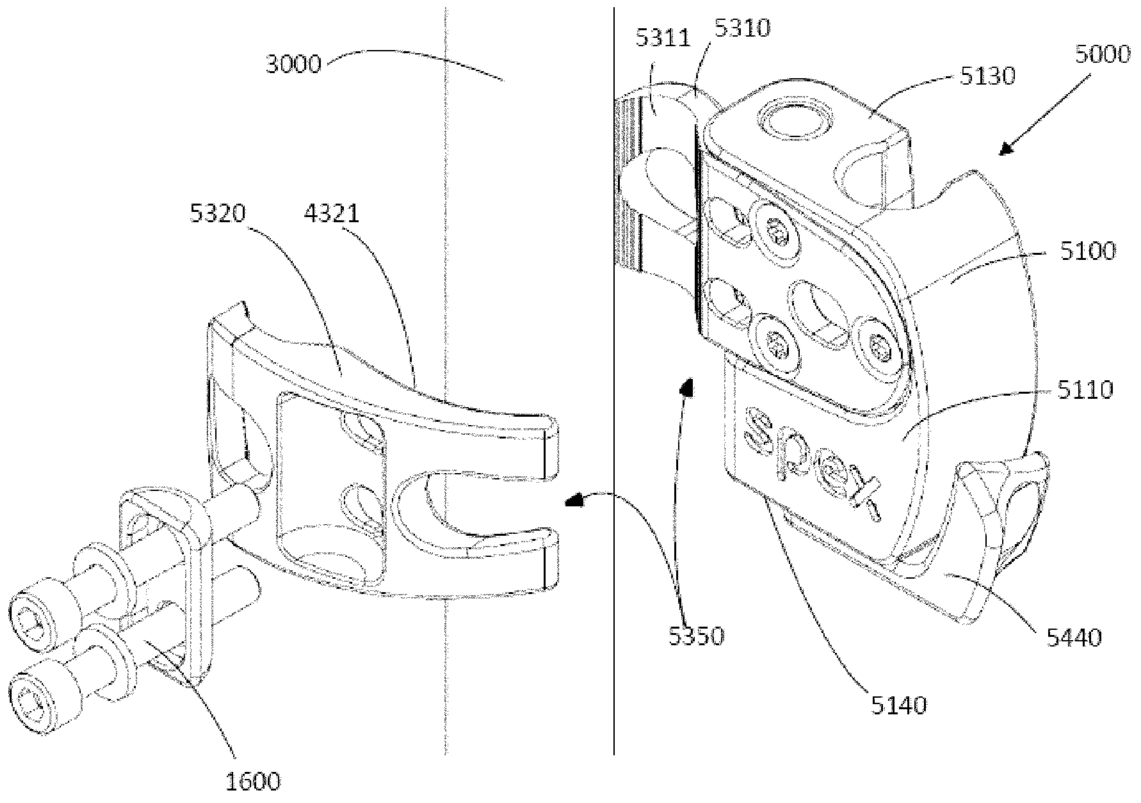
FIG. 8 is an isometric semi-exploded view showing one form of peg receiver of the invention and a pair of exemplary clamping members that clamp a peg receiver to the curved outer surface of the respective wheelchair post.
Figure 9:
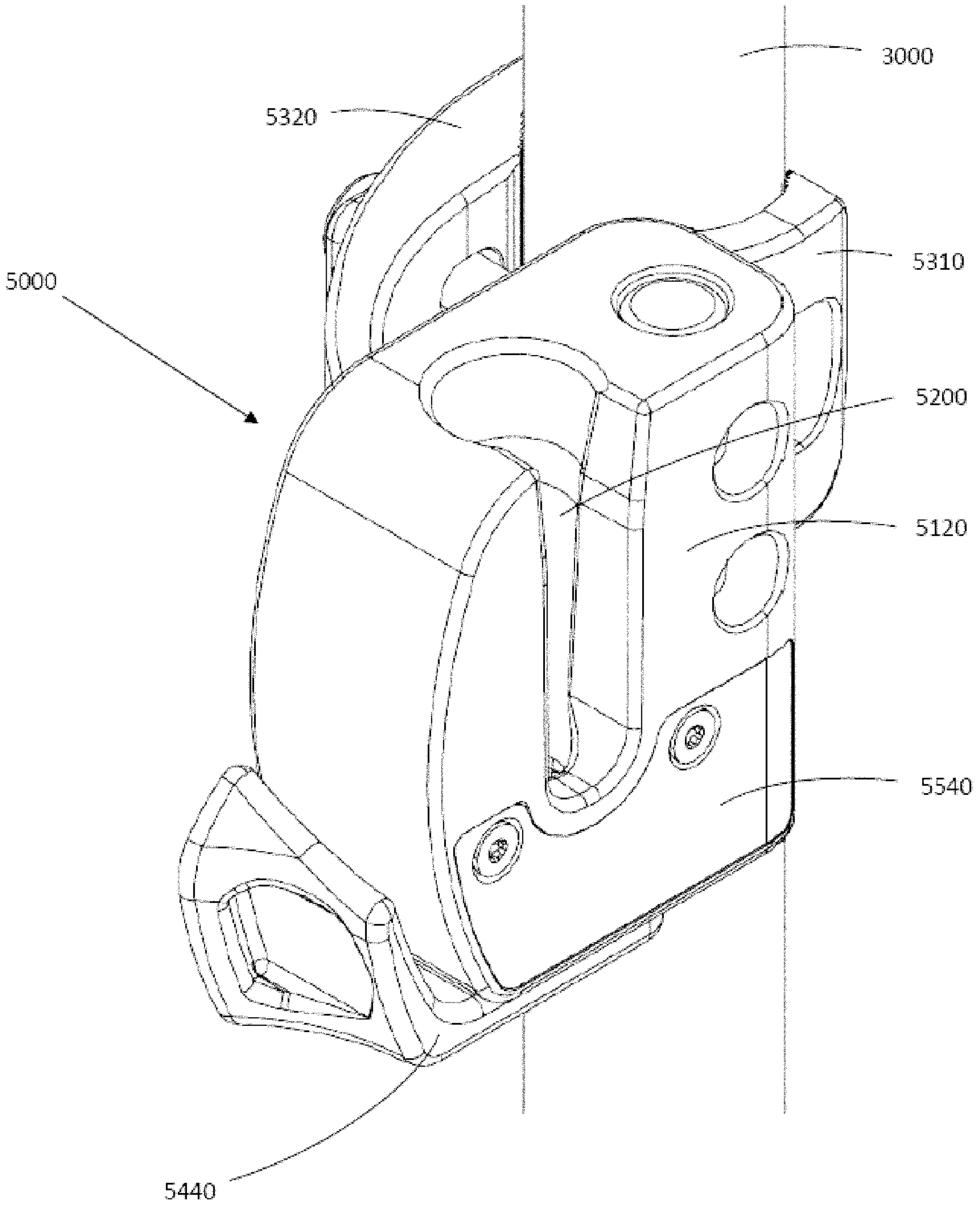
FIG. 9 is an isometric view of the arrangement of FIG. 8 shown from another side and in which the clamping members are attached to the peg receiver and clamp around the wheelchair post.
Figure 10:
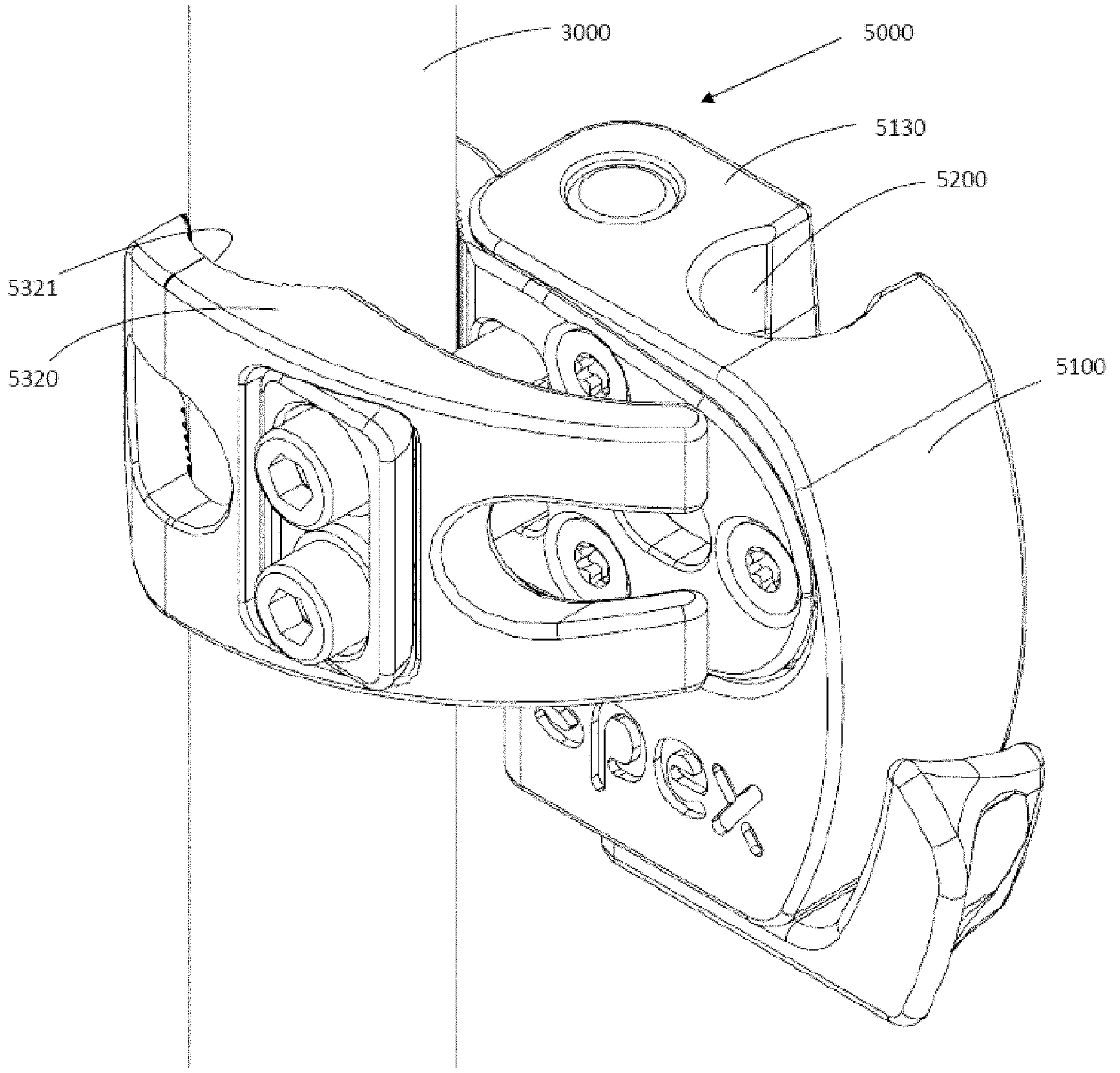
FIG. 10 is an isometric view of the arrangement of FIG. 9 from another side.
Figure 11:
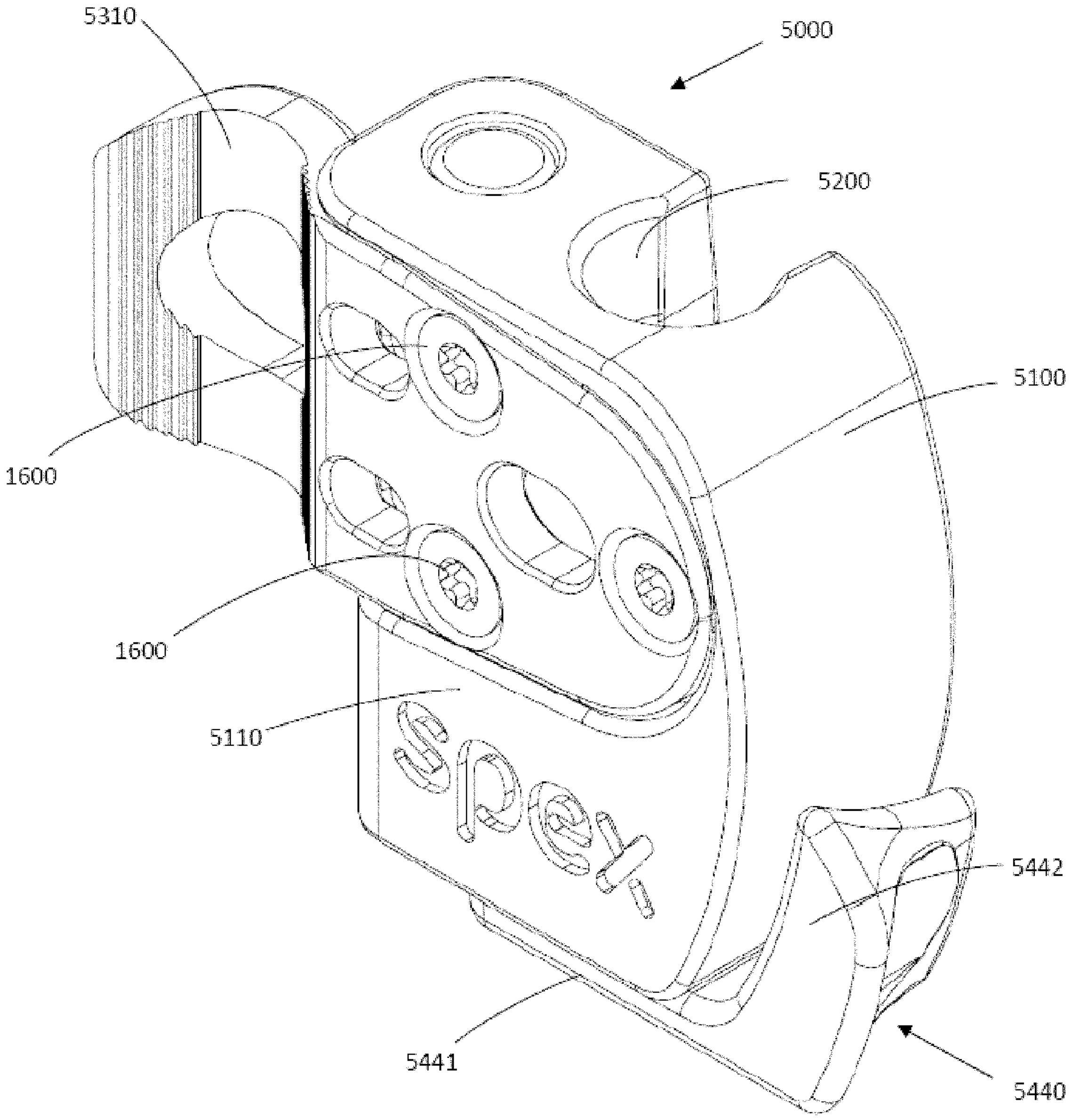
FIG. 11 is an isometric side view of the peg receiver of FIG. 8 to which one clamping member is attached.

As shown in FIGS. 8 to 10, the peg receiver 5000 may be configured to be mounted to one of the posts 3000 of the wheelchair. Any suitable attachment system 5300 may be used to attach the peg receiver 5000 to a post 3000 (or backrest). Typically, a clamping attachment system is used. In some forms, the peg receiver 5000 comprises a pair of first and second clamping arms 5310, 5320 to at least partially surround the circumference of the post 3000 from opposite sides, as shown in FIGS. 8 to 10. Each clamping arm 5310, 5320 comprises a curved, concave region 5311, 5321 located on an inner surface of the clamping arm. Each curved inner region 5311, 5321 is configured to partially surround a portion of the post 3000 and each clamping arm 5310, 5320 is located on opposing sides of the post such that the curved inner regions 5311, 5321 of both clamping arms together surround a majority of the circumferential outer surface of the post 3000, thereby increasing the clamping effect applied to the post when the arms 5310, 5320 are urged together. In some forms, the curved profile of the curved region 5311, 5321 generally corresponds with the curved circumferential profile of the post 3000 to maximise the contact surface area between the clamping arm 5310, 5320 and post 3000 when the clamping arms clamp around the post.

Both clamping arms 5310, 5320 are attached to the peg receiver 5000 by any suitable attachment system 5350. In some forms, the clamping arms 5310, 5320 are attached to the peg receiver 5000 with fasteners 5600 that can be tightened to urge the arms 5310, 5320 toward each other in order to clamp the arms to the respective post 3000.

Figure 12:
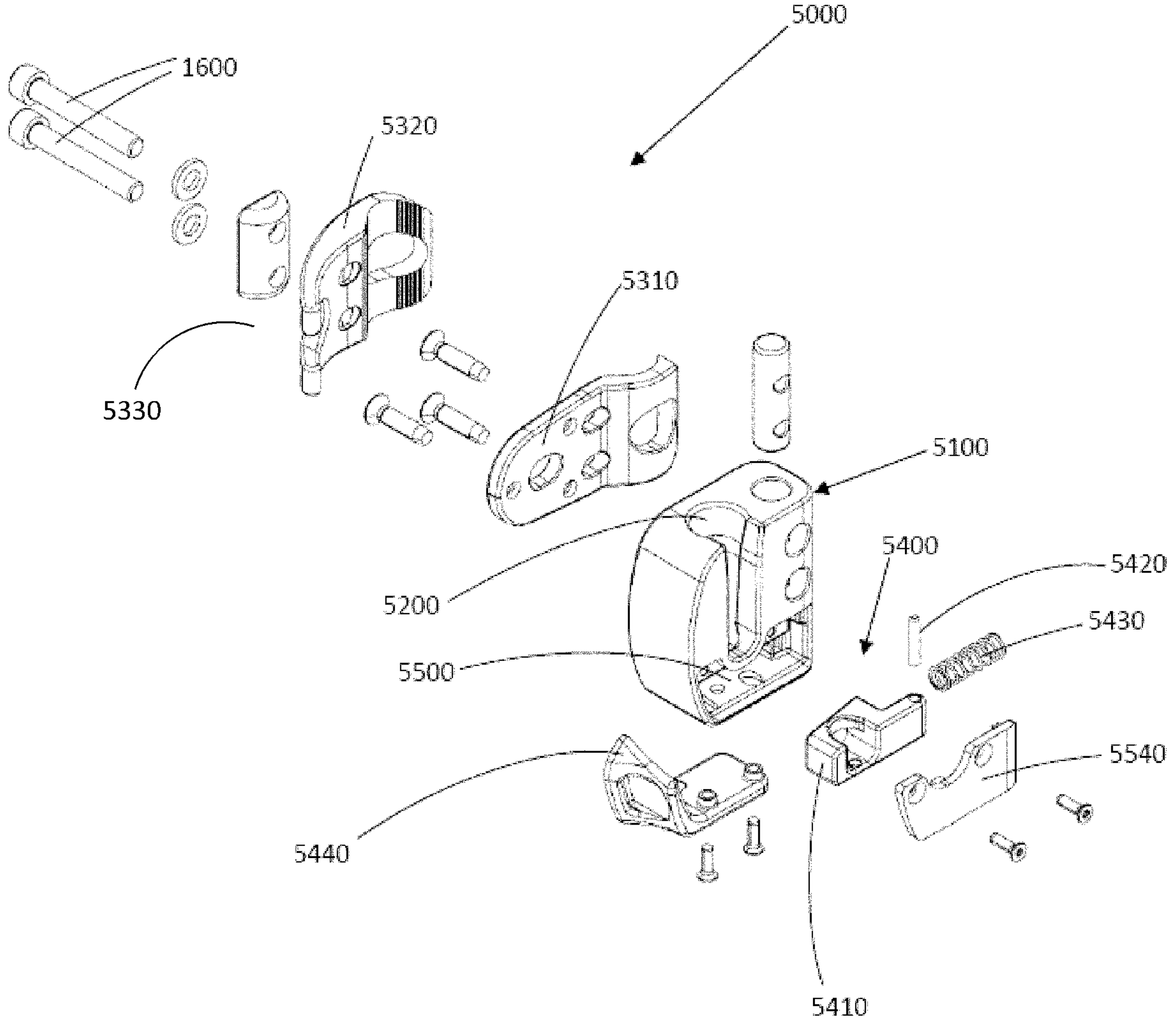
FIG. 12 is an exploded view of one form of peg receiver according to the invention and a pair of first and second clamping members to be attached to the peg receiver by fasteners, the peg receiver comprising one form of lock assembly comprising a locking member, a pivot pin, a lock biasing member, and an unlocking element.

In some forms, as shown in FIGS. 8 and 12, the first clamping arm 5310 is attached to a first side 5110 (such as an inner side) of the peg receiver 5000 by any suitable form of attachment, such as by one or more fasteners 5600. The second clamping arm 5320 is also attached to the first side 5110 of the peg receiver 5000, such as by one or more fasteners and preferably by a pair of fasteners 5600, such as screws or bolts. The clamping arms 5310, 5320 are arranged in opposing relationship so that the curved region 5311, 5321 of each clamping arm generally opposes the curved region of the other clamping arm to form a hollow between. The wheelchair post 3000 is located in the hollow in between the curved regions 5311, 5321 of the clamping arms. By tightening the fasteners 5600 on the second clamping arm 5320, the second clamping arm is caused to move toward the first clamping arm 5310 to cause the clamping arms to clamp tightly around the post 3000 in a clamped position to hold the peg receiver 5000 to the post, as shown in FIG. 9.

To reposition the peg receiver 5000, the fasteners 5600 of the second clamping arm 5320 are loosened to an unclamped position to allow the second clamping arm to be removed from the peg receiver 5000 in order to release the receiver 5000 from the post 3000. In yet another form, the first clamping arm 5310 or the second clamping arm 5320 may be fixed to the peg receiver 5000, such as by welding, bonding or heat staking for example.

The clamping arms 5310, 5320 may be removed from the peg receiver 5000 and replaced with different clamping arms having curved regions of a different profile (shape and/or dimensions) to attach to wheelchair posts 3000 having an outer surface with a different curved profile. In this way, the peg receiver 5000 can be readily attached to wheelchair posts 3000 of different diameters. In other forms, a swivel pin 5330 may be provided between the clamping arms 5310, 5320 to provide a fulcrum about which the clamping arms can pivot such that the arms 5310, 5320 can be positioned at various angles relative to each other to accommodate different sized posts 3000.

The peg receiving opening 5200 of the peg receiver 5000 is configured to receive at least a portion of the locking peg 4200 therein. In some forms, the opening 5200 is located on an upper side 5130 of the peg receiver 5000 and extends downwardly toward a bottom side 5140 of the receiver 5000. In some forms, such as where the bracket mount 4100 is attached along a first side of the locking peg 4200, the peg receiving opening 5200 may be exposed to a second side 5120 (an outer side) of the peg receiver 5100, the second side 5120 being generally opposite to the first side 5110, as shown in FIG. 9.

In some forms, at least a portion of, and preferably the whole of, the peg receiving opening 5200 is shaped and dimensioned to generally compliment the shape and dimensions of the locking peg 4200. In some forms, the peg 4200 is generally cylindrical and the peg receiver 5200 is also generally cylindrical and slightly larger than the peg to accommodate the peg in a close, slidable fit. In other forms, as shown in FIGS. 3, 7 and 9, the peg 4200 is generally conical and the peg receiving opening 5200 is also generally conical and slightly larger than the peg to accommodate the peg in a close, slidable fit. In each form, the bracket mount 4100 of the locking peg 4200 may project through the exposed portion of the peg receiving opening 5200, as shown in FIGS. 1 and 4, or the bracket mount may extend from the opening 4251 at the upper side of the peg receiver 5000.

Figure 13:
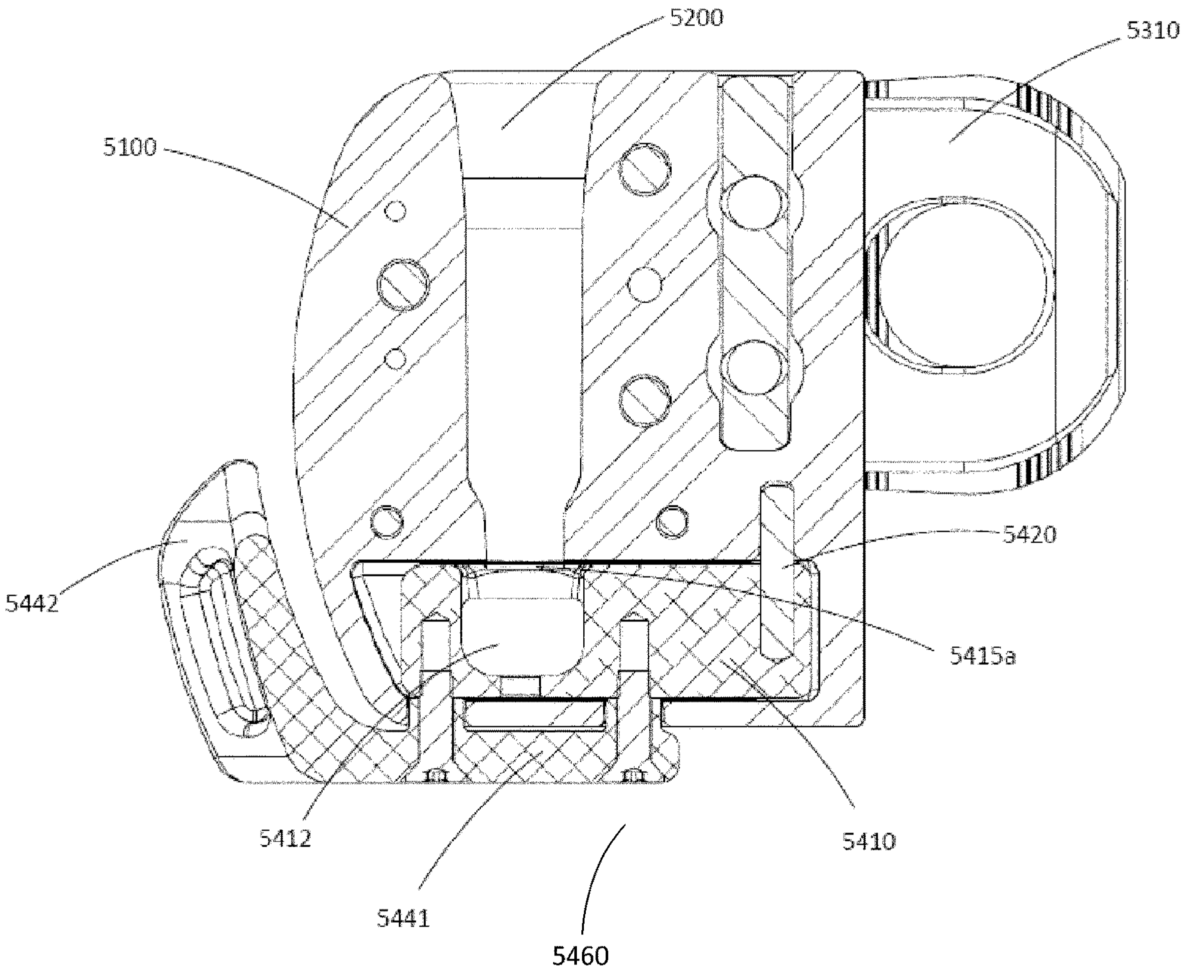
FIG. 13 is a cross-sectional side view of the peg receiver of FIG. 12 in an assembled state.

In some forms, the peg receiver 5000 comprises a lock housing 5500 for housing the lock assembly or at least the locking member 5410. As shown in FIGS. 12 and 13, in some forms, the lock housing 5500 is located beneath the peg receiving opening 5200. An opening is formed between the peg receiving opening 5200 and the lock housing 5500 to allow the distal end portion 4240 of the locking peg to project into the lock housing 5500 and to allow the locking member 5410 to engage with the locking peg 4200. The locking member 5410 engages with the locking peg 4200 in the locked position and disengages with the locking peg in the unlocked position. However, as will be described later in this document, the locking member 5410 may engage with the latch pin 4400 in both the locked and unlocked positions.

In some forms, the lock housing 5500 houses the moveable locking member 5410 and a lock biasing member 5430. Where the locking member is pivotable, the lock housing 5500 may also house a pivot pin about which the locking member 5410 may pivot.

The lock housing 5500 preferably comprises an opening at one side, such as at the second side 5120 of the peg receiver 5000, through which a user can access the lock housing 5500 and the lock assembly 5400.

The peg receiver 5000 may also include a cover plate 5540 that covers the exposed side 5530 of the lock housing 5500 and is removably attached to the peg receiver 5000 by removable fasteners, such as screws or the like. Removing the cover plate 5540 allows access to the interior of the lock housing 5500 and the components of the lock assembly 5400.

Preferred forms of lock assembly 5400 will now be described. The lock assembly 5400 comprises a moveable locking member 5410. In some forms, the locking member is a pivotable locking member 5410. In other forms, the locking member is a slidable locking member 5410. The lock assembly may also comprise a pivot pin 5420 (for the pivotable locking member embodiment) located at a pivot point and about which the (pivotable) locking member 5410 can pivot. Additionally, the lock assembly comprises a lock biasing member 5430 to bias the locking member 5410 to a locked position, and an unlocking element 5440 for a user to toggle the locking member 5410 between the locked and unlocked positions.

In one form, as shown in FIGS. 12 to 15, the lock assembly comprises a pivotable locking member 5410 that pivots about a pivot pin 5420 to move between the locked and unlocked positions. The pivot pin 5420 may be located in the lock housing 5500 at any suitable position. For example, the pivot pin 5420 may be located generally centrally or toward one end of the lock housing 5500. In FIG. 12, the pivot pin 5420 is located near a one end, such as a rear end, of the lock housing 5500 and between the first and second sides of the peg receiver 5000. The pivot pin 5420 may extend the full height of the lock housing 5500 or may extend across only a portion of the height of the lock housing. In FIGS. 12 and 13, a portion of the pivot pin 5420 is located within a body of the peg receiver 5000 and a portion of the pivot pin 5420 extends into the lock housing 5500. The pivot pin 5420, as shown, extends generally vertically from the top of the lock housing 5500 and toward the bottom of the lock housing 5500, but does not contact the bottom of the lock housing. In other forms, the pivot pin 5420 may extend generally vertically and across the full height, between the top and bottom, of the lock housing 5500.

Figure 12A:
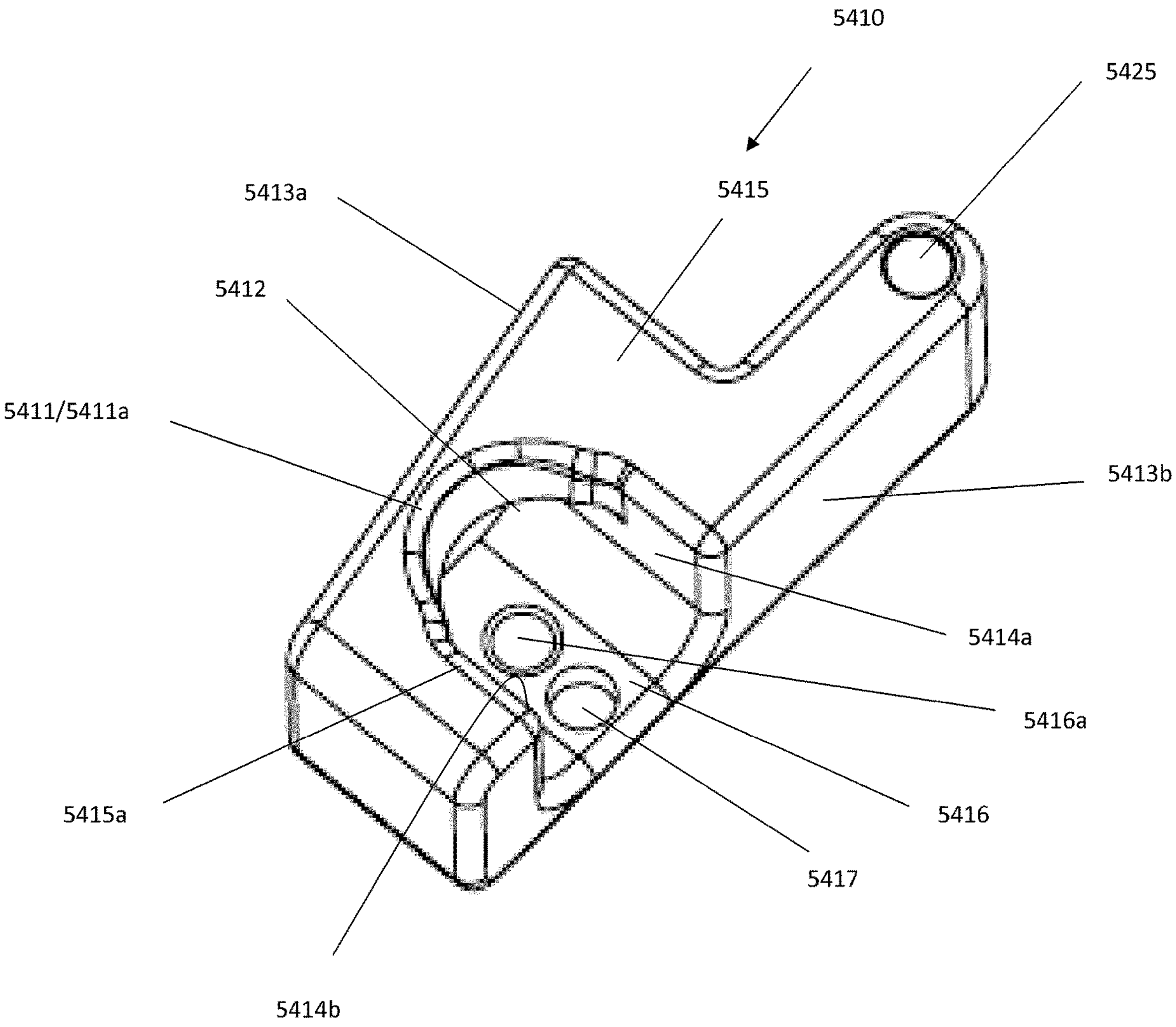
FIG. 12*a* is an enlarged view of the locking member of FIG. 12 that includes a pivot pin aperture for engaging with a pivot pin to allow the locking member to pivot between the locked and unlocked positions.

In some forms, the pivotable locking member 5410 comprises a body 5413, as shown in FIG. 12*a*. The body 5413 may comprise at least a first side wall 5413*a* that may form a rear surface of the locking member and a second side wall 5413*b* that may form a front surface of the locking member 5410. The locking member 5410 may also comprise a top wall 5415 and a bottom wall 5416. The height of the locking member 5410 from the inside/upper surface of its bottom to the top, upper surface may be between about 5 mm to about 30 mm, and is preferably about 10 mm.

In some forms, as shown in FIG. 12*a*, the pivotable locking member 5410 further comprises a pivot pin aperture 5425, such as a bore, within which a pivot pin 5420 is received. Where the pivot pin 5420 is located generally centrally within the lock housing 5500, the pivot pin aperture 5425 may be located generally centrally on the locking member body 5413. Similarly, where the pivot pin 5420 is located near one end of the lock housing 5500, the pivot pin aperture 5425 may be located near one end of the locking member body 5413. In the embodiment of FIGS. 12 and 13, the pivot pin 5420 is located near one end (the rear end) of the lock housing 5500 and so the pivot pin aperture 5425 is located near one end (such as the rear end) of the locking member body 5413.

In some forms, as shown in FIG. 12, the pivotable locking member 5410 comprises an enlarged body portion 5413 and a pivot arm 5418 that extends from the body portion 5413 at one end of the locking member 5410. A pivot pin aperture 5425 for receiving a pivot pin 5420 may be located near the distal end of the pivot arm 5418, farthest from the body portion 5413. The pivot pin 5420 engages with a pivot pin receiver within the lock housing 5500. The pivot pin receiver may be a recess or an opening in the lock housing for receiving at least a portion of the pivot pin 5420 therein.

Figure 12B:
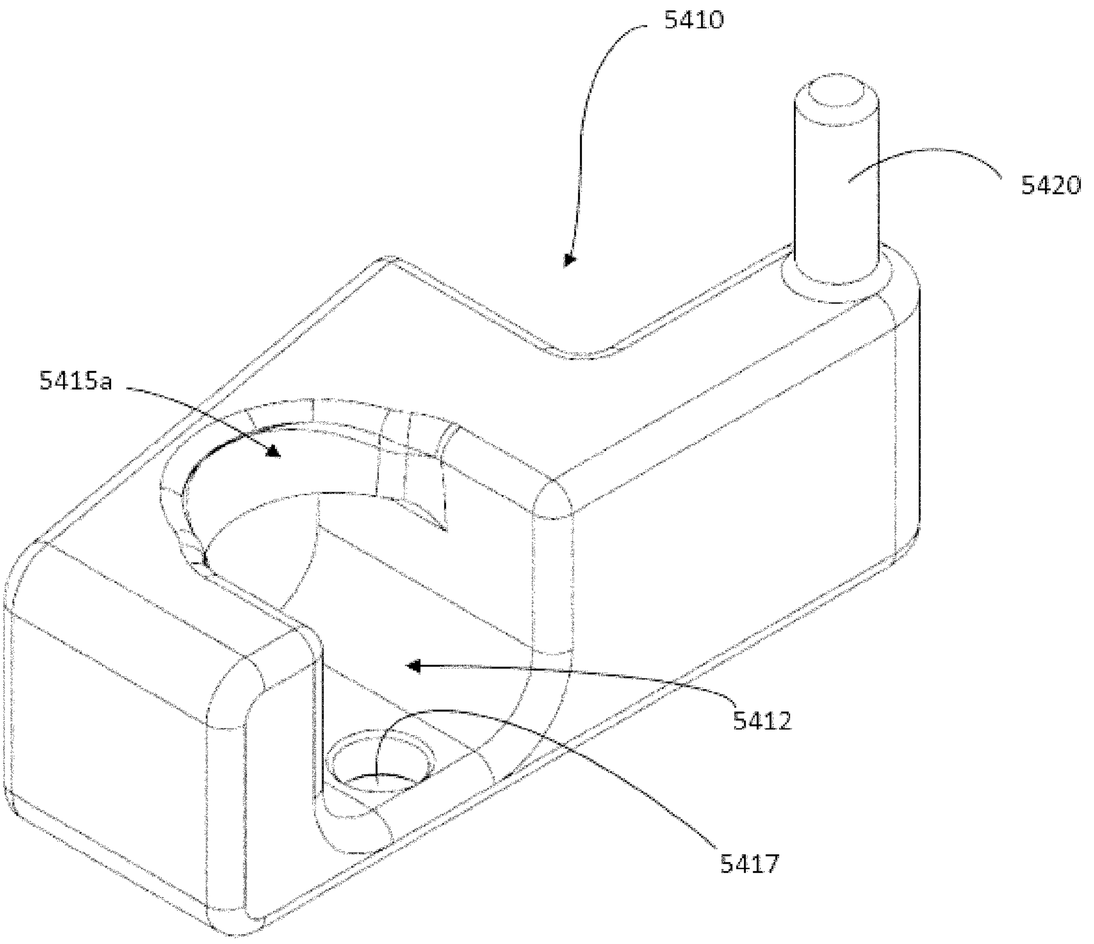
FIG. 12*b* is an enlarged view of another form of locking member of the invention that includes an integral pivot pin to allow the locking member to pivot between the locked and unlocked positions.

In other forms, as shown in FIG. 12*b*, the pivotable locking member 5410 and pivot pin 5420 are integrally formed as a single part. In these forms, the pivot pin may comprise a cylindrical boss that extends above and/or below the locking member and engages with a pivot pin receiver of the lock housing 5500. The pivot pin receiver may be a recess or an opening in the lock housing for receiving at least a portion of the pivot pin 5420 therein.

Figure 15:
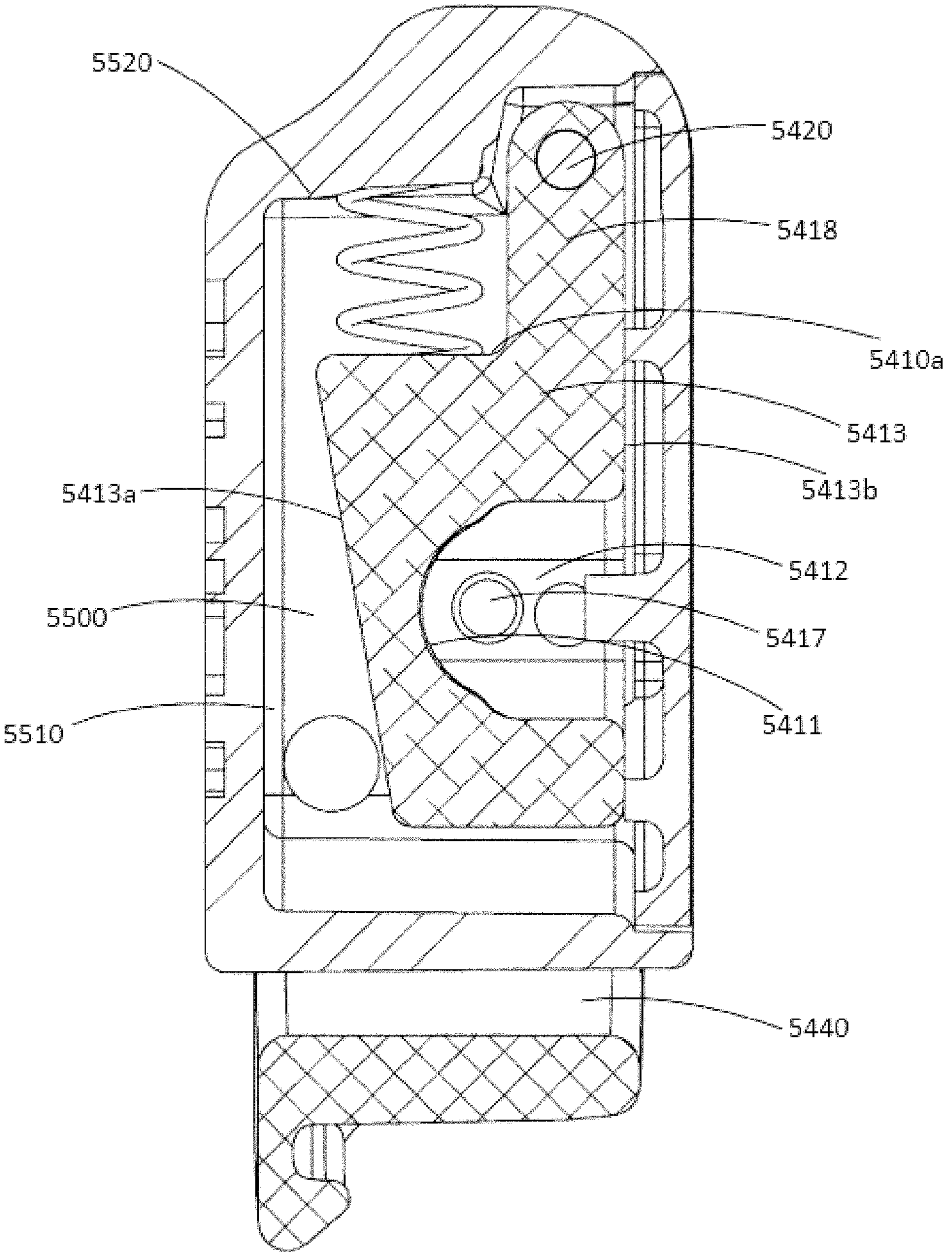
FIG. 15 is a cross-sectional top view of the peg receiver of FIG. 13 and in which the locking member and lock assembly are in the locked position.
Figure 15A:
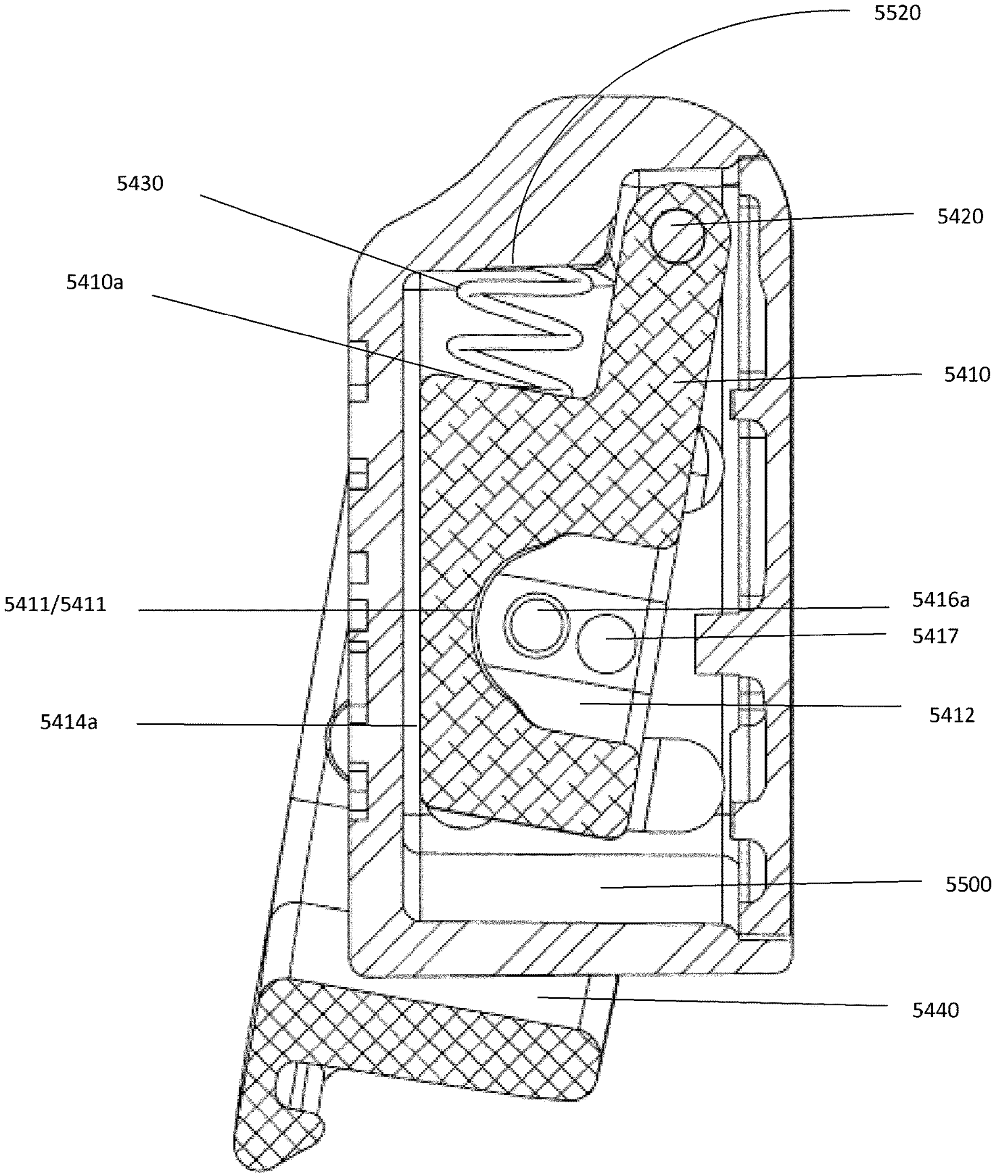
FIG. 15*a* is a cross-sectional top view of the peg receiver of FIG. 13 and in which the locking member and lock assembly are in the unlocked position.

The pivotable locking member 5410 is configured to pivot about the pivot pin 5420 between the locked position and the unlocked positions, as shown in FIGS. 15 and 15*a*. Where the pivot pin 5420 extends generally vertically, as shown in FIGS. 12 and 13, the locking member 5410 pivots generally horizontally about the pin 5420 between the locked and unlocked positions. In this form, the first side 5413*a* of the locking member body is optionally angled to abut a first side wall 5510 of the lock housing 5500 when the locking member 5410 is in the unlocked position, as shown in FIG. 15*a*.

In another form, the lock assembly may be arranged so that the pivot pin 5420 extends along a diagonal and the locking member 5410 pivots on a diagonal about the pin 5420 between the locked and unlocked positions. In yet other forms, the lock assembly may be arranged so that the pivot pin 5420 extends generally horizontally and the locking member 5410 pivots generally vertically about the pin 5420 between the locked and unlocked positions.

The pivotable locking member body 5413 comprises at least one supporting element 5414*a* and a catch 5411 that is supported by the supporting element. The catch 5411 is configured to engage with the lock engagement feature 4230 of the locking peg when the locking member 5410 is in the locked position. The catch 5411 may be of any suitable form for engaging with the lock engagement feature 4230. Typically, the catch 5411 comprises a projection that projects from the supporting element 5414*a*. In some forms, the catch faces in the direction of the locking peg 4200 when the locking member 5410 is in the locked position.

Generally, the pivotable locking member 5410 comprises a body 5413 that forms a pivoting locking arm/lever that comprises a catch 5411 configured to engage with the locking peg 4200 from one side, such that the catch 5411 curves or hooks around a portion of the locking peg 4200 when the locking member 5410 is in the locked position. However, it will be appreciated by a person skilled in the art that the body 5413 of the pivotable locking member 5410, or of the sliding locking member 5410, and the catch 5411 may take many suitable forms, such that the catch 5411 may engage with the lock engagement feature 4230 of the locking peg 4200 in the locked position.

In some forms, as shown in FIGS. 12*a* and 12*b*, the pivotable locking member 5410 comprises a body 5413 comprising a top 5415 and a bottom 5416. The bottom 5416 forms a retaining element. The catch 5411 is located at the top 5415 of the pivotable locking member 5410 and forms a projection that projects from a side wall 5414*a* of the of the locking member body and faces toward a peg opening 5415*a*. The peg opening 5415*a* is located at the top of the locking member 5410 and is partially defined by the catch 5411. The peg opening 5415*a* is configured to allow the distal end portion 4240 of the locking peg to pass through the opening 5415*a*. In some forms, the catch 5411 comprises an arcuate member projecting from the first side wall/support element 5414*a* and extending between the first side wall 5414*a* and the second side wall 5414*b*. In this arrangement, the first side wall 5414*a* forms the first supporting element and the second side wall 5414*b* forms a second supporting element.

In some forms, the catch 5411 is configured to project into an engagement feature 4230 comprising a detent, recess, or aperture when the locking member 5410 is in the locked position.

The retaining member of the pivotable locking member 5410 comprises a lock stop 5417. In some forms, the pivotable locking member comprises a bottom/base 5416 that forms the retaining member and comprises a lock stop 5417.

The pivotable locking member 5410 comprises a cavity 5412, formed between the catch 5411 and the retaining member/base/bottom 5416. The cavity 5412 is configured to receive the distal end portion 4240 of the locking peg therein when the peg 4200 is fully received within the peg receiver 5000.

In the embodiments shown in FIGS. 12*a* and 12*b*, the catch 5411 is distanced from the retaining element/base 5416 of the locking member to form a cavity 5412 between the side walls/supporting elements 5414*a* and 5414*b*, the catch 5411 and the base 5416 of the locking member body 5413. In this arrangement, the supporting elements 5414*a*, 5414*b*, catch 5411 and the retaining element/base 5413 form a cup-like arrangement. In other forms, the projecting catch 5411 may be located between the top 5415 and base 5416 of the locking member 5410.

In the embodiment shown in FIG. 12*a*, the cavity 5412 is at least in part defined by the first side wall 5414*a* and the generally opposing second side wall 5414*b*. The cavity 5412 comprises an opening 5414*c* at one side of the locking member to allow the locking member 5410 to pivot away from the locking peg 4200 even when part of the distal end portion 4240 of the peg remains within the cavity 5412. Preferably, the side opening 5414*c* of the locking member 5410 is located generally opposite the direction in which the catch 5411 faces. In the embodiment of FIG. 12, the interior cavity 5412 comprises a truncated generally hemispherical cavity within the locking member 5410 and comprises a peg opening 5415*a* that forms an opening in both the top and side of the locking member body, such that the opening extends across a portion of the top 5415 and down one side 5413*b* of the locking member body 5413.

The projecting catch 5411 of the pivotable locking member of FIGS. 12*a* and 12*b*, at least in part defines the peg opening 5415*a* and the interior cavity 5412 beneath the catch 5411. The peg opening 5415*a* provides an opening to the interior cavity 5412 of the locking member, the interior cavity 5412 being configured to receive the distal end portion 4240 of the locking peg 4200 therein.

In some forms, the projecting catch 5411 comprises an arcuate lip or collar that terminates at the peg opening 5415*a*. In some forms, the catch 5411, and therefore also the peg opening 5415*a*, has a tapered edge 5411*a* such that the underside of the projecting catch 5411 extends further than the upper side of the catch 5411. In other words, the edge 5411*a* slopes toward a central region of the cavity 5412. The tapered edge 5411*a* helps to guide the distal end portion 4240 of the locking peg 4200 through the peg opening 5415*a* and into the cavity 5412 of the locking member 5410 when the peg 4200 is inserted into the peg receiver 5000. In other forms, the projecting catch 5411 may comprise one or more arms or other forms of projection that extend from the supporting element/side wall of the cavity 5412 to engage with the locking peg 4200. Again, the projecting catch 5411 may comprise a tapered edge to help guide the distal end portion 4240 of the locking peg into the cavity 5412.

In some forms, the tapered outer surface of the locking peg tip 4240 is configured to press against a tapered edge 5411*a* of the locking member catch 5411 to push the locking member aside as the locking peg 4200 is inserted into the peg receiving opening 5200. The interaction between the distal end portion 4240 of the peg 4200 and the locking member catch 5411 will be described in further detail later in this specification.

The lock stop located at the retaining element/base 5416 of the locking member 5410 may comprise an aperture, recess, slot, opening, hole, or the like to engage with the distal end 4421 of the latch pin 4400 when the locking member 5410 is in the unlocked position in order to hold the locking member 5410 in the unlocked positions. The depth of the lock stop aperture 5417 may be about 1 mm to about 10 mm and is preferably about 2 mm.

The lock stop 5417 is located off-centre on the retaining element/base 5416 and farthest from the catch 5411. In the embodiment shown in FIG. 12, the lock stop 5417 is located on the base 5416 near the open side 5419 of the locking member cavity 5412, preferably generally opposite the catch 5411.

The lock stop 5417 is positioned so that when the locking member 5410 is in the unlocked position, the distal end portion 4421 of the latch pin 4400 aligns with the lock stop 5417. The pin biasing member 4500 urges the distal end portion 4421 of the latch pin 4400 away from the distal end 4420 of the locking peg 4200, such that the distal end portion 4421 of the latch pin 4400 extends and engages with the lock stop 5417, thereby holding the locking member 5410 in the unlocked position to allow for easy retraction of the locking peg 4200 from the peg receiving opening 5200.

In some forms, as shown in FIG. 12*a*, the retaining element 5416 of the locking member further comprises a lock support 5416*a* that comprises a detent, recess, concave dimple, or the like that generally aligns with the distal end of the latch pin 4400 when the locking member 5410 is in the locked position. In this arrangement, the distal end portion 4421 of the latch pin 4400 may, in part, engage with the lock support 5416*a* in the locked position to help hold the locking member 5410 and the lock assembly in the locked position. To unlock the lock assembly of this embodiment, a user must apply sufficient force to overcome the biasing force of the pin biasing member 4500, thereby, pushing the distal end of the latch pin 4400 out of the lock support detent 5416*a* so that the latch pin 4400 can slide across the retaining element 5416 until the pin 4400 engages with the lock stop 5417 when the locking member 5410 reaches the locked position.

In yet another form, as shown in FIGS. 16, 16*a*, 16*b* and 16*c*, the lock assembly 5400 comprises a slidable locking member 5410. The slidable locking member comprises a body 5413 comprising a catch 5411 projecting from a supporting element 5414*a* in a first direction. The body 5413 also comprises a retaining element 5416 that projects from the supporting element 5414*a* in the first direction. In some forms, the retaining element 5416 forms a base/bottom of the locking member body 5413.

A cavity 5412 is provided between the catch 5411 and the retaining element 5416. The cavity 5412 is configured to receive the distal end portion 4240 of the locking peg 4200 when the peg 4200 is fully received within the peg receiving opening 5200. The cavity 5412 is in communication with the peg receiving opening 5200 such that the distal end of the peg receiving opening 5200 aligns with the cavity 5412 as the peg 4200 is inserted into the peg receiver 5000. The transition point at which the peg receiving opening 5200 meets the cavity 5412 may be referred to as a peg opening 5415*a*. In some forms, the peg opening 5415*a* is formed in the top of the locking member body 5413.

In some forms, the supporting element of the slidable locking member 5410 comprises a first wall 5414*a*. The locking member body 5410 also comprises a top wall that comprises a peg opening 5415*a*, and a bottom/base that forms a retaining element 5416. The catch 5411 projects in the first direction and terminates at a distal end that at least partially defines the peg opening 5415*a*. The retaining element 5416 may be dimensioned to project beyond the terminal end of the catch 5411 in the first direction.

In some forms, as shown in FIGS. 16, 16*a*, 16*b* and 16*c*, the slidable locking member body 5413 comprises a top wall comprising the catch 5411, a bottom wall 5416 forming the retaining element, and also comprises side walls 5410*b*, 5410*c*, 16*a*, so that an interior cavity 5412 is provided between the catch/top 5411, retaining element/bottom 5416, and side walls 5410*b*, 5410*c*. The interior cavity 5412 may be accessed via the peg opening 5415*a*, which may be located in the top wall of the locking member body and may be defined at least in part by the catch 5411.

In some forms, the projecting catch 5411 comprises an arcuate lip or collar that terminates at the peg opening 5415*a*. In some forms, the catch 5411, and therefore also the peg opening 5415*a*, has a tapered edge 5411*a* such that the underside of the projecting catch 5411 extends further from the first wall than the upper side of the catch 5411. In other words, the edge 5411*a* slopes toward a central region of the cavity 5412. The tapered edge 5411*a* helps to guide the distal end portion 4240 of the locking peg 4200 through the peg opening 5415*a* and into the cavity 5412 of the locking member 5410.

The retaining element comprises a lock stop 5417, which may comprise an aperture, recess, slot, opening, hole, or the like. The lock stop 5417 is configured to receive the distal end portion 4240 of the latch pin 4400 when the locking peg 4200 is located within the peg receiving opening 5200, the latch pin 4400 is in the extended position, and the locking member 5410 is in the unlocked position. Again, the depth of the lock stop aperture 5417 may be about 1 mm to about 10 mm and is preferably about 2 mm.

Again, in some forms, the retaining element 5416 of the locking member further comprises a lock support 5416*a*, which may comprise a detent, recess, concave dimple, or the like that generally aligns with the distal end of the latch pin 4400 when the locking member 5410 is in the locked position. In this arrangement, the distal end portion 4421 of the latch pin 4400 may, in part, engage with the lock support 5416*a* in the locked position to help hold the locking member 5410 and the locking assembly in the locked position. To unlock the lock assembly of this embodiment, a user must apply sufficient force to overcome the biasing force of the pin biasing member 4500, thereby, pushing the distal end of the latch pin 4400 out of the lock support 5416*a* so that the latch pin 4400 can slide across the retaining element 5416 until the pin engages with the lock stop 5417 when the locking member 5410 reaches the locked position.

When the distal end portion of the locking peg 4200 is received within the cavity 5412, the catch 5411 is configured to slidingly engage with the engagement feature 4230 of the locking peg 4200 when the locking member 5410 is in the locked position. In some forms, the engagement feature 4230 is a detent formed near the distal end of the locking peg and the catch 5411 engages with the detent in the locked position by projecting into the detent to prevent the locking peg 4200 from being pulled out of the peg receiving opening 5200.

Figure 17:
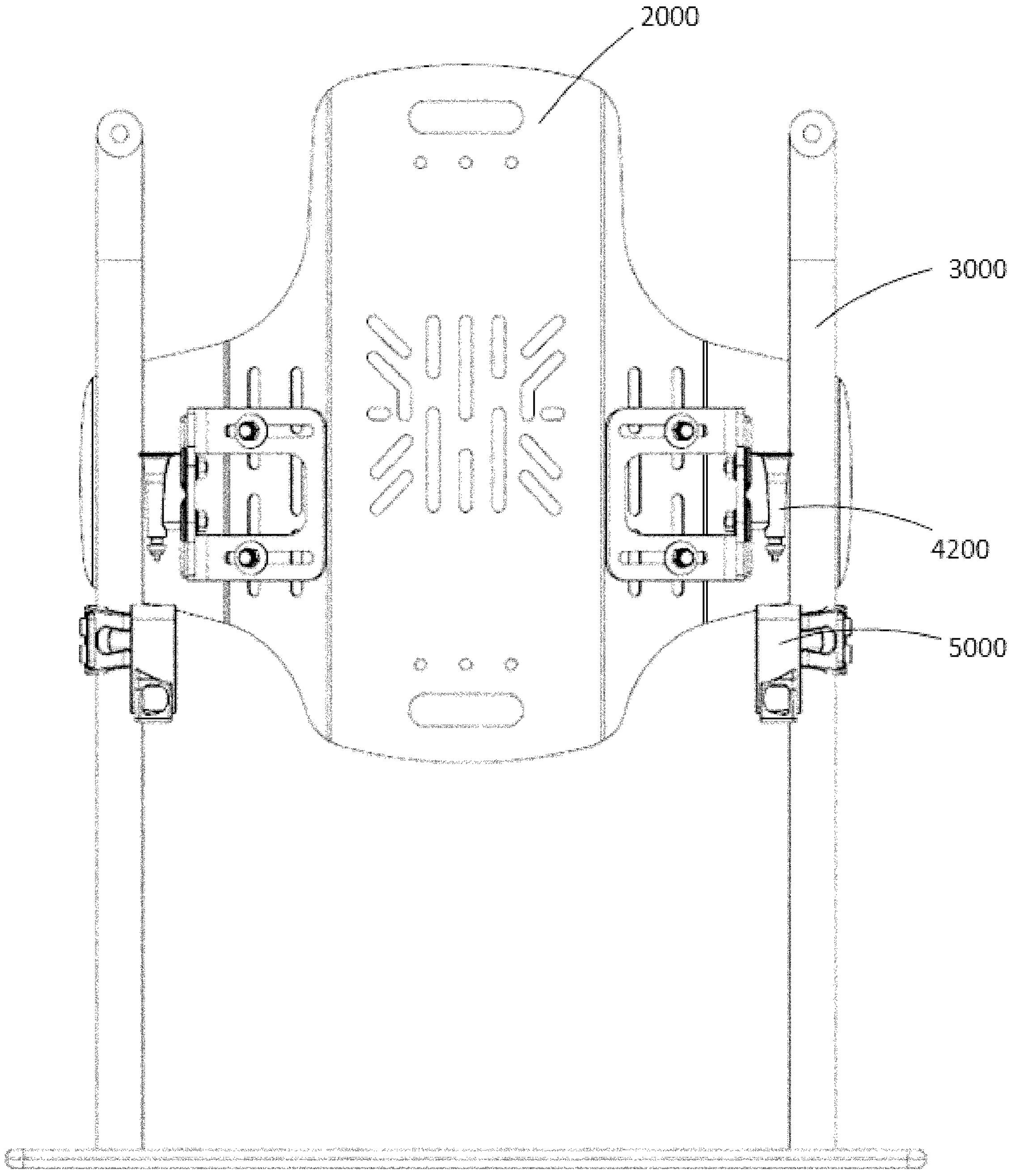
FIG. 17 is a rear view of an exemplary backrest comprising a two-point mounting system comprising a pair of mounting brackets on either side of the backrest and to each of which a locking peg is attached via a respective bracket mount, the backrest being located between two wheelchair posts so that each locking peg aligns with the peg receiving opening of a respective peg receiver beneath the locking peg.
Figure 17A:
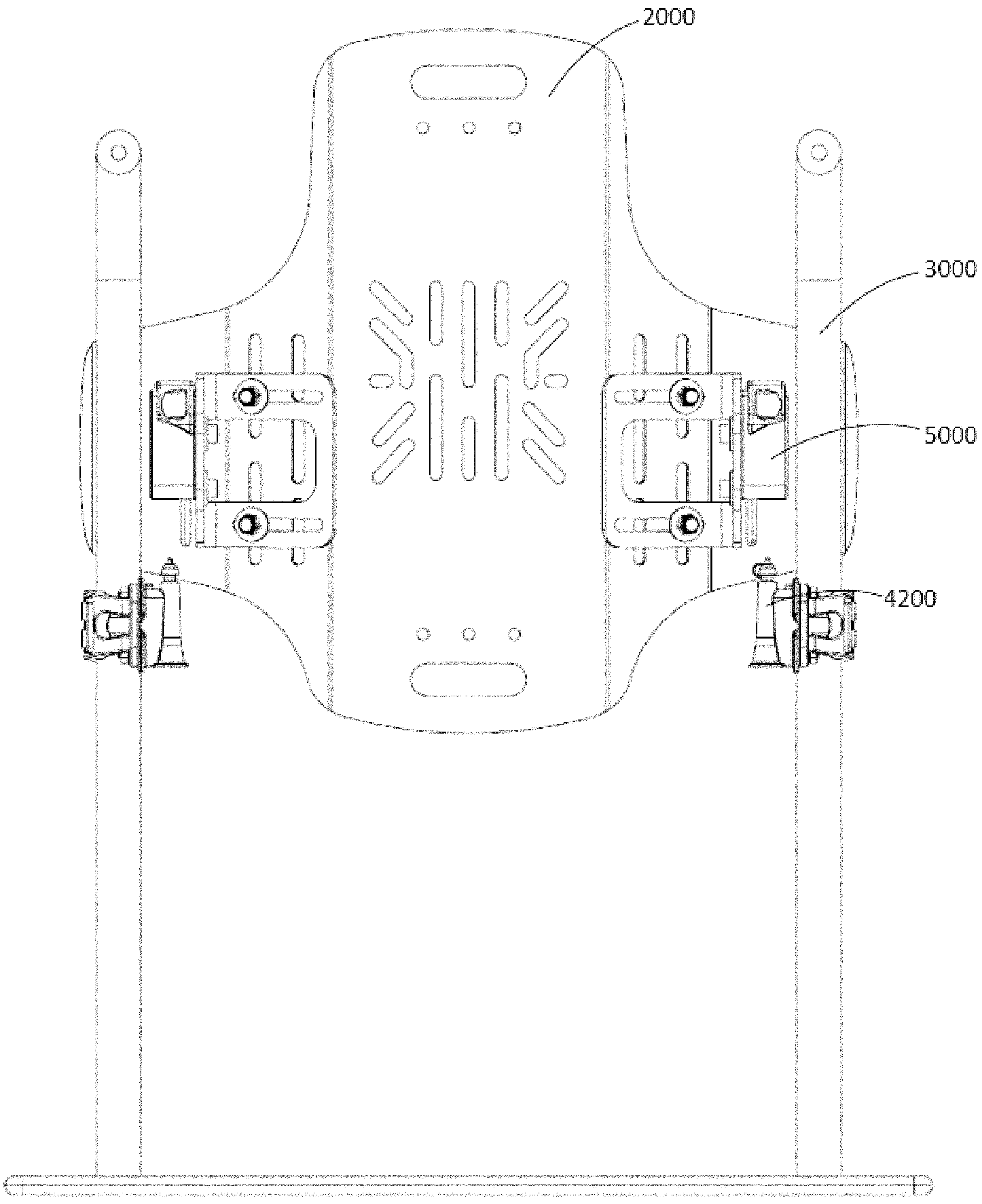
FIG. 17*a* is a rear view of an exemplary backrest comprising a four-point mounting system comprising a pair of peg receivers on either side of the backrest and a respective bracket mount, the backrest being located between two wheelchair posts to each of which is attached a respective locking peg so that each locking peg aligns with the peg receiving opening of a respective peg receiver above the locking peg.

Therefore both the pivotable locking member 5410 and the slidable locking member 5410 shown in FIGS. 12, 15, 16, 16*a*, 16*b* and 16*c* comprise a body 5413 comprising at least one supporting element 5414*a*, which may be a wall, a post, or any other suitable support, a catch 5411 supported by the supporting element and facing toward the peg receiving opening 5200 in the peg receiver 5000 when in the locked position, and a retaining element 5416 comprising a lock stop 5417 distanced from the catch 5411. A cavity 5412 is provided between the catch 5411 and the retaining element for receiving the distal end portion 4240 of the locking peg 4200 therein. The catch 5411 projects from the supporting element at a distance sufficient to engage with the engagement feature 4230 of the locking peg 4200 when the peg 4200 is inserted into the peg receiver 5200 and the locking member 5410 is in the locked position. For example, where the lock engagement feature 4230 is a detent or channel, the catch 5411 is configured to project into the detent or channel, when the locking member 5410 is in the locked position, preventing the locking peg 4200 from being pulled up and out of the peg receiving opening 5200. This interaction will be described in further detail later in the specification. The lock stop 5417 may comprise an aperture, recess, slot, opening, hole, or the like, formed in the retaining element 5416. The lock stop 5417 is distanced from the supporting element 5414*a* at a distance sufficient to engage with the latch pin 4400 when the locking member 5410 is in the unlocked position in order to hold the locking member 5410 in the unlocked position, as will be described further below.

Where the peg receiver 5000 is positioned beneath the locking peg 4200 in the locked position, as shown in FIG. 17, a peg opening 5415*a* is located within the top 5415 of the locking member 5410 and the lock stop 5417 may be located on an upper surface of the retaining element/bottom/base 5416 of the locking member 5410. Conversely, where the mounting system, and therefore the lock assembly 5400, is reversed so that the peg receiver 5000 is positioned above the locking peg 4200 in the locked position, as shown in FIG. 17*a*, the peg opening 5415*a* may be located in the bottom of the locking member 5410 and the lock stop 5417 may be located on a lower surface of a retaining element located at the top of the locking member 5410.

The moveable locking member 5410 of the lock assembly 5400 is directly or indirectly engageable with the lock biasing member 5430. The lock biasing member 5430 is configured to bias the moveable locking member 5410 to the locked position.

The lock biasing member 5430 is compressible and moveable between a compressed position and an extended position. The lock biasing member 5430 moves from the compressed position to the extended position by extending in a first direction. Similarly, the lock biasing member 5430 moves from the extended position to the compressed position by extending in a second direction, opposite to the first direction.

In some forms, the lock biasing member 5430 may comprise a compression spring or the like, and may be located in a cavity between the locking member body 5413 and a contact wall of the lock housing 5500. The moveable locking member 5410 comprises a contact surface 5410*a* that faces toward one end of the lock biasing member 5430. One end of the lock biasing member 5430 presses against the wall of the lock housing 5500 and the other end of the biasing member presses against the contact surface 5410*a* of the locking member body 5413 to push/slide the locking member 5410 toward the locking peg 4200 to adopt the locked position. The lock biasing member 5430 is held under compression between the contact surface 5410*a* of the locking member 5410 and the contact wall of the lock housing 5500. The lock biasing member 5430 urges the locking member 5410 in the direction of the locked position at all times (i.e., in the direction of the locking peg 4200 when located within the peg receiver 5200).

In the embodiment where the locking member 5410 is pivotable, the contact surface 5410*a* of the locking member faces toward a contact wall 5520 of the lock housing 5500, such as an internal side wall, as shown in FIG. 12. The lock biasing member 5430 is held under compression between the contact surface 5410*a* of the locking member and the contact wall 5520 of the lock housing. One end of the compressed biasing member 5430 pushes against the contact wall 5520 of the lock housing 5500 and the other end of the biasing member 5430 pushes against the contact surface 5410*a* of the locking member, urging the locking member 5410 to freely rotate about the pivot pin 5420 toward the locked position. The lock biasing member 5430 in this embodiment may be retained in position by top and bottom surfaces of the lock housing 5500, by the side wall 5510, the contact wall 5520 of the lock housing and by the pivot arm 5418 of the locking member 5410.

Figure 16:
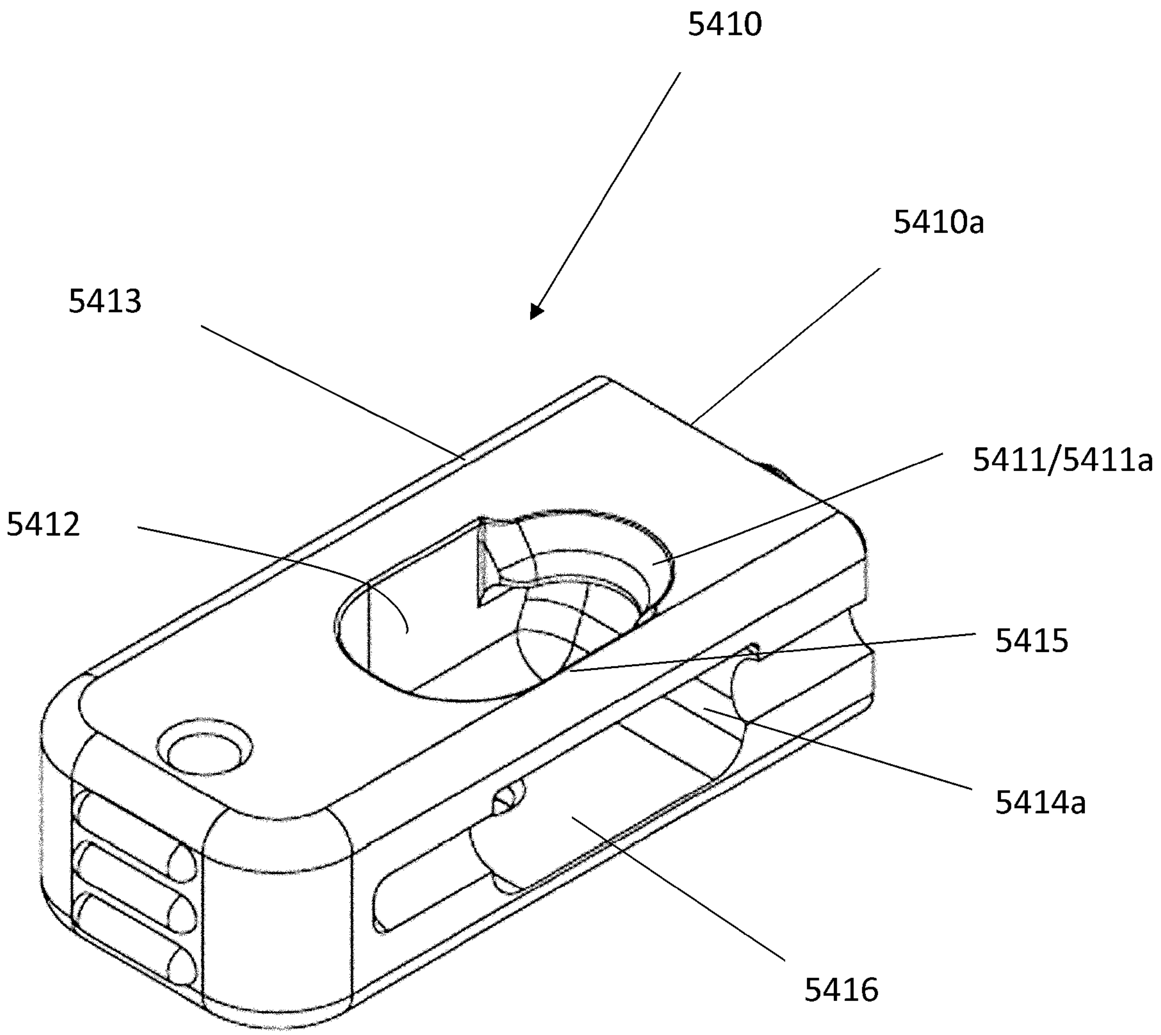
FIG. 16 is an isometric view of one form of slidable locking member.
Figure 16A:
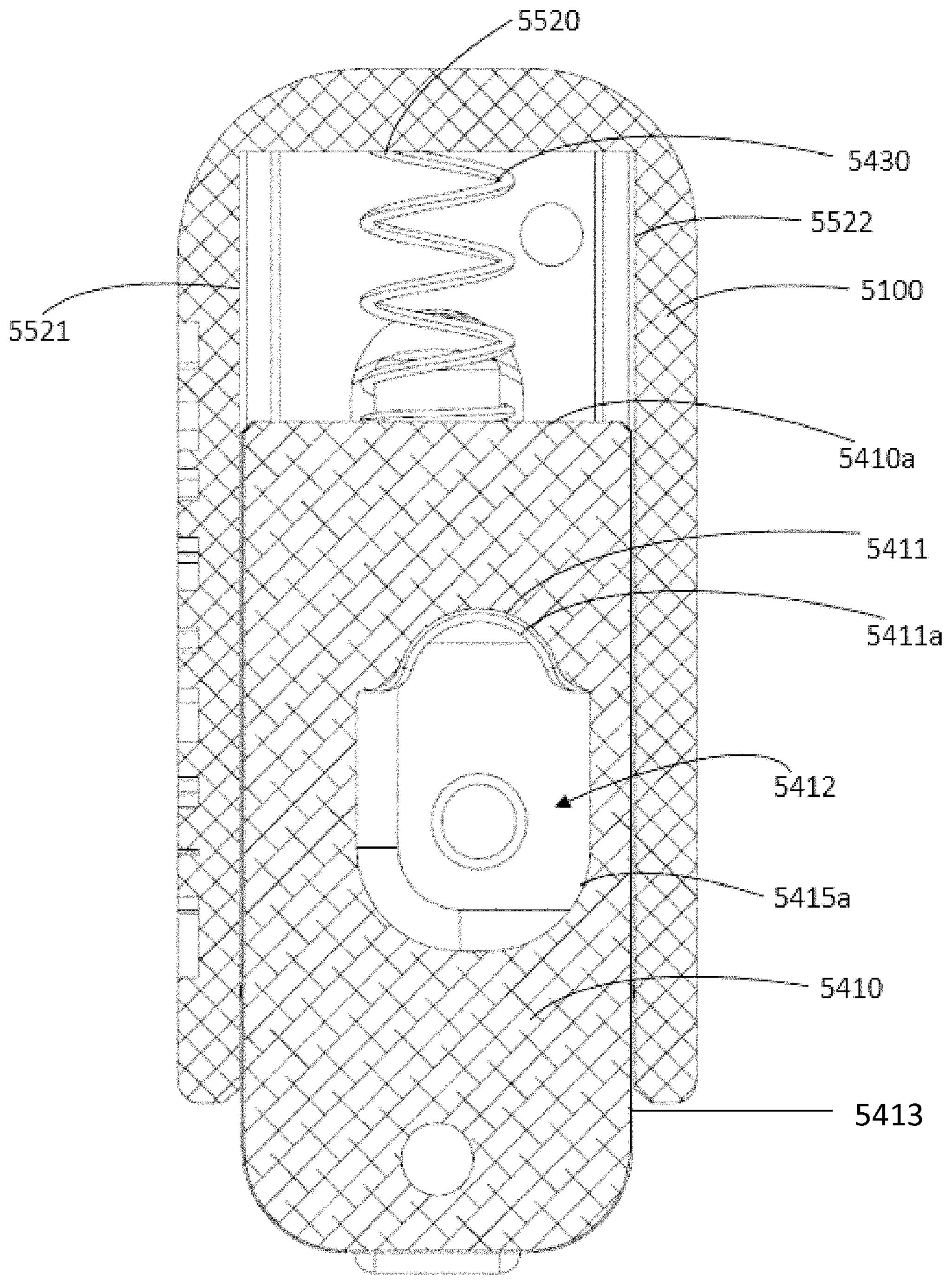
FIG. 16*a* is a cross-sectional top view of one form of lock assembly, in which the locking member is slidable between the locked and unlocked positions, the locking member being shown in the locked position.
Figure 16B:
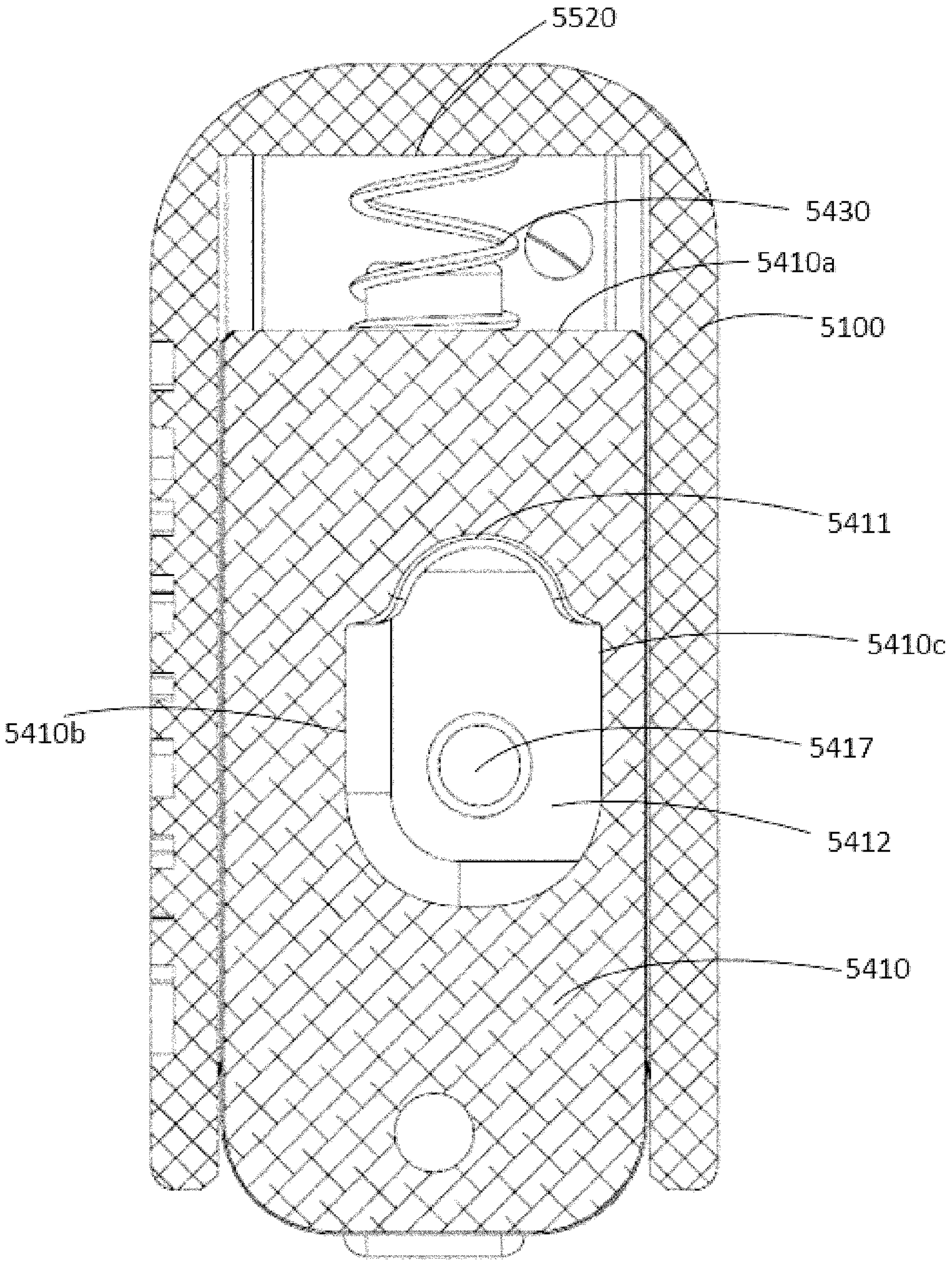
FIG. 16*b* is cross-sectional top view of the lock assembly of FIG. 16*a*, in which the locking member is shown in the unlocked position.

In the embodiment where the locking member 5410 is slidable, the contact surface 5410*a* of the locking member faces toward a contact wall 5520 of the lock housing 5500, such as an internal side wall, as shown in FIGS. 16*a* and 16*b*. In some forms, the contact surface 5410*a* is formed on the supporting element 5414*a*. The lock biasing member 5430 is held under compression between the contact surface 5410*a* of the locking member and the contact wall 5520 of the lock housing 5500. One end of the compressed biasing member 5430 pushes against the contact wall 5520 of the lock housing 5500 and the other end of the biasing member 5430 pushes against the contact surface 5410*a* of the locking member, urging the locking member 5410 to freely slide toward the locked position. The lock biasing member 5430 in this embodiment may be retained in position by top and bottom surfaces and side surfaces 5520, 5521, 5522, of the lock housing 5500.

In preferred forms, the lock biasing member 5430 is a spring, but in other forms the lock biasing member may be any sufficiently compressible and resilient member, such as a rubber or foam member, that is able to consistently press against the locking member 5410 to push the locking member 5410 to the locked position.

Because the lock biasing member 5430 biases the locking member 5410 to the locked position, the locking peg 4200 cannot be retracted from the peg receiving opening 5200 unless the locking member 5410 is moved to the unlocked position and held in the locked position while the locking peg 4200 is retracted.

The unlocking element 5440 of the lock assembly is connected to the moveable locking member 5410 and is moveable by a user between a first, locked position and a second, unlocked position. The unlocking element 5440 may be pivotable when used with a pivotable locking member 5410, or the unlocking element 5440 may be slidable when used with a slidable locking member 5410. The unlocking element 5440 is configured to move the locking member 5410 to the unlocked position.

The unlocking element 5440 may be located on the outside of the peg receiver 5000 for access by a user. In some forms, the unlocking element may project from the peg receiver 5000 to form a lever, handle, or the like. In preferred forms, the unlocking element 5440 comprises a gripping portion and is attached to the locking member 5410 by one or more fasteners that extend through at least one slot 5415*a*, 5415*b* in the bottom of the peg receiver 5000. In some forms, the slot extends generally in the direction of movement of the locking member 5410 and being in communication with the lock housing 5500. In other forms, where the locking member 5410 is pivotable, the slot may extend generally diagonally to allow motion of the unlocking element 5440 to be similar to that of the pivoting locking member 5410.

Figure 14:
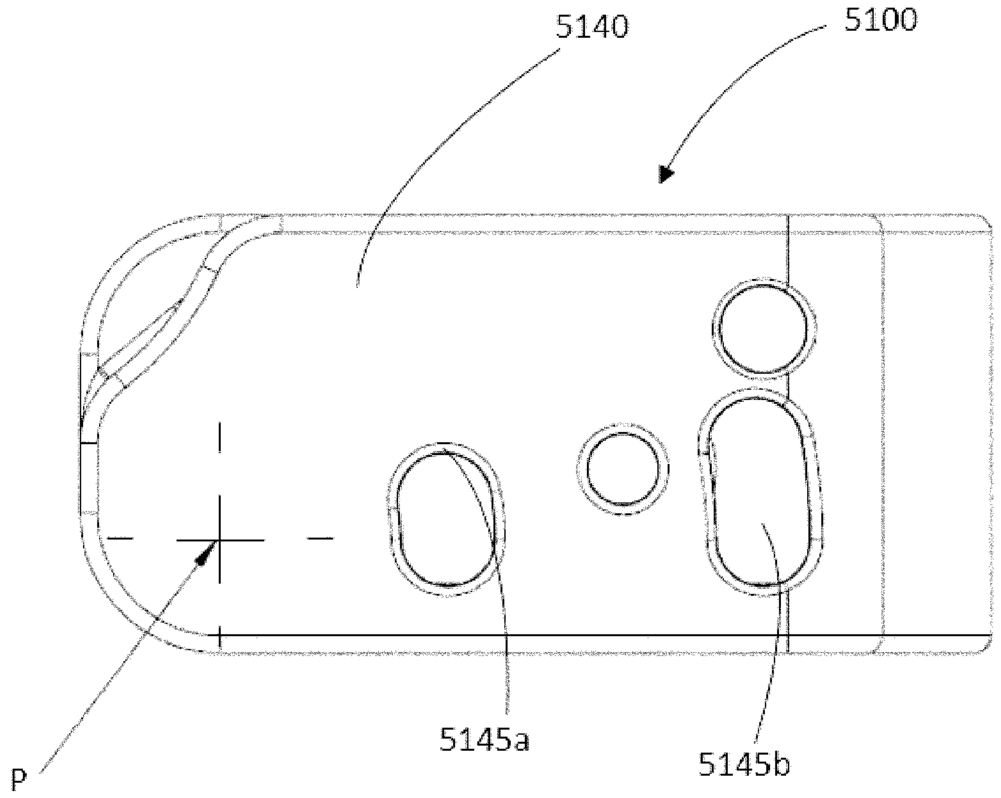
FIG. 14 is a bottom view of the peg receiver of FIG. 13 in which the unlocking element has been removed.

One form of unlocking element 5440 is shown in FIGS. 13, 13*a*, 14 and 15. In the embodiment shown, the unlocking element 5440 is located beneath the lock housing 5500 of the peg receiver 5000. The unlocking element 5440 engages with the locking member 5410 and is configured to move between a first position, in which the locking member 5410 is in the locked position, and a second position, in which the locking member 5410 is in the unlocked position, as shown in FIGS. 15 and 15*a* and FIGS. 16*a* and 16*b*. In some forms, the unlocking element 5440 may comprise a first portion 5441 that is attached to the locking member 5410, such as to one side or to the bottom of the locking member 5410, by any suitable attachment system, such as by screws or other suitable fasteners, as shown in FIGS. 14, 15 and 15*a*. The unlocking element 5440 may also comprise a second portion 5442 that extends from the first portion and forms a tab for gripping by a user.

In the embodiment illustrated, the unlocking element 5440 may be attached to the locking member 5410 by one or more fasteners 5460, such as by screws or bolts, that pass through a corresponding slot 5145*a*, 5145*b* located in the peg receiver 5000. In other forms, the locking member 5410 and unlocking element 5440 may be formed as a single part, but preferably the two components are formed as separate parts that are then fastened together during assembly of the lock assembly as this has been found to be the simplest method of assembly. FIG. 13 shows an unlocking element 5440 located below the lock housing of the peg receiver 5000 and attached to the locking member 5410 by two fasteners 5460. FIG. 14 shows the bottom of the peg receiver 5000 of FIG. 13.

In some forms, where the locking member 5410 is pivotable, the peg receiver 5000 comprises at least one slot and in some cases two slots 5145*a*, 5145*b* for each fastener 5460. The slot may be of any suitable configuration, for example the slot may be a curved slot or a generally linear slot. Pivot point P is the point about which a pivotable unlocking element 5440 pivots between the locked and unlocked position. The curved slots 5145*a*, 5145*b* follow the direction of movement of the unlocking element 5440. In this arrangement, the unlocking element 5440 is pivotable between the first and second positions. By pivoting the unlocking element 5440 from the first position to the second position, the pivotable locking member 5410 is caused to pivot to the unlocked position. Conversely, by pivoting the unlocking element 5440 from the second position to the first position, the locking member 5410 is caused to pivot to the locked position, although such a position will automatically be adopted by the locking member 5410 once the latch pin 4400 disengages with the locking member 5410.

Figure 16C:
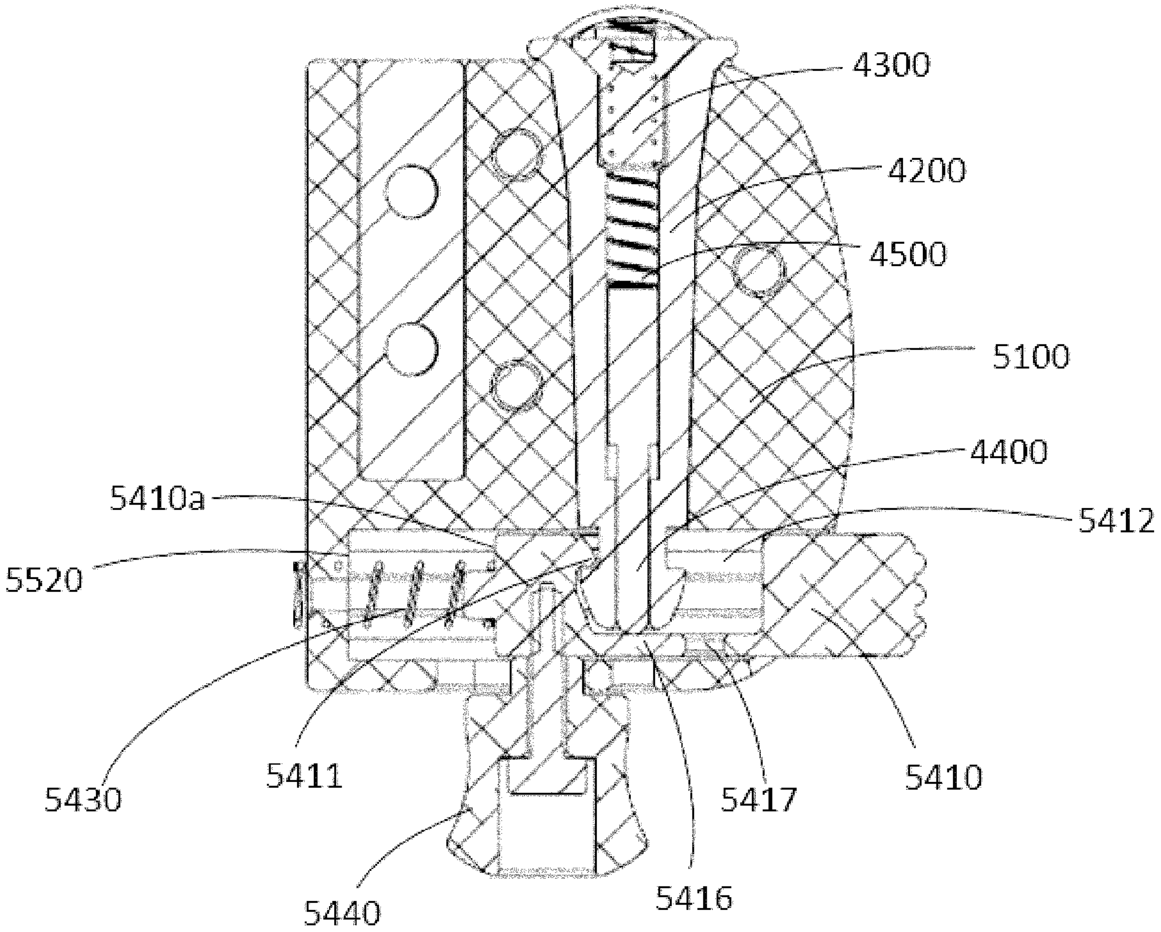
FIG. 16*c* is a cross-sectional side view of one form of peg receiver in which one form of locking peg is received and is locked in position by the sliding locking member of FIG. 16*a* to the locked position.

Similarly, where the locking member 5410 is slidable, as shown in FIGS. 16*a*, 16*b* and 16*c*, the unlocking element may be slidable between the first and second positions. In such an arrangement, the lock housing 5500 of the peg receiver comprises at least one slot 5415*a* of any suitable configuration, such as a curved or generally linear slot, extending generally in the direction of movement of the unlocking element 5440. In some forms, the slot may lie along an axis that extends in the same direction as the direction of movement of the locking member. In other forms, the slot may lie along a diagonal axis that extends in the general direction of movement of the locking member. By sliding the unlocking element from the first position to the second position, the slidable locking member 5410 is caused to slide from the locked position to the unlocked position. Conversely, by sliding the unlocking element 5440 from the second position to the first position, the locking member 5410 is caused to slide to the locked position, although again, such a position will automatically be adopted by the locking member once the latch pin 4400 disengages with the locking member 5410.

Therefore, because the unlocking element is connected to the locking member 5410, when the unlocking element is moved to the second, unlocked position, the locking member 5410 is simultaneously caused to move to the unlocked position. In other words, the locking member 5410 is caused to move away from the peg 4200 to release/disengage the catch 5411 from the lock engagement feature 4230 so that the locking peg 4200 may be removed from the peg receiver 5200. Therefore, the unlocking element 5440 may be attached to the locking member 5410 so that the unlocking element 5440 and locking member 5410 move simultaneously, as if a single part.

When the locking member 5410 is in the unlocked position, the mounting system 1000 of the invention is configured to hold the locking member 5410 in the unlocked position, at least temporarily, to allow the locking peg 4200 to be retracted from the peg receiving opening 5200 without interference from the locking member 5410.

The lock stop 5417 therefore cooperates with the latch pin 4400 to hold the locking member 5410 in an unlocked position as the locking peg 4200 to be removed from the peg receiver 5000. For example, when the locking peg 4200 is located within the peg receiving opening 5200 of the peg receiver 5000, the tip 4220 of the locking peg terminates slightly above or at the base 5416 of the locking member. The distal end portion of the latch pin 4400 extends beyond and beneath the tip 4240 as a result of the pin biasing member 4500 pushing the latch pin 4400 away from the proximal end 4210 of the peg. However, the distance from the proximal end 4210 of the locking peg 4200 to the distal end 4421 of the pin, when the pin 4400 is in a fully extended position, is greater than the distance between the peg receiver 5200 at the proximal end of the peg receiver 5000, and the retaining element/base 5416 of the locking member. Therefore, in the locked position, the retaining element/base 5416 of the locking member presses against the distal end 4421 of the latch pin, pushing the pin 4400 further into the pin housing 4250 of the peg in a first, retracted position, and compressing the pin biasing member 4500 to reduce the effective length of the peg 4200 and pin 4400 combined. By moving the locking member 5410 to the unlocked position, the catch 5411 disengages from the engagement feature 4230 of the peg whilst the base 5416 of the locking member 5410 slides beneath the distal end 4421 of the latch pin until the lock stop 5417 aligns with the distal end 4421 of the latch pin. When the lock stop 5417 and latch pin 4400 are aligned, the depth of the lock stop 5417 provides sufficient height/space to allow the latch pin 4400 to extend from the tip 4220 of the peg 4200, under compression force from the pin biasing member 4500, so that the distal end 4421 of the pin is received within the lock stop 5417 in a second, extended position.

In the second, extended position, the distal end portion 4421 of the pin is held within the lock stop 5417, thereby holding/pinning the locking member 5410 in the unlocked position. By holding the locking member 5410 in the unlocked position, the locking peg 4200 can be easily removed from the peg receiver 5000 without interference from the locking member 5410. As the locking peg 4200 is retracted from the peg receiver 5200, the lock engagement feature 4230 passes above the catch 5411 of the locking member 5410 so that the catch 5411 no longer aligns with the lock engagement feature and can no longer engage with the peg 4200. As the peg 4200 is further retracted, the latch pin 4400 disengages from the lock stop 5417, allowing the locking member 5410 to move to the locked position under the compression force of the lock biasing member 5430. In effect, the latch pin 4400 projects from the distal end of the peg 4200 a distance sufficient such that the latch pin remains engaged with the lock stop 5417 for at least a period of time whilst the peg is retracted from the peg receiver 5200. Upon disengagement of the latch pin 4400 with the lock stop 5417, the lock biasing member 5430 causes the locking member 5410 to automatically move to the locked position. In this way, the lock assembly 5400 automatically resets itself to the locked position once the latch pin 4400 disengages from the locking member 5410.

When the latch pin 4400 is engaged with the lock stop 5417 of the locking member 5410, the unlocking element 5440 is prevented from moving.

The mounting system 1000 of the invention therefore automatically resets itself when the peg 4200 is removed from the peg receiving opening 5200 and will automatically self-lock when the peg 4200 is again pushed fully within the peg receiving 5200 to engage with the locking member 5410. This is a useful safety feature of the invention as it does not rely on a user to remember to lock the peg 4200 and peg receiver 5000 together. Furthermore, the lock biasing member 5430 ensures that the system 1000 remains locked until deliberately unlocked by a user via activation of the unlocking element 5440.

The peg receiver 5000, locking member 5410, unlocking element 5440, bracket mount 4100, locking peg 4200 and latch pin 4400 may be made from any suitable material. In some forms, the peg receiver 5000 optionally comprises a plastic material or composite, such as nylon or a nylon/glass composite or any injection-moulded thermoplastic. The locking member 5410 and/or bracket mount 4100 and/or the locking peg 4200 may optionally comprise a metal or metal composite, such as aluminium or an alloy. The unlocking element 5440 may optionally comprise a plastic material, such as nylon, or a composite or any injection-moulded thermoplastic. The latch pin 4400 may optionally comprise a metal, such as stainless steel, or a composite, such as an alloy.

The assembly of the locking peg 4200 and peg receiver 5000 will now be described with reference to FIGS. 6 and 12 particularly. To assemble the locking peg 4200, as indicated in FIG. 6, the latch pin 4400 is first inserted into the pin housing 4250 from the proximal end 4210 of the peg 4200. The pin biasing member 4500 or spring is then inserted into the pin housing 4250 so that the lower/distal end of the biasing member 4500 contacts the upper/proximal end 4411 of the latch pin 4400. A stopper 4300, such as a threaded bolt or screw, is then inserted into the pin housing 4250 and is fastened in place. The stopper 4300 contacts the proximal end of the pin biasing member 4500, and optionally presses against the pin biasing member 4500 to hold the biasing member 4500 under compression.

To assemble the peg receiver 5000, as indicated in FIG. 12, the clamping arms 5310, 5320 are attached to the peg receiver 5000 as described above. The clamping arms 5310, 5320 may be attached to the peg receiver before or after the lock assembly 5400 is installed.

To install the pivoting lock assembly 5400, a pivot pin 5420 is inserted into the pin aperture of the locking member 5410. The lock biasing member 5430 is positioned to be located between the contact surface 5410*a* of the locking member 5410 and an interior wall of the lock housing, such as the rear wall 5520. The lock biasing member 5430, pivot pin 5420 and locking member 5410 are each fitted into the lock housing 5500 so that pivot pin engages with the pivot pin receiver to allow the locking member 5410 to pivot about the pivot pin 5420 and to allow the biasing member 5430 to push against the contact surface 5410*a* of the locking member 5410 to bias the locking member to the locked position. In embodiments where the pivot pin and locking member are integrally formed as a single part, the locking member 5410 is inserted into the lock housing 5500 so that the pivot pin engages with the pin receiver of the lock housing 5500 to allow the locking member 5410 to pivot about pivot pin 5420 and to allow the biasing member 5430 to push against the contact surface 5410*a* of the locking member 5410 to bias the locking member to the locked position. In the embodiment illustrated, the locking member 5410 is biased away from the first side wall 5510 of the lock housing 5500 and toward the exposed opening 5530 of the lock housing, but it is envisaged that the arrangement could be reversed without departing from the scope of the present invention.

To install a sliding lock assembly 5400, the lock biasing member 5430 is positioned to be located between the contact surface 5410*a* of the locking member 5410 and an interior wall of the lock housing, such as a rear wall 5520. The lock biasing member 5430 and locking member 5410 are each fitted into the lock housing 5500 so that the locking member 5410 can slide against the side surfaces 5521, 5522 of the housing 5500 and to allow the biasing member 5430 to push against the contact surface 5410*a* of the locking member 5410 to bias the locking member 5410 to the locked position.

For both the pivotable and sliding lock assembly embodiments, the unlocking element 5440 is secured to the bottom of the peg receiver 5000 and locking member 5410 by one or more fasteners, preferably by two fasteners. A cover plate 5540 is then attached to the peg receiver to cover the opening in the second side wall 5120 and to substantially enclose the lock housing 5500.

The mounting system 1000 of the present invention offers a simple and safe system of locking a backrest 2000 to the posts 3000 of a wheelchair and also allows a relatively hassle-free way in which to unlock and remove the backrest from the wheelchair. FIGS. 17 to 24 illustrate a method of attaching and then releasing a backrest to and from a wheelchair according to one form of mounting system 1000 of the invention.

One method of attaching a backrest 2000 to posts 3000 of a wheelchair using one form of mounting system 1000 of the invention will now be described. For simplicity, the arrangement between just one locking peg 4200 and a corresponding peg receiver 5000 on one of the wheelchair posts 3000 will be described, but it should be appreciated that the backrest 2000 will be attached to two posts 3000 of the wheelchair simultaneously and therefore a user will follow the steps below to attach and detach each locking peg 4200 to and from a respective peg receiver 5000.

Figure 18:
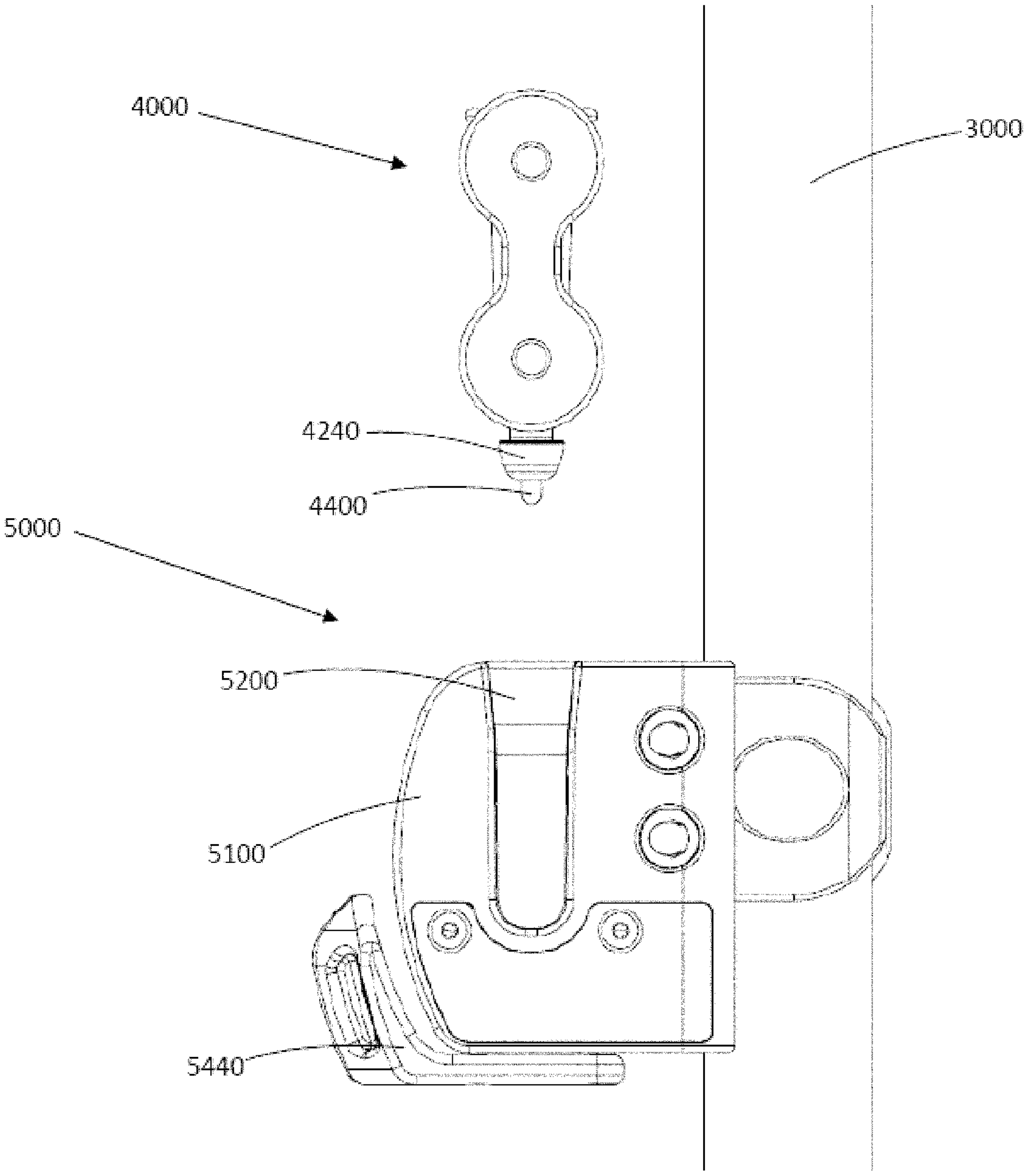
FIG. 18 is a side view of one form of locking peg aligned with one form of peg receiver of the invention, prior to inserting the locking peg within the peg receiving opening of the peg receiver.
Figure 19:
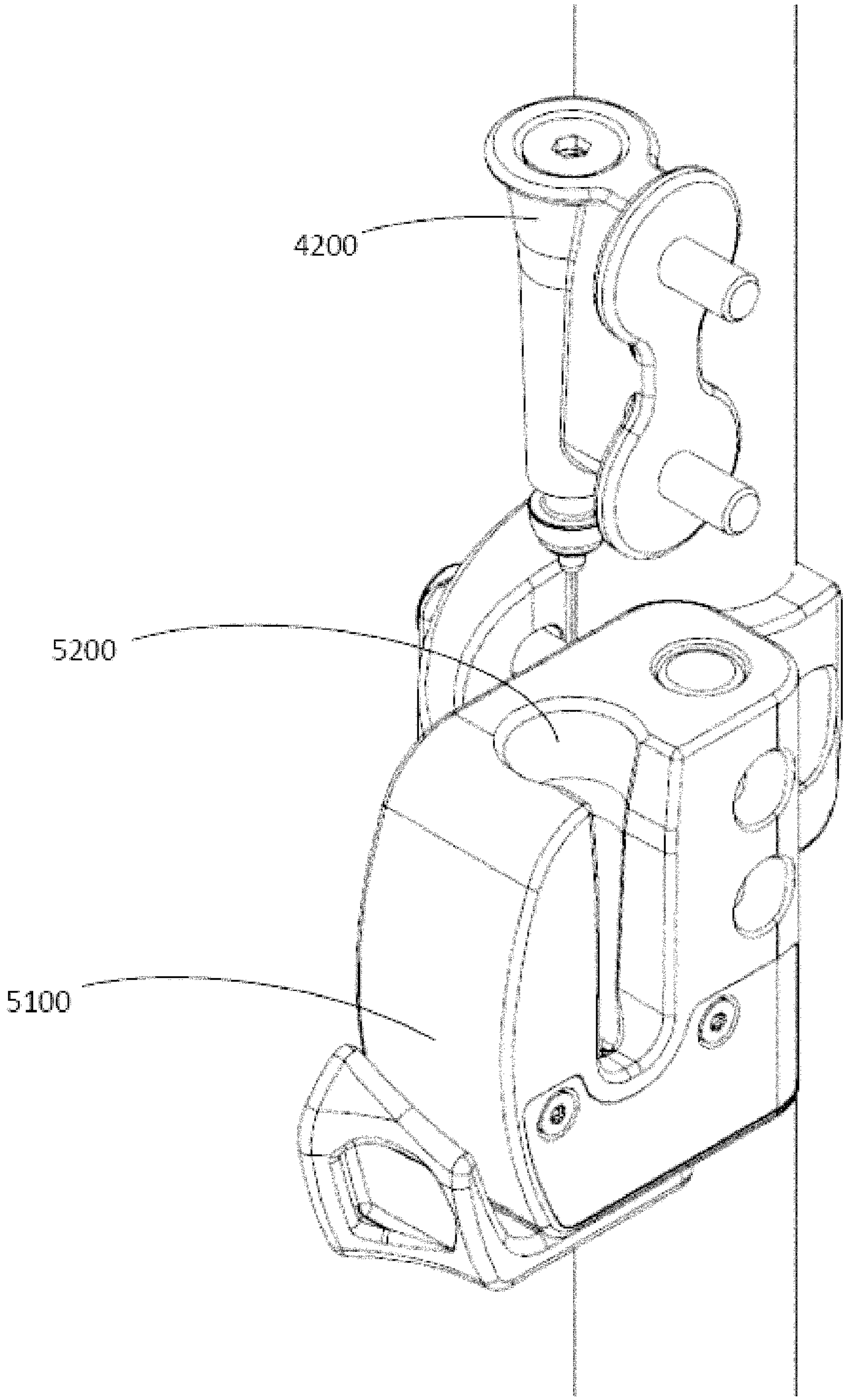
FIG. 19 is an isometric view from above of the locking peg and peg receiver of FIG. 18.

To attach a backrest 2000 to a wheelchair post 3000, the locking peg 4200 is attached to an L-bracket, as described above, and the L-bracket is attached to the rear of the backrest 2000. The location of the L-bracket in relation to the backrest may be adjusted before and/or after attaching the backrest 2000 to the wheelchair posts 3000. A user then locates the backrest 2000 between the posts 3000 so that the locking peg 4200 is positioned above or below the respective peg receiver (as the case may be) and is aligned with the peg receiving opening 5200, as shown in FIGS. 17 to 19. Typically, the peg 4200 is positioned above the peg receiving opening and the user then lowers the backrest 2000 so that the locking peg 4200 is pushed into the peg receiving opening 5200.

Figure 20:
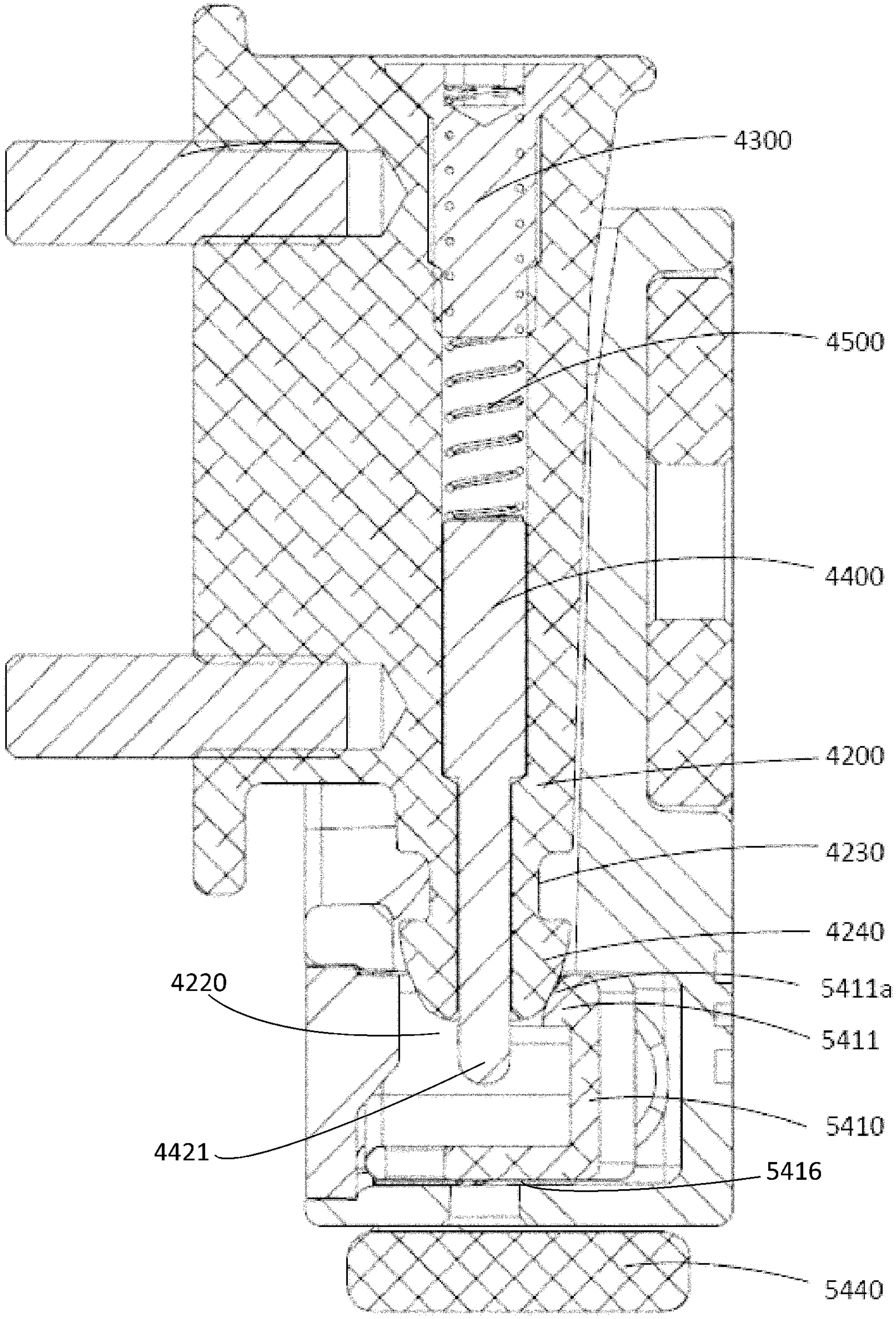
FIG. 20 is a cross-sectional view taken along a length of the locking peg and peg receiver and showing one form of locking peg of the invention being pushed into a peg receiving opening of one form of peg receiver, the tapered distal portion of the locking peg pressing against a tapered edge of a catch of a pivotable locking member to push the catch outwardly and away so that the tapered distal portion can be received within a cavity of the locking member.

Because the moveable locking member 5410 is biased to and automatically reset to the locked position when the locking peg 4200 is retracted from the peg receiving opening 5200, the locking member 5410 will naturally be in the locked position as the locking peg 4200 is inserted into the peg receiving opening 5200. As the locking peg 4200 is pushed further into the peg receiving opening 5200, the tapered tip 4220 at the distal end of the locking peg presses against and then slides against the tapered edge 5411*a* of the peg opening 5415*a* defined by the locking member catch 5411, pushing the catch 5411 away and causing the locking member 5410 to pivot or slide (as the case may be) slightly toward the unlocked position, as shown in FIG. 20.

Figure 21:
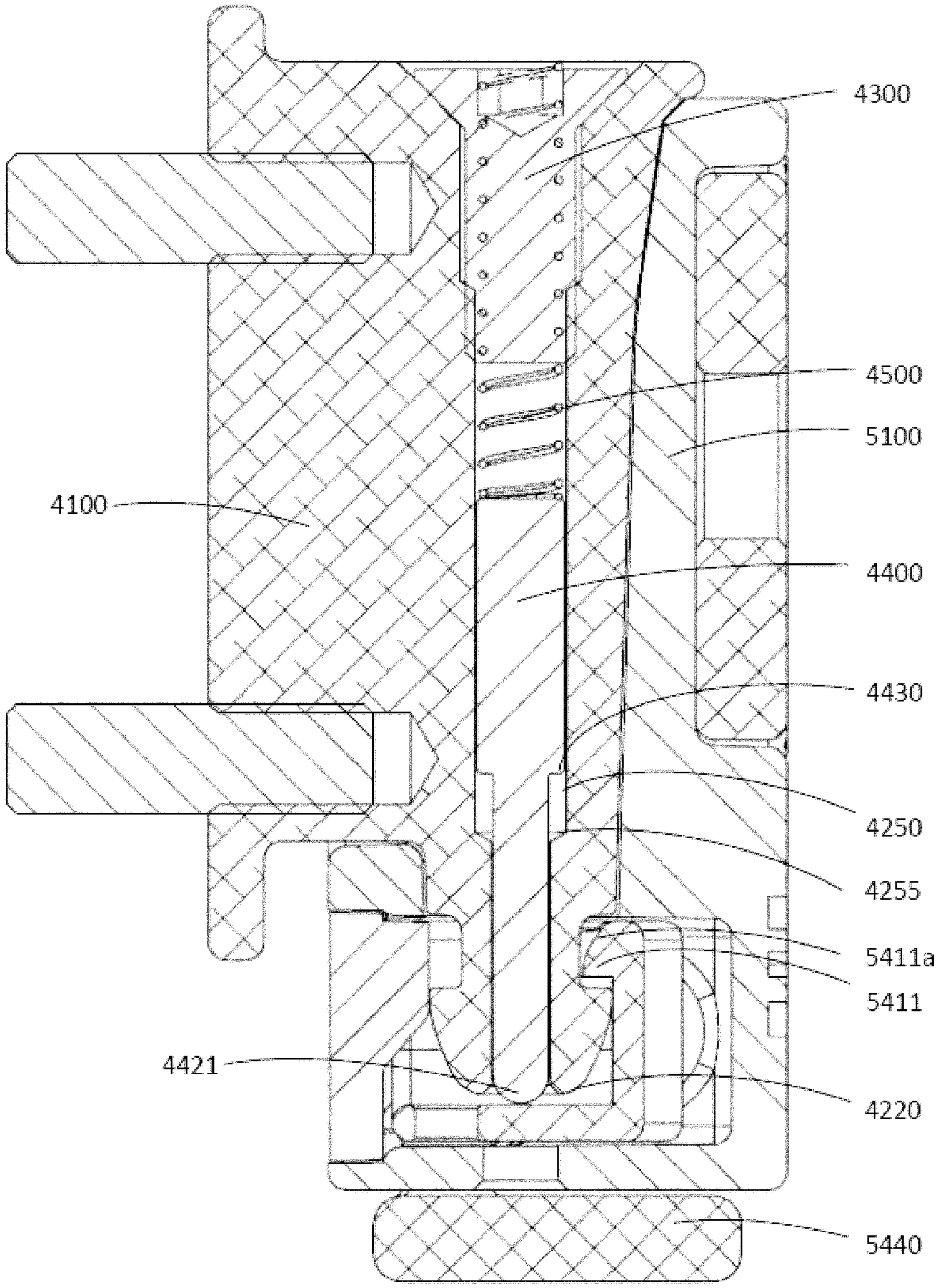
FIG. 21 is a cross-sectional view showing the same components as FIG. 20 but in which the tip of the locking peg is held within the cavity of the locking member and the catch of the locking member engages with an engagement feature of the locking peg to lock the peg within the peg receiver, thereby locking the backrest to the respective post.
Figure 21A:
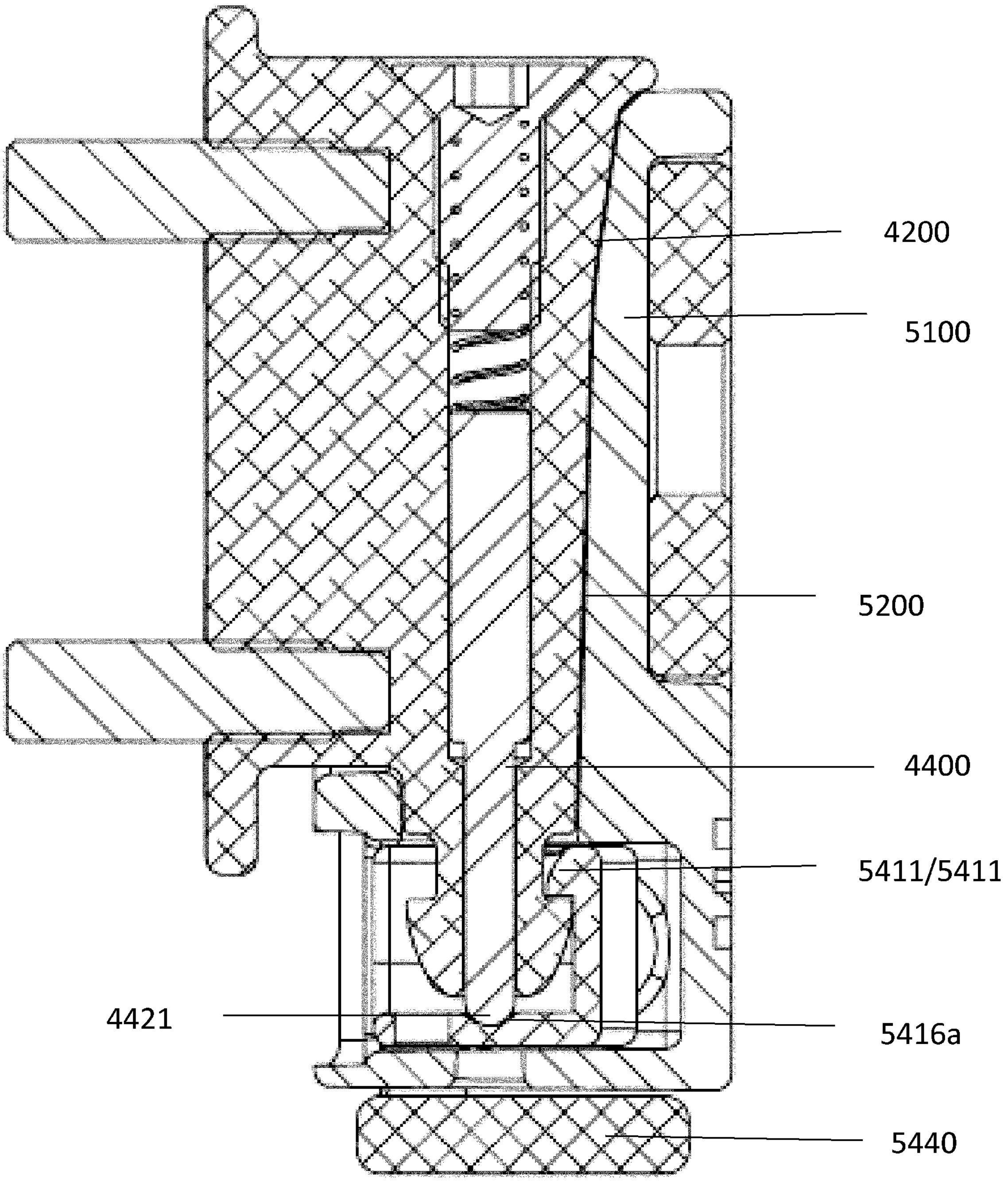
FIG. 21*a* is a cross-sectional view showing one form of peg receiver comprising the lock assembly of FIG. 7*a* and in which is received a locking peg, the lock assembly and peg being in the locked position in which the distal end of the latch pin is engaged with a lock support of the locking member.

The user continues to push the locking peg 4200 further into the peg receiver 5200 until the distal end portion 4240 of the locking peg enters the locking member cavity 5412. Once the distal end portion of the locking peg 4200 is fully received within the cavity 5412 so that the lock engagement feature 4230 of the locking peg 4200 aligns with the catch 5411, the biasing force of the lock biasing member 5430 pushes the locking member 5410 toward the locked position and therefore toward the peg 4200. In the locked position, the catch 5411 engages with the lock engagement feature 4230, as shown in FIGS. 16*c*, 21 and 21*a*. Typically, the lock assembly 5400 is arranged to move horizontally and the catch 5411 engages with the lock engagement feature 4230 of the vertically moveable locking peg 4200.

Figure 22:
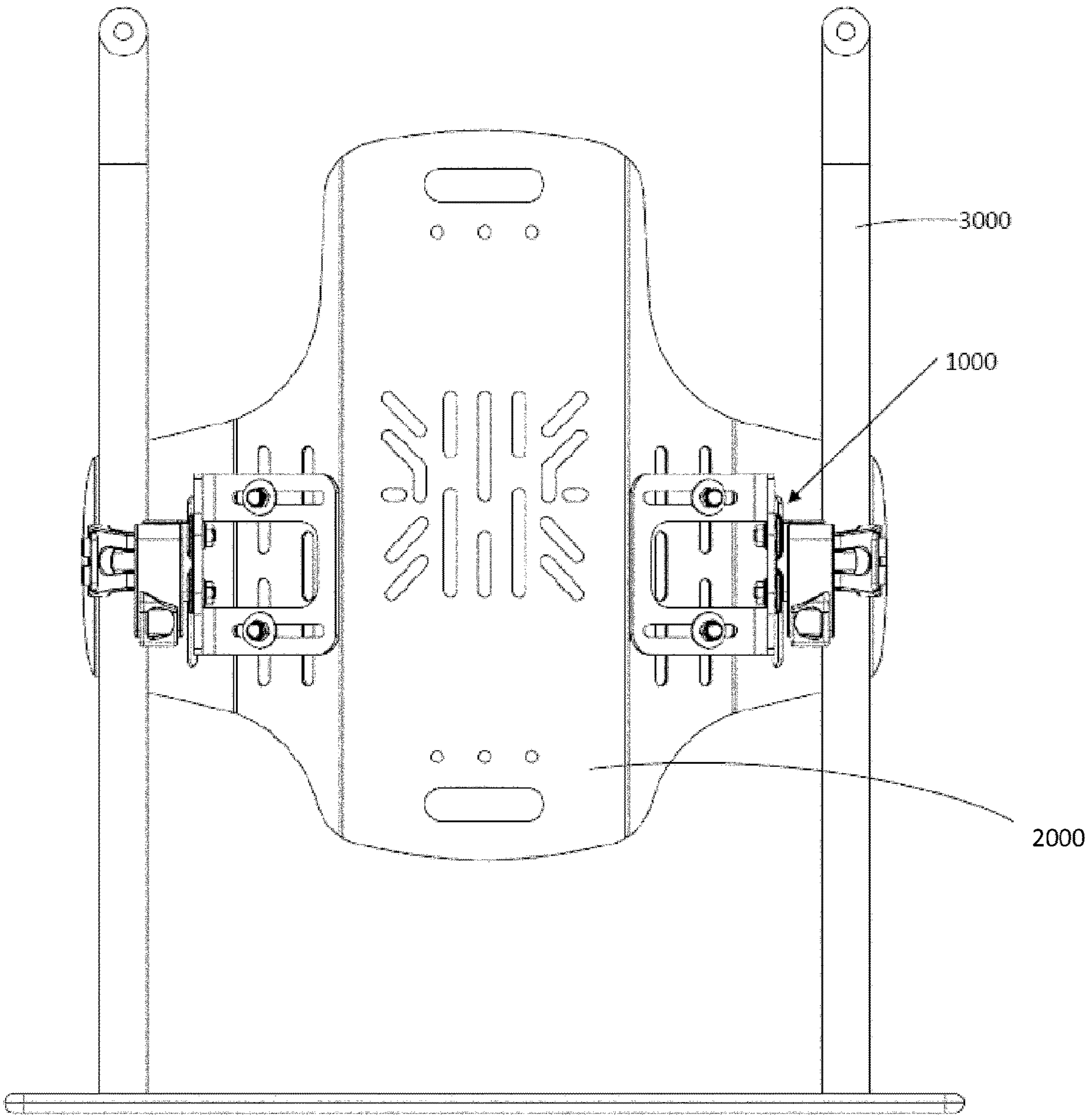
FIG. 22 is a rear view of the backrest and mounting system of FIG. 17 and in which the locking peg is received within the peg receiver to lock the backrest to the wheelchair posts.

In the locked position, in some forms, the distal end 4421 of the latch pin 4400 presses against the base/bottom/retaining element 5416 of the locking member and is at least partially pushed into the pin housing 4250 of the locking peg to a retracted position, compressing the pin biasing member 4500. In some forms, the latch pin 4420 retracts into the pin housing 4250 to such an extent that the distal end 4421 of the latch pin is flush or almost flush with the distal end 4220 of the locking peg and the abutment surface 4430 of the latch pin is distanced from the abutment 4255 of the pin housing, as shown in FIG. 20. However, in other forms, the distal end 4421 of the latch pin may extend from the distal end 4220 of the locking peg, even in the retracted position. For example, as shown in FIGS. 12*a*, 15*a* and 21*a*, the retaining element 5416 comprises a lock support 5416*a* in the form a detent, recess, concave dimple, or the like, that receives at least part of the distal end portion 4421 of the latch pin so as to engage with the distal end of the latch pin when the locking member is in the locked position. In the locked position, the engagement between the catch 5411 and the locking peg 4200 prevents the locking peg from being retracted from the peg receiver 5200. Engagement between the latch pin 4400 and the lock support 5416*a* also helps prevent the locking member 5410 from inadvertently being moved to the unlocked position, which would allow the locking peg 4200 to be retracted from the peg receiver 5200. This is because it is necessary to overcome the biasing force of the pin biasing member 4500 before the locking member 5410 can be moved to the unlocked position. Therefore, deliberate effort by a user (or a significant inadvertent impact force) is required to move the locking member 5410 to the unlocked position. The backrest 2000 is now attached to the wheelchair posts 3000 and locked in place, as shown in FIG. 22.

Once locked in place, the locking peg 4200 cannot be retracted from the peg receiving opening 5200 of the peg receiver 5000.

Figure 23:
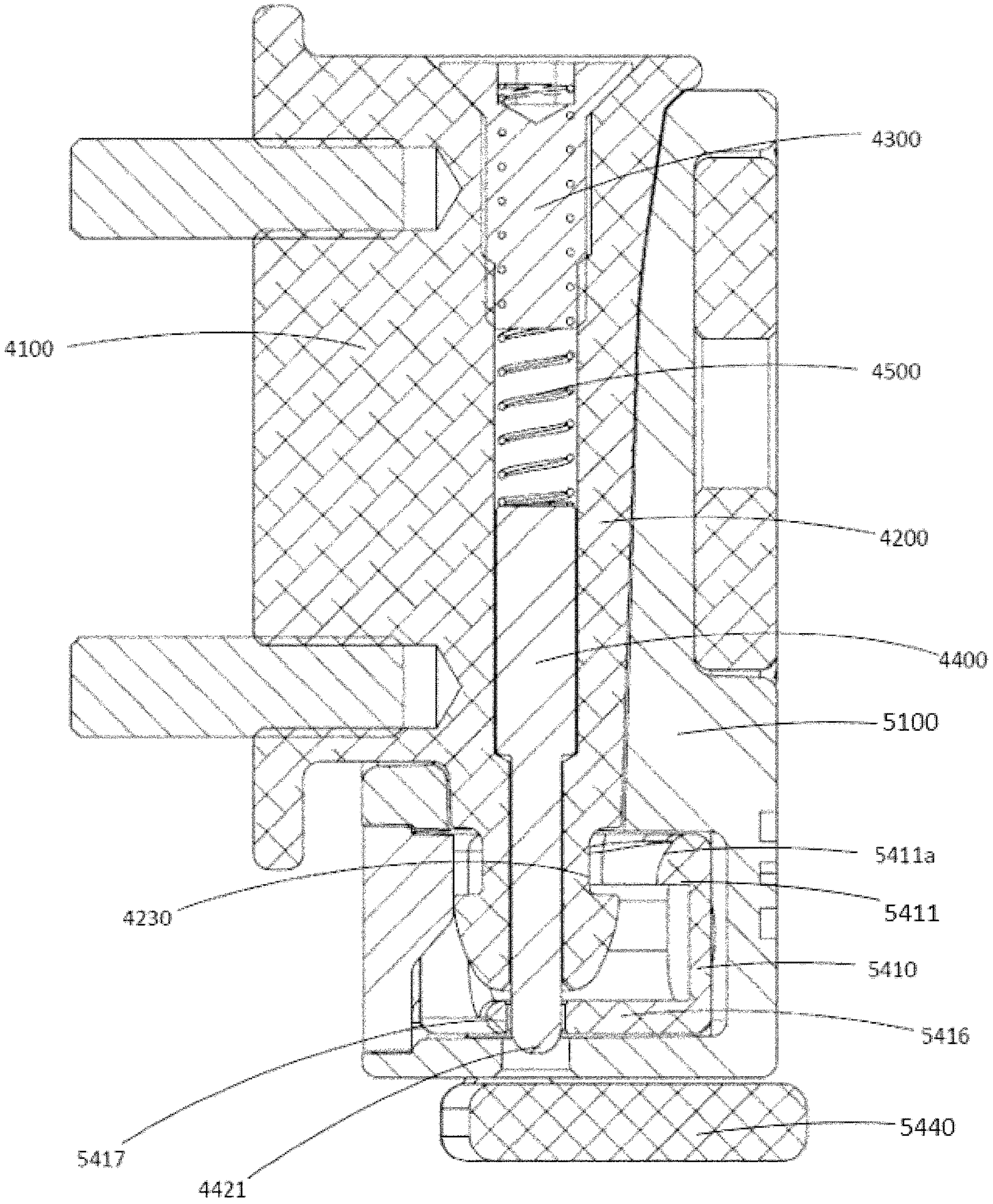
FIG. 23 is another cross-sectional view showing the same components as FIG. 20 but in which the mounting system is unlocked so that the pivotable locking member has pivoted away from the locking peg to release the catch from the locking peg engagement feature, causing the latch pin to engage with a lock stop of the locking member to hold the locking member in the unlocked position.

To remove the backrest 2000 from the wheelchair posts 3000, the unlocking element 5440 is moved to the second, unlocked position, causing the locking member 5410 to move to the unlocked position simultaneously. As the locking member 5410 moves to the unlocked position, the catch 5411 disengages with the lock engagement feature 4230 of the locking peg 4200 and the lock biasing member 4530 is compressed, or further compressed, between the contact surface of the locking member body 5413 and the contact wall of the lock housing 5500. As the locking member reaches the unlocked position, the distal end of the latch pin 4400 aligns with the lock stop. The depth of the lock stop allows the latch pin, biased to an extended position, to extend from the distal end of the peg 4200 and to push into the lock stop 5417, engaging with the lock stop. The engagement between the latch pin 4400 and the lock stop 5417 holds the locking member 5410 in the unlocked position, as shown in FIG. 23.

Figure 24:
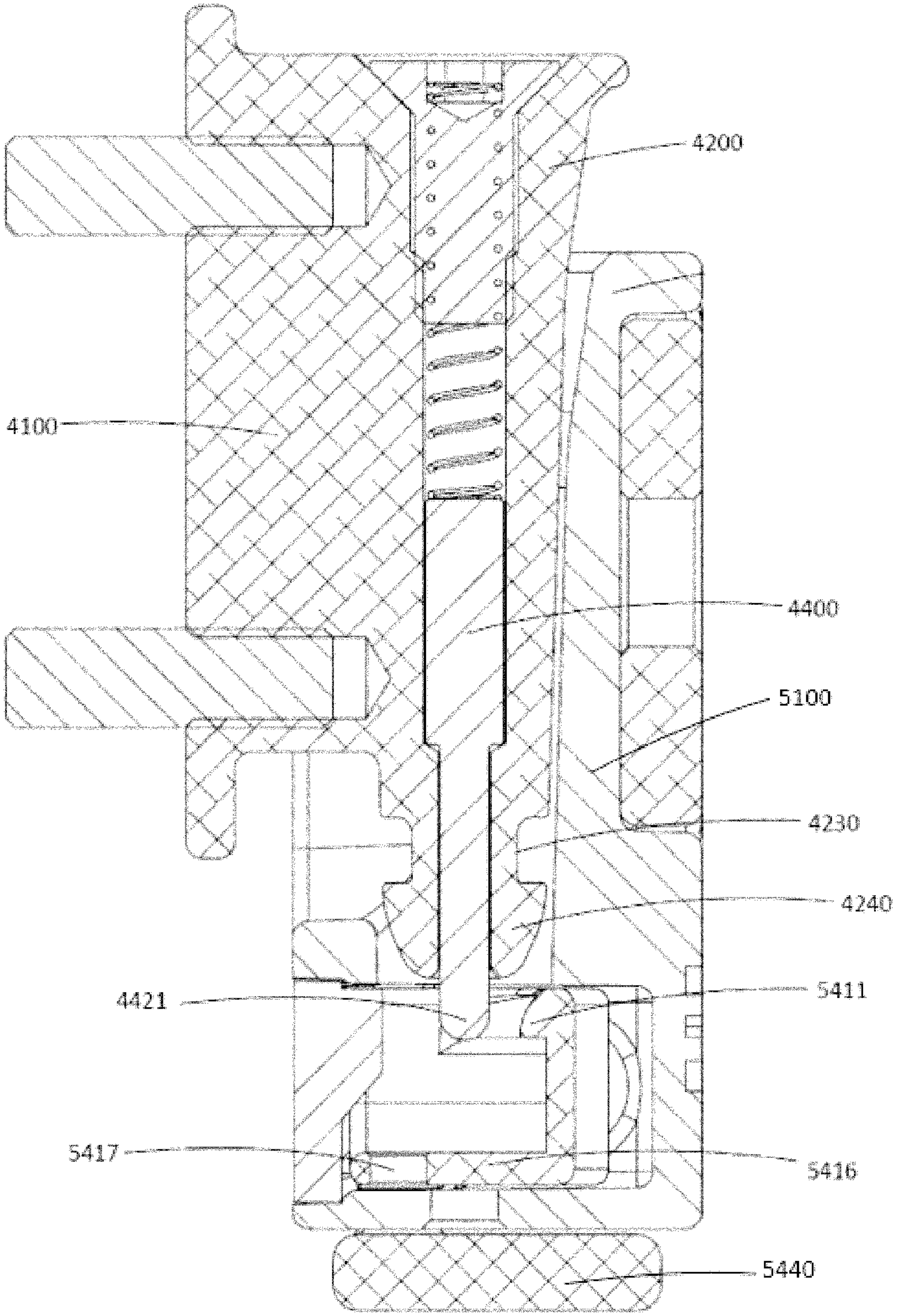
FIG. 24 is yet another cross-sectional view showing the same components as FIG. 20 but in which the locking peg has been further retracted from the peg receiver such that the latch pin has disengaged with the lock stop, allowing the locking member to automatically pivot back to the locked position, thereby automatically resetting the lock assembly.

The locking peg 4200, together with the latch pin 4400 therein, may now be retracted from the peg receiving opening 5200 by pulling the peg away from the locking member 5410, such as by pulling the backrest up and away from the peg receiver 5000. The latch pin 4400, biased to the extended position, remains engaged with the lock stop 5417 despite retraction of the locking peg. In other words, as the peg 4200 is pulled out of the opening 5200, the latch pin 4400 continues to extend from the distal end of the peg 4200 and engage with the lock stop 5417 until the catch 5411 is no longer aligned with the lock engagement feature 4230 of the peg 4200. At this point, or after this point, further retraction of the peg 4200 (and therefore of the pin 4400 within the peg) causes the pin to disengage from the lock stop 5417. Once the pin 4400 disengages from the lock stop, the compression force of the lock biasing member 5430 pushes the locking member 5410 toward the locked position, causing the locking member 5410 and therefore the unlocking element 5440 that is connected to the locking member, to move to the locked position, such that the self-locking lock assembly is automatically reset, as shown in FIG. 24. The movement of the locking member 5410 to the locked position simultaneously causes the unlocking element 5540 to return to the second, locked position.

In some forms, the mounting system may be reversed, such that the peg 4200 is inverted and arranged to be pushed upwardly and into a peg receiving opening 5200 located at the bottom of the peg receiver 5000. In these forms, the peg opening 5415*a* may be located at the bottom of the locking member 5410. Regardless of the orientation of the lock assembly 5400, the component parts of the lock assembly operate in the same manner.

The invention may also be said broadly to consist in the parts, elements and features referred to or indicated in the specification of the application, individually or collectively, in any or all combinations of two or more of said parts, elements or features.

Where, in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

We claim:

1. A mounting system to mount a first component to a second component, the system comprising:

a locking peg, for attaching to the first component; and a peg receiver, for attaching to the second component, wherein the peg receiver comprises:

a peg receiving opening to receive at least a portion of the locking peg therein;

a lock assembly, comprising a locking member movable between a locked position and an unlocked position, and a lock biasing member that biases the locking member to the locked position;

and wherein the locking peg comprises:

a proximal end and a distal end;

a lock engagement feature located between the proximal and distal ends to engage with the locking member in the locked position;

a pin housing extending along at least a portion of a length of the locking peg; and a pin located within the pin housing and moveable between a retracted position and an extended position;

wherein the pin is biased to the extended position in which a distal end of the pin projects from the distal end of the locking peg to engage with and hold the locking member in the unlocked position.

2. The mounting system of claim 1, wherein in the extended position, the pin engages with the locking member to hold the locking member in the unlocked position.

3. The mounting system of claim 1, wherein in the extended position, the pin engages with a lock stop of the locking member to hold the locking member in the unlocked position, the lock stop comprising an aperture or recess to receive a distal end portion of the pin.

4. The mounting system of claim 2, wherein in the extended position, the pin projects from the distal end of the locking peg a distance sufficient to remain engaged with the locking member at least until the locking peg is retracted from the peg receiver sufficiently to disengage the locking member with the engagement feature of the locking peg.

5. The mounting system of claim 2, wherein upon disengagement of the pin with the locking member, the lock biasing member causes the locking member to automatically move to the locked position.

6. The mounting system of claim 1, wherein the locking member comprises a lock support and the pin engages with the lock support when the locking member is in the locked position.

7. The mounting system of claim 6, wherein the lock support is a detent, recess, or concave dimple.

8. The mounting system of claim 1, wherein the pin is biased to the extended position by a pin biasing member.

9. The mounting system of claim 8, wherein the pin biasing member is located between a proximal end of the pin and the proximal end of the locking peg.

10. The mounting system of claim 8, wherein the pin biasing member comprises a compression spring.

11. The mounting system of claim 1, wherein the lock assembly further comprises an unlocking element that is operatively connected to the locking member to cause the locking member to move from the locked position to the unlocked position as the unlocking element is moved from a first position to a second position.

12. The mounting system of claim 1, wherein the locking member is pivotable about a pivot to move between the locked and unlocked positions.

13. The mounting system of claim 12, wherein the pivot and locking member are integrally formed as a single part.

14. The mounting system of claim 1, wherein the locking member is slidable between the locked and unlocked positions.

15. The mounting system of claim 1, wherein the lock engagement feature comprises a detent or opening in the locking peg.

16. The mounting system of claim 1, wherein the distal end of the locking peg comprises a tapered tip.

17. The mounting system of claim 1, wherein the locking member comprises a catch that engages with the lock engagement feature of the locking peg in the locked position.

18. The mounting system of claim 17, wherein the catch projects from at least one supporting element of the locking member and wherein the locking member comprises a peg opening for receiving the distal end of the locking peg, the peg opening being defined, at least in part, by the catch.

19. The mounting system of claim 18, wherein the catch comprises a lip or collar that terminates at the peg opening and wherein the catch comprises a tapered edge, at the peg opening, that slopes toward a cavity within the locking member.

20. The mounting system of claim 19, wherein the cavity is formed between the catch and a retaining element of the locking member, the retaining element projecting beyond a terminal end of the catch and comprising a lock stop.

21. A mounting system to mount a first component to a second component, the system comprising:

a locking peg, for attaching to the first component; and a peg receiver, for attaching to the second component, wherein the peg receiver comprises:

a peg receiving opening to receive at least a portion of the locking peg therein;

a lock assembly, comprising a locking member movable between a locked position and an unlocked position, and a lock biasing member that biases the locking member to the locked position;

wherein the locking peg engages with the locking member in the locked position and comprises:

a projecting element projecting from a distal end of the locking peg to engage with and hold the locking member in the unlocked position.

22. A kit of parts comprising:

a peg receiver comprising:

a peg receiving opening to receive at least a portion of a locking peg therein;

a lock assembly, comprising a locking member movable between a locked position and an unlocked position, and a lock biasing member that biases the locking member to the locked position;

a locking peg comprising:

a proximal end and a distal end;

a lock engagement feature located between the proximal and distal ends;

a pin housing extending along at least a portion of a length of the locking peg; and a pin located within the pin housing and moveable between a retracted position and an extended position;

wherein the pin is biased to the extended position in which a distal end of the pin projects from the distal end of the locking peg to engage with and hold the locking member in the unlocked position.

* * * * *